(12) United States Patent
Rappaport

(10) Patent No.: US 11,624,821 B2
(45) Date of Patent: Apr. 11, 2023

(54) SYSTEM, METHOD AND COMPUTER-ACCESSIBLE MEDIUM FOR REAL TIME IMAGING USING A PORTABLE DEVICE

(71) Applicant: New York University, New York, NY (US)

(72) Inventor: Theodore S. Rappaport, Raleigh, NC (US)

(73) Assignee: NEW YORK UNIVERSITY, New York, NY (US)

( * ) Notice: Subject to any disclaimer, the term of this patent is extended or adjusted under 35 U.S.C. 154(b) by 826 days.

(21) Appl. No.: 16/422,517

(22) Filed: May 24, 2019

(65) Prior Publication Data

US 2020/0025911 A1   Jan. 23, 2020

Related U.S. Application Data

(60) Provisional application No. 62/852,053, filed on May 23, 2019, provisional application No. 62/675,869, filed on May 24, 2018.

(51) Int. Cl.
| | |
|---|---|
| *G01S 13/89* | (2006.01) |
| *H01Q 3/00* | (2006.01) |
| *G01S 7/295* | (2006.01) |
| *G06N 20/00* | (2019.01) |
| *H01Q 21/29* | (2006.01) |
| *H04L 67/10* | (2022.01) |

(52) U.S. Cl.
CPC .............. *G01S 13/89* (2013.01); *G01S 7/295* (2013.01); *G06N 20/00* (2019.01); *H01Q 3/00* (2013.01); *H01Q 21/29* (2013.01); *H04L 67/10* (2013.01)

(58) Field of Classification Search
CPC ........ G01S 13/42; G01S 13/888; G01S 13/89; G01S 7/295; G06N 20/00; H01Q 21/29; H01Q 3/00; H01Q 3/26; H04L 67/10; H04W 4/02; H04W 4/33
See application file for complete search history.

(56) References Cited

U.S. PATENT DOCUMENTS

| | | | |
|---|---|---|---|
| 5,446,461 A * | 8/1995 | Frazier | G01S 13/34 342/22 |
| 9,478,858 B1 * | 10/2016 | West | G01S 7/414 |

(Continued)

OTHER PUBLICATIONS

Rappaport, T.S. "Wireless Communications, Principles and Practice" c. 2nd Edition, pp. 1-371, Pearson/Prentice Hall, 2002.

(Continued)

*Primary Examiner* — Timothy A Brainard
(74) *Attorney, Agent, or Firm* — WC&F IP

(57) ABSTRACT

An exemplary system, method and computer-accessible medium for generating an image(s) or a video(s) of an environment(s), which can include, for example, generating a first millimeter wave (mmWave) radiofrequency (RF) radiation using a mobile device(s), providing the first mmWave RF radiation to the at least one environment, receiving, at the mobile device(s), a second mmWave RF radiation from the environment(s) that can be based on the first mmWave RF radiation, and generating the image(s) or the video(s) based on the second mmWave RF radiation.

23 Claims, 23 Drawing Sheets

(56) References Cited

U.S. PATENT DOCUMENTS

| | | | | |
|---|---|---|---|---|
| 2010/0295718 | A1* | 11/2010 | Mohamadi | G01S 7/026 342/21 |
| 2012/0062411 | A1* | 3/2012 | Shylo | H01Q 5/20 342/94 |
| 2014/0266345 | A1* | 9/2014 | Matsumura | H03L 7/07 327/158 |
| 2015/0086084 | A1* | 3/2015 | Falconer | G06V 20/10 382/113 |
| 2015/0212205 | A1* | 7/2015 | Shpater | G01S 13/56 342/28 |
| 2015/0268339 | A1* | 9/2015 | Dayi | G01S 13/86 342/179 |
| 2015/0379356 | A1* | 12/2015 | Nikolova | G01S 7/2806 342/90 |
| 2016/0314613 | A1* | 10/2016 | Nowozin | G06T 15/506 |

OTHER PUBLICATIONS

Bowditch, J.I. "American practical navigator." Washington, D.C.: US Government Printing Office, pp. 1-714, 1938.
Sun, S. et al., "Hybrid beamforming for 5g millimeter-wave multi-cell networks," IEEE Conference on Computer Communications Workshops (INFOCOM WKSHPS), pp. 1-8, Apr. 2018.
Sume, A. et al., "Radar detection of moving targets behind corners," IEEE Transactions on Geoscience and Remote Sensing, vol. 49, No. 6, pp. 2259-2267, Jun. 2011.
Setlur, P. et al., "Multipath exploitation in non-los urban synthetic aperture radar," IEEE Journal of Selected Topics in Signal Processing, vol. 8, No. 1, pp. 137-152, Feb. 2014.
Sengupta, K. et al., "Terahertz integrated electronic and hybrid electronic-photonic systems," Nature Electronics, vol. 1, No. 12, p. 622, 2018.
Schaubach, K.R. et al., "A ray tracing method for prediting path loss and delay spread in microcellular environments," in Vehicular Technology Society 42nd VTS Conference—Fronties of Technology, vol. 2, May 1992, pp. 932-935.
Ryan, J. et al., "Indoor Office Wideband Penetration Loss Measurements at 73 GHz," in IEEE International Conference on Communications Workshop, May 2017, pp. 1-6.
Rodwell, M.J.W. "Sub-mm-wave technologies: Systems, ICs, THz transistors," in 2013 Aisa-Pacific Microwave Conference Proceedings (APMC), Nov. 2013, pp. 509-511.
Rappaport T.S. et al., "Small-scale, local area, and transitional millimeter wave proprgation for 5G communications," IEEE Transactions on Antennas and Propagation, vol. 65, No. 12, pp. 6474-6490, Dec. 2017.
Rappaport et al., "Millimeter Wave Mobile Communications for 5G Cellular: It will work!" pp. 1-15, 2013.
Rappaport, T.S. et al., "State of the art in 60-GHz integrated circuits and systems for wireless communications," Proceedings of the IEEE, vol. 99, No. 8, pp. 1390-1436, Aug. 2011.
Rappaport T. S. et al., Wide-band microwave propagation parameters using circular and linear polarized antennas for indoor wireless channels, IEEE Transactions on Communications, vol. 40, No. 2, pp. 240-245, Feb. 1992.
Priebe, S. et al., "Channel and Propagation Measurements at 300 GHz," IEEE Transactions on Antennas and Propagation, vol. 59, No. 5, pp. 1668-1698, May 2011.
Petrov, V. et al., "Terahertz band communications: Applications, research challenges, and standardization activities," in 2016 8th International Congress on Ultra Modern Telecommunications and Control Systems and Workshops (ICUMT), Oct. 2016, pp. 183-190.
Petrov, V. et al., "Applicability assessment of terahertz information showers for next-generation wireless networks," in 2016 IEEE International Conference on Communications (ICC), May 2016, pp. 1-7.
Parker, J.S. et al., "Exploiting the Terahertz Band for Radionavigation," Journal of Infrared, Millimeter, and Terahertz Waves, vol. 37, No. 10, pp. 1021-1042, Oct. 2016.
O'Toole, M. et al., "Confocal non-line-of-sight imaging based on the light-cone transform," Nature, vol. 555, No. 7696, p. 338, Mar. 2018.
Nagatsuma, T. "Breakthroughs in photonics 2013: Thz communications based on photonics," IEEE Photonics Journal, vol. 6, No. 2, pp. 1-5, Apr. 2014.
MmWave Coalition, "mmWave Coalition's NTIA comments," [From the Internet], Available: http://mmwavecoalition.org/rnmwave-coalition-millimeter-waves/mmwave coalitions-ntia-cornments/, pp. 1-21, Jan. 2019.
Mittleman, D.M. "Twenty years of terahertz imaging," Opt. Express, vol. 26, No. 8, pp. 9417-9431, Apr. 2018.
Meissner, P. et al., "Accurate and Robust Indoor Localization Systems Using Ultra-wideband Signals," in European Navigation Conference (ENC), Apr. 2013, pp. 1-9.
McGillem, C. D. et al., "A beacon navigation method for autonomous vehicles," IEEE Transactions on Vehicular Technology, vol. 38, No. 3, pp. 132-139, Aug. 1989.
Mittleman, Daniel M. et al., "Twenty years of Terahertz Imaging [Invited]" Optics Express 9417, vol. 26, No. 8, Apr. 2018.
"Comments of the mmWave Coalition," 1-21, National Telecommunications and Information Administration U.S. Department of Commerce, Docket No. 181130999-8999-01, 2019.
Zhang, Y.P. "Measurements of the characteristics of indoor penetration loss," in 1994 IEEE 44th Vehicular Technology Conference (VTC), vol. 3, Jun. 1994, pp. 1741-1744.
Zetik, R. et al., "Looking behind a corner using multipath-exploiting uwb radar," IEEE Transactions on Aerospace and Electronic Systems, vol. 51, No. 3, pp. 1916-1926, Jul. 2015.
Xu, F. et al., "Revealing hidden scenes by photon-efficient occlusion-based opportunistic active imaging," Optics express, vol. 26, No. 8, pp. 9945-9962, Apr. 2018.
Xing, Y. et al., "Verification and calibration of antenna cross-polarization discrimination and penetration loss for millimeter wave communications," in 2018 IEEE 88th Vehicular Technology Conference, Aug. 2018, pp. 1-6.
Xing, Y. et al., "Propagation Measurement System and Approach at 140 GHzMoving to 6G and Above 100 GHz," in IEEE 2018 Global Communications Conference, Dec. 2018, pp. 1-6.
Wang, H. et al., "A parametric formulation of the UTD diffraction coefficient for real-time propagation prediction modeling," IEEE Antennas and Wireless Propagation Letters, vol. 4, pp. 253-257, Aug. 2005.
McKown, J. W. et al., "Ray tracing as a design tool for radio networks," IEEE Network, vol. 5, No. 6, pp. 27-30, Nov. 1991.
Velten, A. et al., "Recovering three-dimensional shape around a corner using ultrafast time-of-flight imaging," Nature communications, vol. 3, p. 745, Mar. 2012.
Trichopoulos, G. C. et al., "A Broadband Focal Plane Array Camera for Real-time THz Imaging Applications," IEEE Transactions on Antennas and Propagation, vol. 61, No. 4, pp. 1733-1740, Apr. 2013.
Thajudeen, C. et al., "Measured complex permittivity of walls with different hydration levels and the effect on power estimation of twri target returns," Progress in Eleotromagnetics Research, vol. 30, pp. 177-199, 2011.
Thai, K. et al., "Around-the-corner radar: Detection and localization of a target in non-line of sight," in 2017 IEEE Radar Conference (RadarConf), May 2017, pp. 0842-0847.
Sun, S. et al., "Synthesizing omnidirectional antenna patterns, received power and path loss from directional antennas for 5G millimeter-wave communications," in 2015 IEEE Global Communications Conference (GLOBECOM), Dec. 2015, pp. 3948-3953.
Sun, S.et. al., "MIMO for millimeter-wave wireless communications: Beamforming, spatial multiplexing, or both?," IEEE Com. Mag., 2014.
Sun, S. et al., "Millimeter-wave distance-dependent large-scale propragation measurements and path loss models for outdoor and indoor 5G systems," in Proc. 10th EuCap, Davos, Switzerland, Apr. 2016, pp. 1-5.
Sun, S. et. al, "Hybrid Beamforming for 5G Millimeter-Wave Multi-Cell Networks," IEEE InfoCom Honolulu, 1-8, Apr. 2018.

(56) References Cited

OTHER PUBLICATIONS

Schaubach, K.R. et al.,"A ray tracing method for predicting path loss and delay spread in microcellular environments," in Vehicular Technology Society 42dn VTS Conference—Frontiers of Technology, vol. 2, May 1992, pp. 932-935.

Sengupta, K. et al., "Terahertz integrated electronic and hybrid electronic electronic-photonic systems," Nature Electronics, vol. 1, No. 12, p. 622, 2018.

Rodwell, M.J.W. "Sub-mm-wave technologies: Systems, ICs, THz transistors," in 2013 Asia-Pacific Microwave Conference Proceedings (APMC), Nov. 2013, pp. 509-511.

Rappaport T. S. et al., "Small-scale, local area, and transitional millimeter wave propagation for 5G communications," IEEE Transactions on Antennas and Propagation, vol, 65, No. 12, pp. 6474-6490, Dec. 2017.

O'Toole, M. "Confocal non-line-of-sight imaging based on the light-cone transform," Nature, vol. 555, No. 7696, p. 338, Mar. 2018.

Priebe, S. et al., "Channel and Propagation Measurements at 300 GHz," IEEE Transactions on Antennas and Propagation, vol. 59, No. 5, pp. 1688-1698, May 2011.

Aladsani, M. et al., "Leveraging mmWave Imaging and Communications for Simultaneous Localization and Mapping," in International Conference on Acoustics, Speech, and Signal Processing (ICASSP), May 2019, pp. 1-4.

Anderson, C. R. et al., "In-building wideband partition loss measurements at 2.5 and 60 GHz," IEEE Transactions on Wireless Communications, vol. 3, No. 3, pp. 922-928, May 2004.

Kapilevich B. et al., "Millimeter waves sensing behind walls-feseability study with fel radiation," 1-4, 2007.

Bowditch, J. I. American practical navigator. Washington, D.C.: US Government Printing Office, 1-714, 1938.

B5GS19, "The Brooklyn 5G Summit," Apr. 2019. [From the Internet]. https://brooklyn5gsummit.com/

Chi, T. et al, "A packaged 90-to-300 GHz transmitter and 115 to-325GHz coherent receiver in CMOS for full-and continuous-wave mm-wave hyperspectral imaging," in 2017 IEEE International Solid-State Circuits Conference (ISSCC), Feb. 2017, pp. 304-305

Ho, C.M.P et. al, "Antenna effects on indoor obstructed wireless channels and a deterministic image-based wide-band propagation model for in-building personal communication systems," Intl. Journal of Wireless Information Networks, Jan. 1994, pp. 61-76, 1994.

Davies, R. et al., "Wireless propagation measurements in indoor multipath environments at 1.7 GHz and 60 GHz for small cell systems," in [1991 Proceedings] 41st IEEE Vehicular Technology Conference, May 1991, pp. 589-593.

Degli-Esposti, V. et al., "Measurement and modelling of scattering from buildings," IEEE Trans. on Ant. and Prop., vol. 55, No. 1, pp. 143-153, Jan. 2007.

Deng, S. et al., "28 GHz and 73 GHz millimeter-wave indoor propagation measurements and path loss models," in IEEE International Conference on Communications Workshops (ICCW), Jun. 2015, pp. 1244-1250.

Kiran Doddalla, S. et al., "Non-Line of Sight Terahertz imaging from a Single Viewpoint," in 2018 IEEE/MTT-S International Microwave Symposium-IMS, Jun. 2018, pp. 1527-1529.

Ministry of Internal Affairs and Communications, "Frequency Assignment Plan (as of Mar. 2019)," Mar. 2019. [From the Internet]. https://www.tele.soumu.go.jp/e/adm/freq/search/share/plan.htm.

Durgin, G.D. et al., "Measurements and models for radio path loss and penetration loss in and around homes and trees at 5.85 GHz," IEEE Transactions on Communications, vol. 46, No. 11, pp. 1484-1496, Nov. 1998.

Durgin, G. "An advanced 3D ray launching method for wireless propagation prediction," in 1997 IEEE 47th Vehicular Technology Conference. Technology in Motion, vol. 2, May 1997, pp. 785-789.

Durgin, G.D. et al., "Partition-based path loss analysis for in-home and residential areas at 5.85 GHz," in 1998 IEEE Global Communications Conference (GLOBECOM), vol. 2, Nov. 1998, pp. 904-909.

Statement of Commissioner Jessica Rosenworcel, [From the Internet] https://ecfsapi.fcc.gov/file/0228024928034/FCC-18-17A6.pdf.

FCC, "Spectrum horizons," First Report and Order ET Docket 18-21, Washington D. C., Mar. 21, 2019.

Before the Federal Communications Commission, [From the Internet] https://ecfsapi.fcc.gov/file/0228024925034/FCC-18-17A1.pdf, 1-74.

Frazier, L. M."Radar surveillance through solid materials," in Command, Control, Communications, and Intelligence Systems for Law Enforcement, vol. 2938. International Society for Optics and Photonics, 1997, pp. 139-147.

Friis, H.T. "A note on a simple transmission formula," Proceedings of the IRE, vol. 34, No. 5, pp. 254-256, May 1946.

Tan, S. Y. et al., "A microcellular communications propagation model based on the uniform theory of diffraction and multiple image theory," IEEE Transactions on Antennas and Propagation, vol. 44, No. 10, pp. 1317-1326, Oct, 1996.

Harvey, J. et al., "Exploiting High Millimeter Wave Bands for Military Communications, Applications, and Design," IEEE Access, vol. 7, pp. 52 350-52 359, Apr. 2019.

* cited by examiner

Measured reflection/scattering power off drywall at 28 GHz with dual-lobe DS model prediction.

Measured reflection/scattering power off drywall at 73 GHz with dual-lobe DS model prediction.

Measured reflection/scattering power off drywall at 140 GHz with dual-lobe DS model prediction.

SYSTEM, METHOD AND COMPUTER-ACCESSIBLE MEDIUM FOR REAL TIME IMAGING USING A PORTABLE DEVICE

CROSS-REFERENCE TO RELATED APPLICATION(S)

This application relates to and claims priority from U.S. Patent Application Nos. 62/675,869, filed on May 24, 2018, and 62/852,053, filed on May 23, 2019, the entire disclosures of which are incorporated herein by reference.

STATEMENT REGARDING FEDERALLY SPONSORED RESEARCH

This invention was made with government support under Grant Nos. 1702967 and 1731290, awarded by the National Science Foundation. The government has certain rights in the invention.

FIELD OF THE DISCLOSURE

The present disclosure relates imaging, and determining locations and presence and movement of items or individuals, more specifically, to exemplary embodiments of an exemplary system, method and computer-accessible medium for real time imaging using a portable (e.g., handheld) device.

BACKGROUND INFORMATION

Today, many people use their smartphone camera to assist in the capture pictures of places that can be hard for them to see. For example, taking a photo of electronics wiring behind a hard to reach desk, or taking a photo in a cabinet that can be above the person's eyesight, facilitates the user to view a photo of the physical environment, without having to reach their own head behind the desk or to climb on a chair to see the cabinet's contents with their own eyes. To many, this can be a surprising and non-intuitive use of the smartphone camera that might not have been contemplated a decade ago. Nevertheless, it shows how handheld communication devices can be used for things beyond communication.

Radio frequencies ("RF") and/or Wi-Fi signals can be used to discern object locations in three-dimensional ("3-D") space, using sensing and predictive approaches based on the signals. Position location based on radio signal strength indication ("RSSI") can be used, but these methods suffer gross inadequacies due to limited RF bandwidth and without the high resolution that directional multi-element antenna arrays can provide.

Using various radar technologies, which can use a wider signaling bandwidth, it can be possible to determine smaller distance differences in the measurement of a returning radar images. In radio propagation channel sounding, a wider RF signaling bandwidth can lead to greater temporal resolution on the received probe signal when in a bi-static radar configuration.

Thus, it may be beneficial to provide an exemplary system, method, and computer-accessible medium for real time imaging using a portable (e.g., handheld) device which can overcome at least some of the deficiencies described herein above.

SUMMARY OF EXEMPLARY EMBODIMENTS

An exemplary system, method and computer-accessible medium for generating an image(s) or a video(s) of an environment(s), which can include, for example, generating a first millimeter wave (mmWave) radiofrequency (RF) radiation based on beam steering or frequency sweeping using a mobile device(s), providing the first mmWave RF radiation to the environment(s), receiving, at the mobile device(s), a second mmWave RF radiation from the environment(s) that can be based on the first mmWave RF radiation, and generating the image(s) or the video(s) based on the second mmWave RF radiation.

In some exemplary embodiments of the present disclosure, the video(s) can be a real-time video of the environment(s). The first mmWave RF radiation can have a frequency between about 80 GHz to about 850 GHz. Information related to a phase(s) of the second mmWave RF radiation, a time of arrival of the second mmWave RF radiation, a relative time of arrival of the second mmWave RF radiation, or an angle of arrival of the second mmWave RF radiation can be determined. The image(s) or the video(s) can be determined based on the information. A location or position of objects in the environment can be determined, which can include (i) obstructions, (ii) walls, (iii) objects of interest, or (iv) people.

In certain exemplary embodiments of the present disclosure, a movement of an object(s) in the environment can be tracked based on the second mmWave RF radiation or a location of the mobile(s) device can be determined based on the second mmWave RF radiation. Information regarding the second mmWave RF radiation can be transmitted to a further device, and the image(s) or the video(s) can be received from the further device. The first mmWave RF radiation can be generated using an adaptive antenna array, where the adaptive antenna array includes one of a digital antenna array, an analog antenna array, or a hybrid antenna array. A direction of transmission of the adaptive antenna array can be modified based on the environment(s). The image(s) or the video(s) can be generated based on the second mmWave RF radiation using a machine learning procedure.

In some exemplary embodiments of the present disclosure, the first mmWave RF radiation can be pulsed, spread over a bandwidth, or discretized over a plurality of individual frequencies. A location of a stud(s) in a wall(s) can be determined based on the second mmWave RF radiation. A map(s) of the environment(s) can be generated based on the second mmWave RF radiation or it can be received, wherein the map(s) includes a floor plan, locations of walls or locations of objects. The received map(s) can be generated by a cloud server. A phase(s) of the second mmWave RF radiation can be determined and a distance between the mobile device(s) and a receiving device can be determined based on the phase(s). A phase ambiguity in phase(s) of the second mmWave RF radiation can be corrected for. A scattering pattern(s) of different angles of receipt of the second mmWave RF radiation can be determined by a receiving device.

Additionally, an exemplary mobile device can be provided, which can include, for example, an antenna array(s), and a computer hardware arrangement configured to generate millimeter wave (mmWave) radiofrequency (RF) radiation using the antenna array(s), provide the first mmWave RF radiation to an environment(s), receive, using the antenna array(s), a second mmWave RF radiation from the environment(s) that can be based on the first mmWave RF radiation, and generate the image(s) or the video(s) based on the second mmWave RF radiation.

In some exemplary embodiments of the present disclosure, the video(s) can be a real-time video of the environment(s). The first mmWave RF radiation can have a frequency between about 200 MHz to about 3000 GHz. Information related to a phase(s) of the second mmWave RF radiation, a time of arrival of the second mmWave RF radiation, a relative time of arrival of the second mmWave RF radiation, or an angle of arrival of the second mmWave RF radiation can be determined. The image(s) or the video(s) can be determined based on the information. A presence or a location of an object(s) in the environment(s) can be determined based on the second mmWave RF radiation.

In certain exemplary embodiments of the present disclosure, a movement of an object(s) in the environment can be tracked based on the second mmWave RF radiation. Information regarding the second mmWave RF radiation can be transmitted to a further device, and the image(s) or the video(s) can be received from the further device. The first mmWave RF radiation can be generated using an adaptive antenna array, where the adaptive antenna array includes one of a digital antenna array, an analog antenna array, or a hybrid antenna array. A direction of transmission of the adaptive antenna array can be modified based on the environment(s). The image(s) or the video(s) can be generated based on the second mmWave RF radiation using a machine learning procedure.

In some exemplary embodiments of the present disclosure, the first mmWave RF radiation can be pulsed, spread over a bandwidth, or discretized over a plurality of individual frequencies. A location of a stud(s) in a wall(s) can be determined based on the second mmWave RF radiation. A map of the environment(s) can be generated based on the second mmWave RF radiation. A phase(s) of the second mmWave RF radiation can be determined and a distance between the mobile device(s) and a receiving device can be determined based on the phase(s). A phase ambiguity in phase(s) of the second mmWave RF radiation can be corrected for. A scattering pattern(s) of different angles of receipt of the second mmWave RF radiation can be determined by a receiving device.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
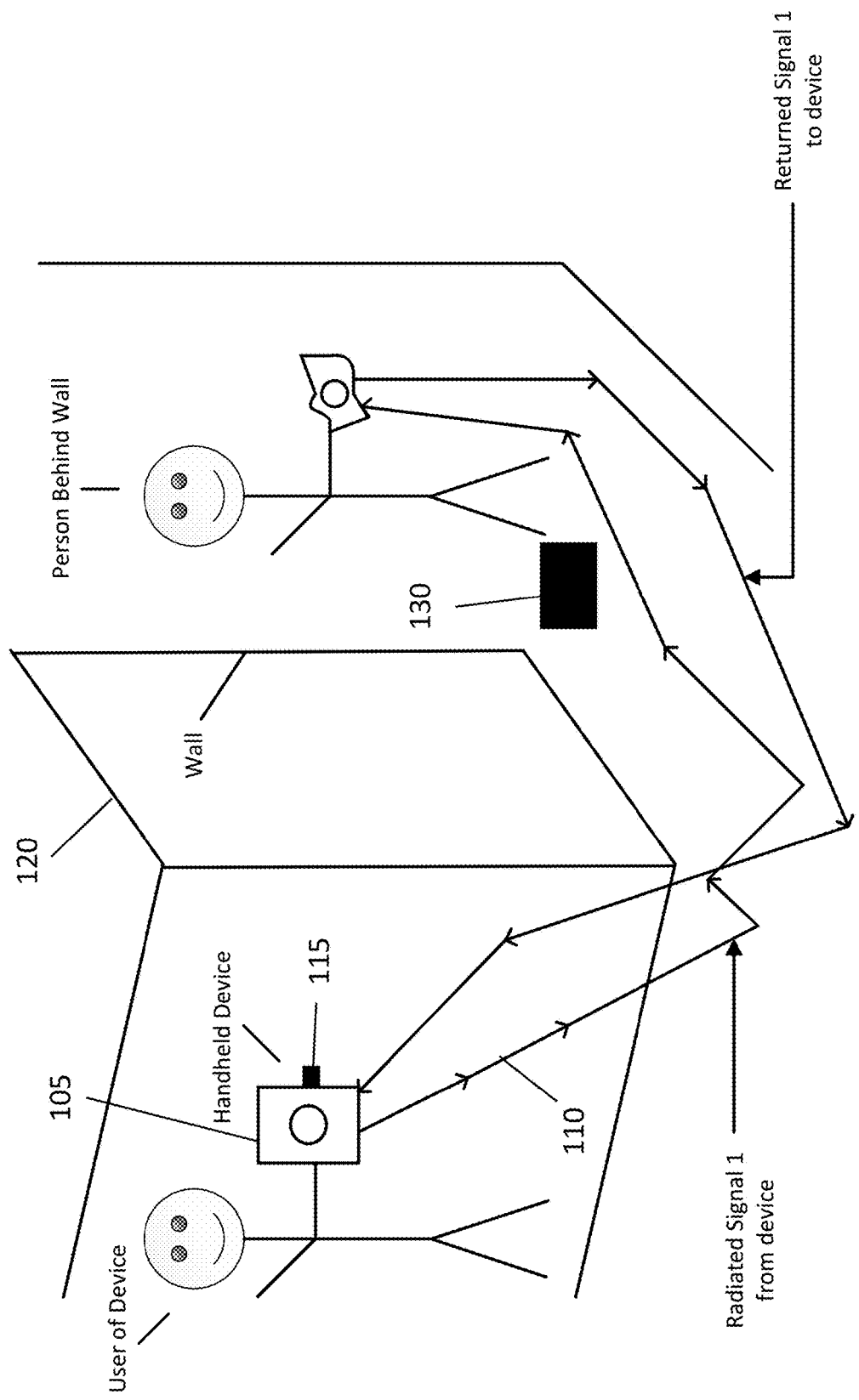
FIG. 1 is an exemplary diagram of an exemplary portable device interacting with a physical environment according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

The exemplary system, method, and computer-accessible medium, according to an exemplary embodiment of the present disclosure, can include a handheld device that can utilize wide bandwidths for cellular or personal/unlicensed wireless communication, and which can use those wide bandwidths to provide real time imaging data for a user of a mobile device such that the radio electronics incorporated for communication can also be used for providing 3D imaging using wideband radar-like transmissions, and then using the display or sensors on the hand held device to render a likeness of the image, even when the human user, itself, cannot see or predict the surroundings of the physical environment.

Detecting the phase or the time of arrival or the relative time of arrival or the angle of arrivals of discernable angles of radio energy and radio signatures can facilitate the determination of the presence and location of an object, can be used to track movement of items or individuals, and can determine relative motion and changes in orientation or position or location of the items or the individuals, without requiring any active components on the item or individual being tracked. Additionally, the exemplary system, method and computer-accessible medium can incorporate and/or utilize movement of the exemplary mobile device (e.g., various positions and angles) in order to more accurately determine the position of the mobile device and/or generate an image of the surroundings.

The exemplary system, method and computer-accessible medium, according to an exemplary embodiment of the present disclosure, can determine the position of one or more objects in the environment. The position can be an absolute position of the object (e.g., based on a priori knowledge of the environment which can have been previously determined). Alternatively, the position can be a relative position of the object with respect to the mobile device. For example, the distance, angle, and height from each object can be determined relative to the mobile device. Additionally, various other suitable exemplary position/information sensors can be utilized, which can be incorporated in the mobile device. These can include, but are not limited to barometers, gyroscopes, capacitive sensors, transducers, video camera, as well as inertial navigations procedures. Alternatively, or in addition, a position of the mobile device can be determined. Then using the a priori knowledge of the environment, the absolute position of each object can be determined.

After the position of each object is determined, the exemplary system, method and computer-accessible medium, according to an exemplary embodiment of the present disclosure, can generate an image, a video or a map of the environment. For example, the relative or absolute position of each object can be used to render the image (e.g., by providing the location for each object in the image). Additionally, surface characteristics of each object can be utilized along with the position to more accurately render the image, video or map. Various exemplary machine learning procedures can be utilized to determine the type of object being imaged. This information can be incorporated into the image, video, or map to provide increased accuracy. For example, by identifying the actual object, known characteristic of the object type can be used as parameters to render the actual object being imaged into the image, video, or map. Further, frequency sweeping can be used to fine tune the focus of the image to be captured or determined. The user device can perform this u barometers, gyroscopes, capacitive sensors, and other known position location mechanisms that can be incorporated into a mobile device.

By using wireless communication spectrum that can be in the millimeter wave or even higher frequency range, for example, of about 10 GHz (e.g., between 8 GHz to about 12 GHz) up to and including about 3000 GHz (e.g., about 2700 GHz to about 3300 GHz)), it can be possible to use the smaller wavelengths and greater allocated spectrum bandwidths (e.g., RF bandwidths of 2 GHz up to and including 100 GHz of width), to yield super-resolution range finding, imaging, motion detection, rendering of the physical environment, even when there can be an obstructed view of a physical space, or if there can be insufficient light for the human to discern any of these kinds of cues in the environment. Additionally, certain frequency ranges can be particularly beneficial (e.g., about 80 GHz to about 900 GHz). The processing for such unprecedented imaging and rendering can be done on the device (e.g., based on Moore's law), or can be shared between the device itself and processing that can be performed remote to the device, using the wide bandwidths of wireless networks. Additionally, exemplary computation can be performed remotely from the device, and sent back to the device for storage, manipulation, augmentation, or iterative cooperative processing between the device, the human user of the device, and one or more computing engines remote to the device. Smaller wavelengths at greater wireless carrier frequencies between about 10 GHz and 3000 GHz can facilitate the use of physically small adaptive antenna arrays, which can be digital, analog, or hybrid in their use of beamforming. (See e.g., References 4-6).

At various exemplary frequencies, each antenna element can be quite small (e.g., on the order of a wavelength or even smaller if implemented on high dielectric materials such as on-chip antenna, on substrate antennas, or antennas implemented on high epsilon circuit boards, or on the skin of fabric of a device). At 10 GHz, the free space wavelength can be 30 millimeters (e.g., 3 cm), and at 3000 GHz, the free space wavelength can be 0.1 millimeter, thus illustrating that hundreds or thousands or more antenna elements can easily fit on a handheld device at such frequencies, providing super angular and spatial and temporal resolution for a wideband signal that can be emitted by such a handheld devices. Similarly, at such high carrier frequencies, the narrowband bandwidth can be quite large (e.g., a few percent of the carrier frequency at 3000 GHz can be an astounding 90 GHz) thereby facilitating low cost electronics, many with resonant circuits, and reliable and reproducible "narrowband processing" electronics over unprecedented wide RF bandwidths about an unprecedentedly high carrier frequency, and thus can provide extremely good precision and relative accuracy for measuring relative distances through time delay detected from signals that can be reflected or scattered from the physical environment. By sending a RF transmission, either pulsed, spread over bandwidth, or discretized over many individual frequencies, using an exemplary modulation procedure that can be used to carry baseband signals over a carrier, the handheld device, such as a cellphone, communicator, all-purpose electronic wallet etc. can radiate energy in time and space, such that returned backscatter, reflection, and scattered signal energy radiated by the handheld device can be processed, at the device itself or remotely at a network computation site or other remote processing center, and then rendered by the handheld device for the user to assimilate.

The exemplary portable (e.g., handheld) imaging device can be integrated in a cellphone, personal appliance, electronic wallet, or could be a standalone item such as a wallboard stud finder found in today's hardware stores. When implemented as part of a smart phone or pocket communicator, the preferred implementation, the device can use, for example, frequencies that are the same, similar or different than commercial wireless frequencies used for cellphone or Wi-Fi or ultrawideband, or Bluetooth communication.

The exemplary portable (e.g., handheld) device can include a viewing screen for rendering a photo or moving image or virtual view of the physical environment for the human user, as well as one or more cameras, and can include augmented reality to superimpose sensed data with actual data captured by the camera(s) or rendered photo. Even without a camera or image rendering screen capability, the exemplary device can use audio tones, alerts, text, or other means to communicate sensory observations to the user.

FIG. 1 is an exemplary diagram of an exemplary portable device interacting with a physical environment according to an exemplary embodiment of the present disclosure. As shown in FIG. 1, the exemplary portable device (e.g., handheld 105) can send out RF signals 110 of wide bandwidth (e.g., between about 2 to about 90 GHz in RF bandwidth for super resolution in space), using carrier frequencies of, for example, 10 GHz up to 3000 GHz, and through the systematic transmission and reception of RF energy received back from the physical environment. The exemplary handheld device 105 can use the imaging data from many locations in the physical space to create an image of the physical environment. The exemplary device can use a transceiver 115, or separate receiver and transmitter 115, which can be coupled to an electronically steered antenna array consisting of one or more antenna elements that can form beams of energy for transmission and reception.

The exemplary device can become a rendering device that can determine and show the user the physical surroundings of places that the human user cannot see for themselves, determining what can be behind walls 120, floors 125 or objects 130, determining the environment in the dark, augmenting an existing photo or known environment from a map or picture or past rendering stored or retrieved by the handheld device 105. The handheld device 105 can also provide computing based on sensors on the phone, or can have assisted computing for such rendering sending to remote processing units that can communicate with the exemplary portable (e.g., handheld) device, facilitating the device to show or store the image, and facilitating the user or the device to manipulate, zoom, highlight, shade, reorient/tilt either on the image displayed on the device in real time, or in pseudo real time with successive processing on the fly on the device or with data representing the measured sensory data and imaging sent back from the exemplary portable (e.g., handheld) device to remote computing resources that can be accessed through an existing wireless communication network.

Figure 2:
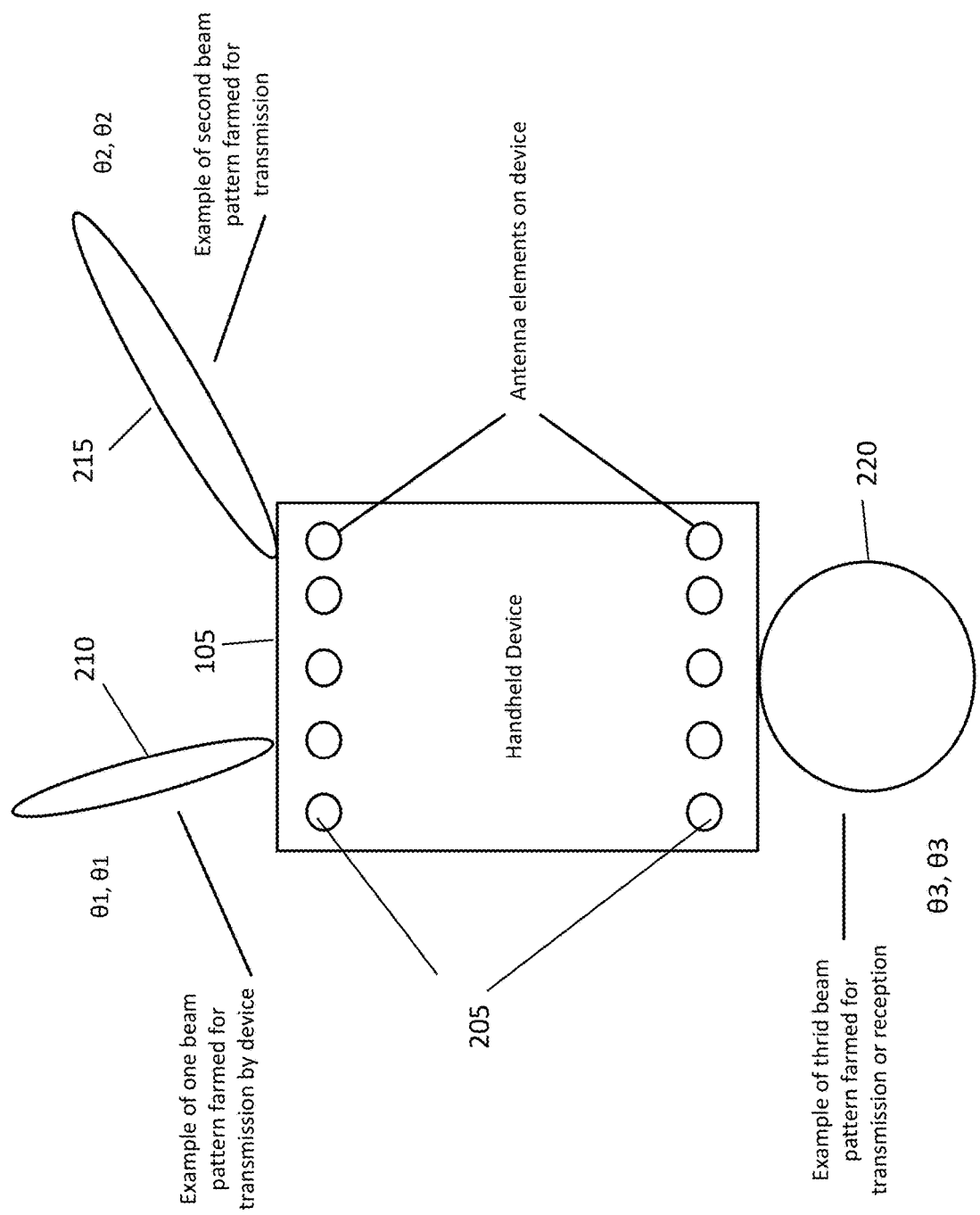
FIG. 2 is an exemplary diagram of exemplary antennas implemented on the exemplary device illustrating how signals can interact with an environment according to an exemplary embodiment of the present disclosure.

As shown in FIG. 2, more than one antenna 205 on the exemplary portable (e.g., handheld) device 105 can form beams of energy for transmission and reception, and these beams can be formed in parallel, or can be formed in sequential scans in azimuth and elevation, and the beam patterns made for transmission can be course (e.g., wide beam) and electronically shifted to become more fine (e.g., narrow) in beamwidth. Beamforming can facilitate for one main lobe, and/or many lobes, with varying degree of sidelobes, and that the antenna elements used for imaging the environment can be the same or different or partially shared with those used for wireless communications.

As shown in FIG. 2, either 2D azimuthal or elevation scans can be performed using the exemplary adaptive antennas for sensing the physical environment, or 3D in both azimuth and elevation can be performed, where scans can be variably oriented based on the handheld orientation and the desired orientation by the human user, etc. The radio signals 210 and 215 emitted and received by the exemplary device can be limited by the radio transmitter power, and enhancement in signal range can be achieved through averaging over time, frequency, code, space, and other exemplary procedures, and the narrow beams provided by a large antenna array can overcome free space propagation loss in the vicinity of the handheld device, thereby facilitating relatively long (e.g., one to many tens of meters) of range in proximity of the handheld device at low battery power levels typically used for smartphones. Different radio frequencies can scatter, reflect, diffract, or penetrate different materials at different frequencies. By using an exemplary model of such electromagnetic properties as a function of frequency of operation, the exemplary device can transmit and receive at many closely spaced angular dimensions to obtain get a very fine resolution model of the physical environment, where the time delays of different returning signals can facilitate computation of the physical distances associated with physical objects in the environment. Strength of signals can degrade when passing through walls or traveling through fog or rain, facilitating both physical objects as well as weather and atmospheric changes to be detected and imaged.

Some frequency bands, such as 70 GHz and 140 GHz, can have less attenuation in free space than other bands, such as 60 GHz or 380 GHz. (See e.g., Reference 10). Angular spacings can be synthesized on the transmitting phased array antennas using particular geometries (e.g., patch arrays, uniform linear arrays, uniform rectangular arrays, closely spaced arrays that take advantage of spatial relativity for improving signal to noise ratio and reducing sampling resolution requirements, conformal arrays, and on-chip and flip-chip phased arrays. The angular resolution and pointing angles can be determined by the amplitudes and/or phases of electrical signals applied to the transmitting antennas, and receiving antennas, which can be the same or different structures. Exemplary antenna architectures can include analog beamforming, digital beamforming, or hybrid beamforming. By transmitting a signal at different frequencies, and determining the frequency-dependent characteristics of the channel (e.g. the air, response of objects and humans, and the frequency-dependent nature or wavelength-dependent nature of various propagation phenomena, such as Brewster angle/polarizing angle), such that different reflection or scattering mechanisms can be identified from particular objects or phenomena, the exemplary system, method and computer-accessible medium can learn and determine what objects can exist in the channel, and where they can exist relative to other objects, based on time of flight of particular signatures measured in the channel.

Figure 3:
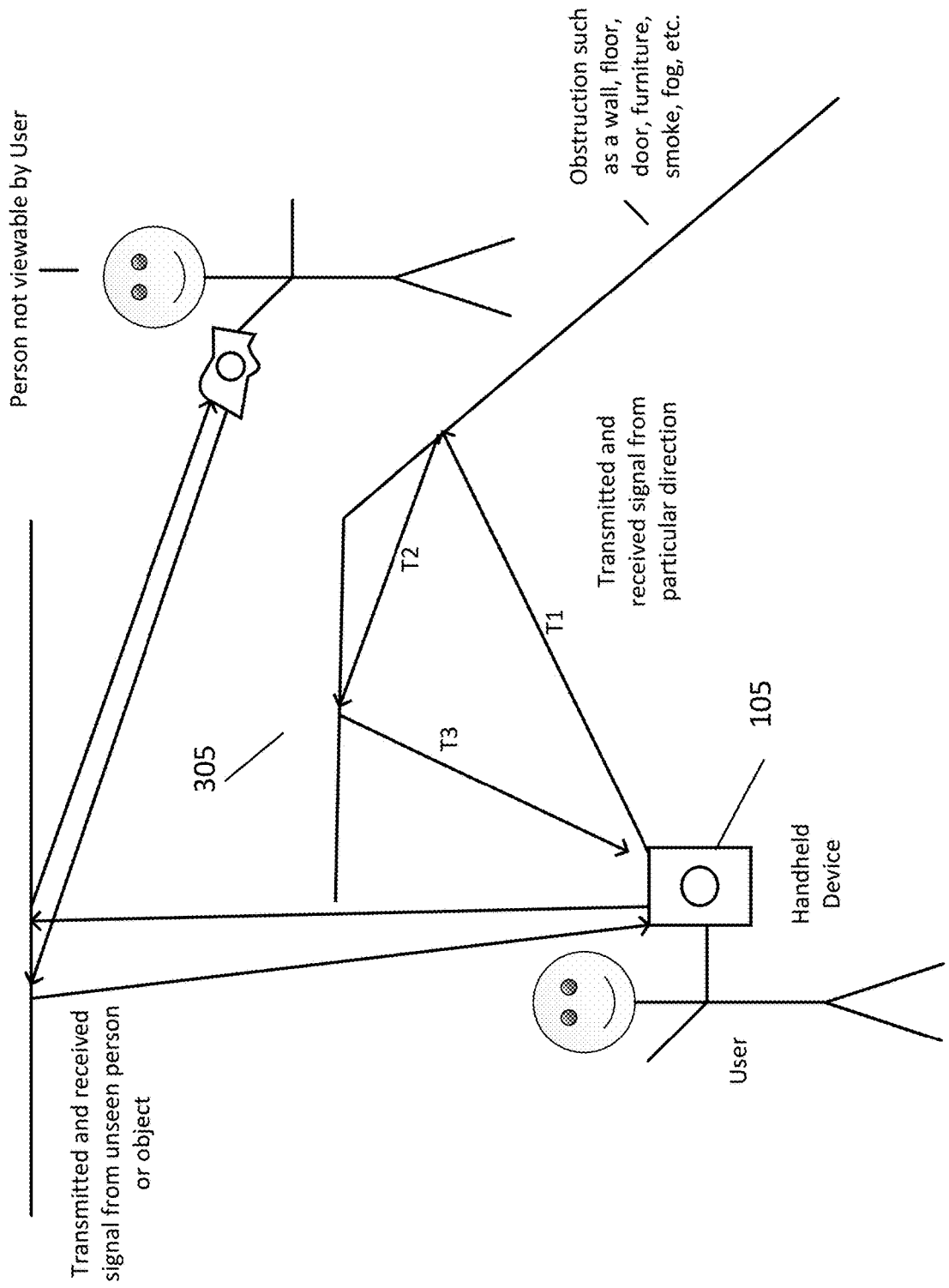
FIG. 3 is an exemplary diagram illustrating how the delay in propagating signals can relate to distance measured for a given beamforming orientation and transmitted signal according to an exemplary embodiment of the present disclosure.

FIG. 3 shows an exemplary diagram illustrating how the transmitted signal from the handheld device 105 can interact with the physical environment 305, facilitating the received version of the signal to be captured by the receiver in the handheld device. By capturing thousands of incremental versions of the electromagnetic responses of the physical environment 305 as a function of position in space, and by determining signaling over many samples of different locations in space, sufficient data can be obtained in which the exemplary system, method and computer-accessible medium can use to interpret the physical environment and received radio signals in order to form a rendering of the environment on the device for the user to view and interact with. Since reflections and scattering of RF energy can "go around corners and behind walls", and often energy can pass through walls with various attenuation characteristics, the exemplary system, method and computer-accessible medium can reconstruct an accurate estimate of the physical environment without the human user being able to see the environment, itself. Since RF energy can propagate whether there can be daylight or illumination or not, the exemplary system, method and computer-accessible medium can be used to see in the dark.

Additionally, the exemplary system, method and computer-accessible medium, according to an exemplary embodiment of the present disclosure, can be used to determine fog or smoke or rain or hail, as well as the characteristics of building materials and human reflectivity, and can have various attenuation and electromagnetic properties that can be modeled and incorporated into assessing the physical environment. Use of antenna polarization in the transmission and reception can facilitate the determination of the physical environment as many objects can be sensitive to polarization. Using previously determined versions of the physical environment, based on the location of the device and known maps and images for such location, the exemplary device can more easily predict the physical environment than just through RF imaging, alone.

Exemplary antenna polarizations can be altered by applying RF energy to orthogonally fabricated antenna elements on the antenna array, or using alternately oriented spatial arrays, for example, with different linear arrays that can be positioned in orthogonal axes on the device. Circular polarization, either right-handed or left-handed, can be excited by using phase delays on both horizontal and vertically oriented arrays, and circular polarization can be used to remove or attenuate various exemplary multipath components (e.g., through reverse circular polarization on reflection) that can bounce off floors or other surfaces (See e.g., References 8 and 9), as well as other suitable procedures. Using various polarizations and frequencies, and incorporating channel sounding with alternate polarizations and alternate handed circular polarization, the exemplary system, method and computer-accessible medium can identify various surfaces, which can be learned over time for accurate sensing of the environment and creation of a map of locations of objects, items or people. For example, the exemplary system, method and computer-accessible medium, according to an exemplary embodiment of the present disclosure, can be used to identify different objects, people, clothing, inanimate objects, etc.

Figure 4:
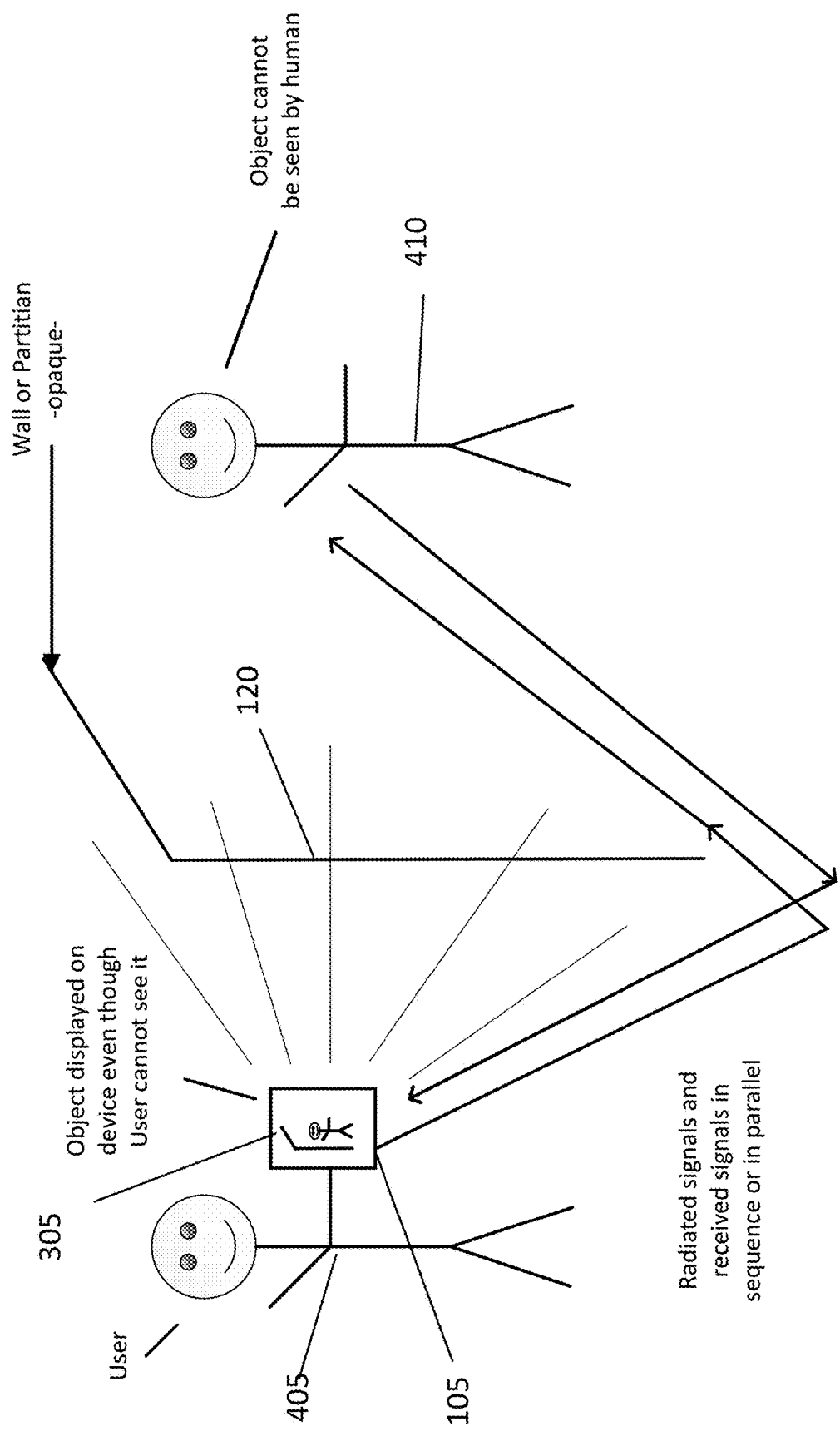
FIG. 4 is an exemplary diagram illustrating the rendering of a physical environment on an exemplary handheld display according to an exemplary embodiment of the present disclosure.

FIG. 4 illustrates how the exemplary handheld device 105 can show to a user 410 the rendering of the physical environment 305, even though the user cannot see the physical environment 305. In this exemplary scenario, a person 410 can be situated behind the wall 120, and the user 405 cannot see through the wall 120, but the device 105 can predict and show a view of the person 410, relative to the physical environment 305. The exemplary handheld device 105 can incorporate past views, models or augmented reality of the physical location of interest to the user 405. Processing utilized to construct the image can be based on the response of objects and materials to radio imaging as a function of radio frequency (e.g., objects and people have frequency dependent characteristics) as well as the time delays obtained by the measurements of the hand held device indicating the relative location of items, in addition to expert learning and artificial intelligence that facilitates the procedures to improve over time and with more user experience. The image that can be displayed on the hand held device can be a static picture, an image, a moving picture (e.g. video), and can be formulated based on previous photographs, images, models or maps that may have existed before the use of the device. Alternatively, the imaging device can create an image, and this image can be stored and used by the device, and sent to a remote storage facility for use in a database that can build images and can continue to learn about physical environmental modeling, for improved performance of the handheld device imaging for a population of users.

The exemplary system, method, and computer-accessible medium, according to an exemplary embodiment of the present disclosure, can include an exemplary portable (e.g., handheld) device, which can be used for portraying an image or providing cues relating to a physical environment that cannot be visualized by a human user. The exemplary device can utilize one or more antennas that, for example, can transmit and receive signals between about 10 GHz and about 3000 GHz. The one or more antennas can be electronically steered to form one or more beams that can facilitate transmission and reception of radio signals in proximity of the exemplary handheld device. The radio signals can have a RF bandwidth of between about 2 and about 90 GHz. The exemplary handheld device can render an image of a physical space that may not be seen by the naked eye of the user of the handheld device. The image can be compiled based on sensory data obtained by the exemplary handheld device using the one or more antennas and the radio signals. The exemplary handheld device can also be used for wireless communications.

Additional antenna elements in an array can provide a greater gain in the boresight direction and simultaneously a narrower main beamwidth lobe than an antenna with fewer active elements. Antenna arrays can use clusters of antenna elements in a hybrid fashion, or analog or digital beamforming can be done using many antenna elements. The wavelength at about 73 GHz can be approximately 4.1 mm which can correspond to a half-wavelength antenna separation of about 2.05 mm. If a BS antenna array can have 256 elements, where each antenna element can be a patch antenna with approximately 3 dBi of gain, it can cover an area of approximately 32.8 mm by 32.8 mm and results in a gain of 27 dBi (not considering feeder loss). Additionally, if a mobile antenna array can have 16 elements where each antenna element can be a patch antenna with 6 dBi of gain, it can cover an area of approximately 8.2 mm×8.2 mm.

Additional antenna elements can result in greater gain and tighter (e.g., narrower) beamwidths, and can impact the spatial resolution and signal levels that can be received upon radar returns. Higher frequencies can result in smaller wavelength and thus a greater number of elements and greater gain can be achieved in the same physical area. Averaging the signal signatures, over time, space, and frequency can yield better signal to noise ratio ("SNR") and deeper resolution for arriving signals.

The exemplary system, method, and computer-accessible medium, according to an exemplary embodiment of the present disclosure, can utilize ultra wideband measurements and array processing with small variations in the radiated major beam angle to distinguish variations in the propagation channel over small angular separations which can map small distances between impinging objects in the channel. The exemplary system, method and computer-accessible medium can facilitate the measurement/detection of small differential time delays, using the wideband transmissions to distinguish time delays as a function of angle. By sensing the small differences in "returned echoes", which can yield propagation distances and their intensity, a map of the environment can be made. Additionally, e.g., machine learning procedures/systems can be used to determine a baseline set of known expected attenuations for a wide range of environmental partitions.

Thus, the exemplary system, method, and computer-accessible medium, can be used to build a map of the environment from the myriad of measurements, which can improve over time. The reflected and scattered energy can arrive from various directions, including those that can be behind or propagate through partitions. The exemplary system, method, and computer-accessible medium, according to an exemplary embodiment of the present disclosure, can learn the expected delays by understanding propagation responses. For example, a received signature that shows a delay at about 4 ns and then a weaker one at about 8 ns can be determined to be a wall that can be about 2 feet away (e.g., radio waves travel 1 foot per ns, thus a 4 ns return can mean that the signal transmitted 2 feet and then bounced back 2 feet, indicating a 2 foot distance to the first wall, and the much weaker return at 8 feet could be determined to be a second wall or object behind the first wall, since the 8 foot signal would have to travel 4 feet (e.g., passing the first wall and then hitting a second wall), and then reflected back 4 feet, for a total of an 8 ns delay. The amplitudes and angular values from many closely spaced signatures with slightly different angles can be used to confirm the assumptions of the "unseen" objects while building a map of the environment that can be overlaid or augmented with a known or visual image of the environment.

Using exemplary array processing, with controllable 2-D or 3-D antenna array beam steering, it can be possible to launch a transmitted signal, either narrowband, wideband, or sweeping/chirp signal, that can facilitate transmitted signal function to be launched in a particular direction. The response from the launched signal can contain the convolution of the launched signal with the response of the channel. (See e.g., Reference 9). By probing the channel with incremental changes in the spatial direction of the launched signal, the exemplary system, method and computer-accessible medium can identify variations in the response of the radio channel. Subtle differences in the received channel response, as a function of small change in launch angle, can be due to the variations in propagation, and can be based on the changes in the geometry of the impinging radio energy on various objects in the channel. As discussed above, the frequency-dependent nature and geometric dependencies on radio reflections, diffractions, and scatterings can be known or learned from successive transmissions at different directions, and matched or estimated based on a library of known responses to theoretical reflection, diffraction or scattering.

The exemplary system, method and computer-accessible medium can utilize machine learning to estimate the most likely or reasonable guesses as to what objects can cause the variations in radio responses for various perturbations in the launched radio signals. By using the received responses and comparing the variations across minute angles, and using geometric models that can be iterated for different distances from a transmitter, the received signal responses, such as received amplitude or power, phase, true time of flight, relative time delay between signals in a received signal response, the time delay of responses of the received signal, etc. can be used to determine the objects in a physical surroundings that can cause the measured variations in received signal responses as a function of angle and frequency, especially when considered with measured physical response such as time of flight, and particular signal level changes as a function of frequency and angle.

As an example, a smooth scatterer, such as a marble wall or glass, can have a relatively simple, angle dependent reflection response over a wide range of frequencies for a given polarization, and such a response can be known ahead of time, through computer memory (e.g., through look up tables as defined objects), or can be learned through calibration or pretest of the exemplary system. The particular signal can be detected by using a transmitter that transmits a signal at varying angles, and a co-located receiver can search for the reflected signal signature. At the particular transmitted and received angles, when the peak signal arrives from the smooth scatter, the beneficial signature can arrive and the smooth object can be identified. There can be, e.g., a few, dozens or hundreds of particular objects used with known frequency and polarization dependent signatures. More complex scattering and reflection can occur with rough surfaces, such as carpeting or plaster walls, or people, but the responses over a wide range of frequencies, polarizations, and incident/departure angles can be known, as a look up or pre-loaded, or can be learned or trained in the operation of the exemplary system.

The exemplary system, method, and computer-accessible medium, according to an exemplary embodiment of the present disclosure, can model Doppler effects for objects in motion, where Doppler can be a function of frequency as well as the angular orientation of the signal with the object's direction of motion. Thus, the exemplary system, method, and computer-accessible medium, can accurately estimate the location (e.g., the spatial position of a particular object with a known signature). Thus, the exemplary system, method, and computer-accessible medium, can be used to locate the position of a particular object of interest.

Exemplary Map-Assisted Millimeter Wave Localization for Accurate Position Location Positioning is the determination of the location of a user that is fixed or moving, based on the known locations of other reference points, which are usually base stations ("BSs"). In line-of-sight ("LOS") environments, the time of flight ("ToF") of a signal can be used to estimate the transmitter ("TX")–receiver ("RX") separation distance d (e.g., since d=c·t, where c is the speed of light and t is the ToF). The RX's position can then be estimated by trilateration. (See, e.g., Reference 11). In non-LOS ("NLOS") environments, ranging based on ToF alone introduces a positive bias in the position estimates since the path length of reflected multipath rays is longer than the true distance between the user and the BS.

The ultra-wide bandwidths available at mmWave and Terahertz ("THz") frequencies facilitate the RXs to resolve finely spaced multipath components and accurately measure the ToF of the signal. (See, e.g., References 12 and 13). The phase accrued by a signal in LOS is proportionate to the ToF. (See, e.g., Reference 11). The phase of the received signal in LOS can be used to estimate the TX-RX ("TR") separation distance in LOS at 300 GHz. (See, e.g., Reference 14). The phase of a signal rotates $2\pi$ radians every $\lambda$ meters (see, e.g., Reference 15), yet phase ambiguity arises, since signals that traverse distances that differ by integral multiples of λ incur the same phase. By tracking the phase of the transmitted signal at the RX and manually correcting for phase ambiguity, decimeter-level accuracy at 300 GHz can be achieved up to distances of 40 m in LOS. (See, e.g., Reference 14).

A problem in determining of a mobile user's precise location from angular measurements can be similar to the 'three point problem' as known in land surveying (see, e.g., References 16-18), and can be used by electrically steerable phased array antennas in wireless systems at mmWave and THz frequencies.

Figure 5:
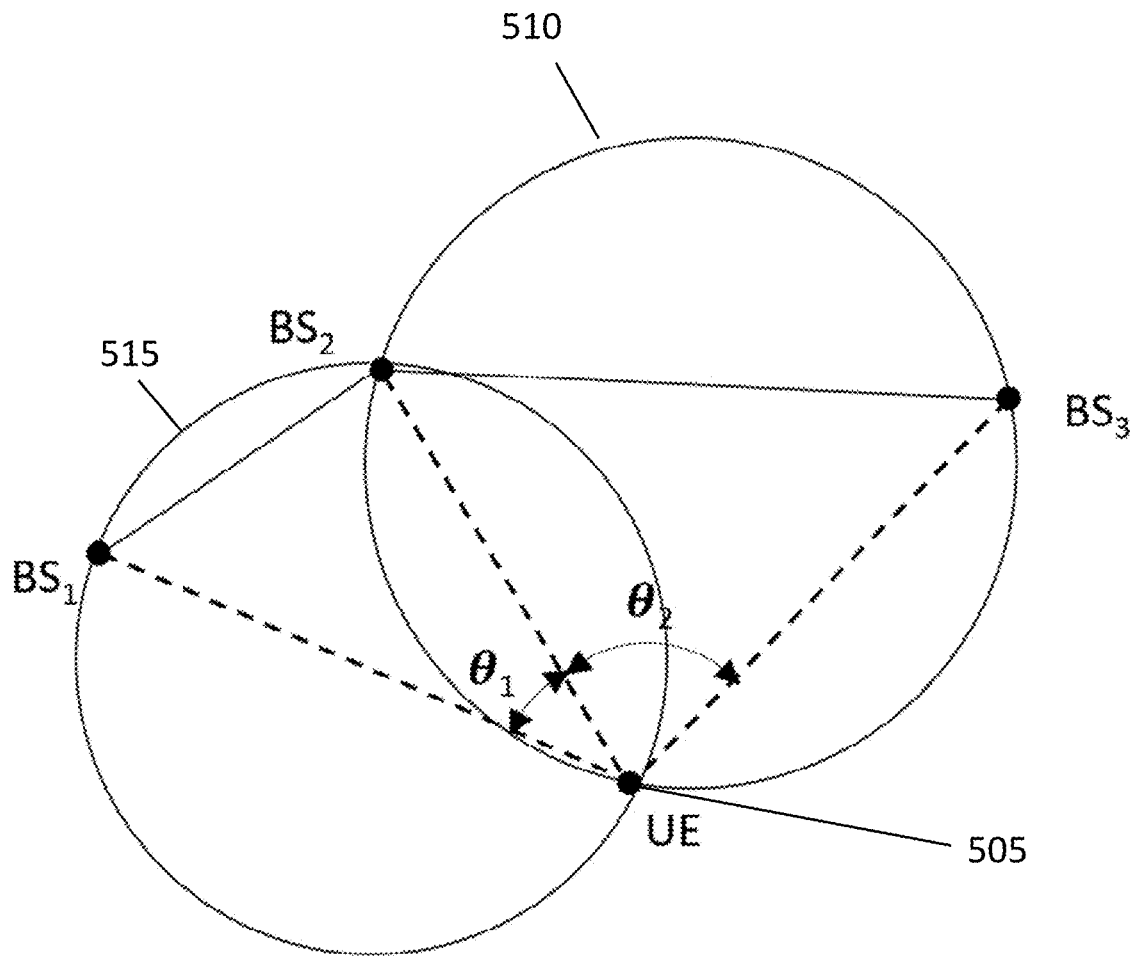
FIG. 5 is an exemplary diagram illustrating user-equipment ("UE") measures of the relative area of arrivals according to an exemplary embodiment of the present disclosure.

FIG. 5 shows an exemplary diagram illustrating the UE measures of the relative area of arrivals according to an exemplary embodiment of the present disclosure. As shown therein, relative angles $\theta_1$ and $\theta_2$ between BSs are measured by the user. The unknown position of the mobile user is then calculated (e.g., trigonometrically). (See, e.g., References 16 and 17). Additionally, geometric observations can illustrate that that the locus of points where $BS_1$ and $BS_2$ subtend (e.g., point 505) a fixed angle $\theta_1$ is a circle circumscribing the triangle formed by the BSs (e.g., taken pairwise) and the user. The user location can correspond to the intersection of the two circles 510 and 515 corresponding to the two relative AoAs measured between two BS pairs. (See, e.g., References 16 and 17). The solution to the three point problem can be sensitive to small errors in measured angles when either the BSs subtend a small angle at the user location, or when the observation point is on or near a circle which contains the three BSs. Look-up tables can also be used to localize the user, where the table stores the relative AoAs measured by the user at each location in the surveyed environment.

Narrow antenna beamwidths of antenna arrays at mmWave frequencies can facilitate the user device to accurately determine the AoA. In order to improve the AoA accuracy, two photodetectors can be placed at an offset and mechanically rotated. (See, e.g., References 16 and 17). The sum and difference of the signals received by the two photodetectors can be calculated to determine the precise angle, even with a course beam pattern. When the sum of the signals received at the two detectors exceeds a threshold and the absolute value of the difference in the signals falls below the threshold, the beacon can be detected to be aligned with the photodetectors. An on-the-fly angular resolution of about 0.2° can be achieved (see, e.g., References 16 and 17), with wideband photodetectors.

The exemplary sum-and-difference method can also be implemented by electrically steering an antenna array, using adjacent antenna beams or slightly offset antenna arrays with overlapping antenna patterns. A single antenna can also be used to locate the AoA of the peak signal from the BSs by quickly dithering the antenna boresight (e.g., electrically or mechanically). The sum and difference of the received signals at successive time instants can be used in place of measurements from two (or more) offset antennas.

In NLOS environments, due to specular reflections from walls and metallic surfaces, rays do not arrive from the direction of the BS, leading to accuracy penalties (see, e.g., Reference 11), if used the AoA is used directly. Real-time electric beam steering procedures can facilitate scanning of room features in a matter of seconds. As a result, mobile phones may be able to generate detailed 3-D maps on the fly, or download them from the cloud. (See, e.g., Reference 13). For example, cloud servers, edge servers, other base station, access points or another user on the network can be used to generate the map. Additionally, the map generation can be crowd sourced using multiple devices. NLOS objects (e.g., around corners) can be "viewed" by first rapidly scanning the environment via beam steering, in order to determine all the reflecting obstructions in the surroundings. The reflecting obstructions can then be distinguished from the target NLOS object to be "viewed" by taking advantage of the fine temporal resolution at mmWave and sub-THz frequencies to create a 3-D map of the local environment. (See, e.g., References 13, 19 and 20). The 3-D maps can be utilized (e.g., in conjugation with angle of departure ("AoD") from the known BSs and ToF measurements) to calculate, back-solve or estimate the actual paths that the multipath components take to reach the user. The exemplary paths taken by the multipath components that reach the user contain sufficient information to localize a user in NLOS, even in the absence of LOS multipath signals.

Exemplary 3-D mmWave Ray Tracer

Since wideband directional measurements can be expensive and time consuming, a ray-tracer that can be truthful to actual measurements at a wide range of locations can be a powerful tool for determining position location procedures, data fusion, and overall position location accuracy and sensitivity.

Using the 2-D mmWave ray tracer (see, e.g., Reference 11), NYURay, a 3-D mmWave ray tracer has been developed. NYURay is a hybrid ray tracer which combines shooting-bouncing rays ("SBR") (see, e.g., References 22 and 23), with geometry-based ray tracing. (See, e.g., References 24 and 25.)

A SBR ray tracer can launch rays uniformly in all directions and then trace the path of each launched ray, as the ray interacts with various obstructions in the environment. Each launched ray can represent a continuous wavefront. Each ray can carry the power that can be carried by the wavefront. (See, e.g., Reference 23.)

The accuracy of the AoA of rays received at the RX can depend on the number of rays launched from the TX. For example, rays are launched from the vertices of a tessellated icosahedron with tessellation factor N, since the average radial separation between two rays can be $$\frac{69°}{N}$$

(see, e.g., Reference 23), for sub-degree accuracy for AoA, N>50, which can be computationally expensive.

Figure 6:
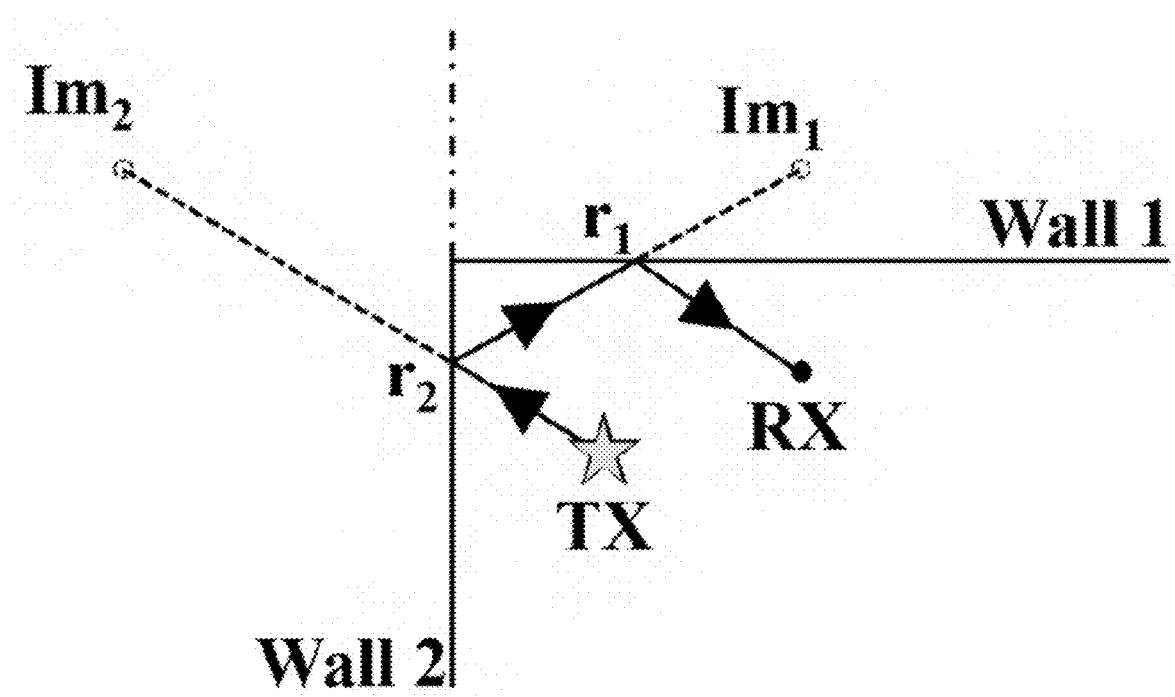
FIG. 6 is an exemplary diagram illustrating exemplary ray tracing based on exemplary images according to an exemplary embodiment of the present disclosure.

Image-based ray tracing (see, e.g., References 24 and 25) can be based on the principle that the incident ray and the reflected ray can make the same angle with the normal to the plane containing the obstruction which can be computationally much easier. Obstructions can be treated as infinitely long, thin, mirrors when using image-based ray tracing. (See, e.g., Reference 25). FIG. 6 shows an exemplary diagram illustrating ray tracing based on exemplary images according to an exemplary embodiment of the present disclosure. For example, as shown therein, $Im_1$ is the image of RX in wall 1 and $Im_2$ is the images of $Im_1$ in wall 2. The image of the RX can be taken, successively, in at most k obstructions, where k can be the maximum number of reflections a ray can go through. (See, e.g., Reference 25.)

If there is a large number of obstructions, the simulation run-time can be large. Assuming that each ray can be reflected at most three times, with N obstructions in the environment, there can be images that need to be computed ($\mathcal{O}(N^3)$). Although the image-based ray tracing procedure can find the direction of arrival of rays accurately, finding the reflection of the RX, recursively, from all combinations of obstructions can be computationally expensive.

To reduce the computational overhead, NYURay uses a hybrid ray tracing procedure. (See, e.g., Reference 26). The approximate trajectories of rays that reach the RX can first be determined via SBR ray tracing. Once all the reflecting surfaces in the path of a ray can be determined, image-based ray tracing can be used to calculate the recursive reflections of the RX. The ray trajectory can be accurately calculated by connecting all the RX images.

In every direction where a ray was launched, on encountering an intersection with an obstruction, two new rays can be created—the specular reflected ray and the transmitted ray. By Snell's Law, the reflected ray and the incident ray can form equal angles with the normal to the obstruction. The transmitted ray can be assumed to propagate in the same direction as the incident ray. A linear model can be used to characterize the variation of reflection coefficient F with incident angle $\theta_1$, based on reflection measurements (see, e.g., References 27 and 28), for example:

$$|\Gamma| = \frac{E_r}{E_i} = 0.56 \cdot \theta_i + 0.096, \tag{1}$$

where $E_r$ can be the reflected electric field, $E_i$ can be the incident electric field, and $\theta_i$ can be the angle of incidence of the ray. As a result, the reflected power $P_r = |\Gamma|^2 P_i$, where $P_i$ can be the power incident on the obstruction. A constant transmission loss of 7.2 dB can be assumed, based on the propagation measurements. (See, e.g., Reference 21.)

New source rays at each boundary can then be recursively traced in the reflection and transmission directions to the next encountered obstruction on the propagating ray path. Path loss can be calculated based on the free space path loss ("FSPL") model (see, e.g., Reference 29), with a TR separation distance equal to the total propagated ray length. Additionally, at most three reflections of rays can be considered in order to reduce computation time. The limitation on the number of reflections can further be justified by the observation that mmWave signals typically do not experience more than two reflections. (See, e.g., Reference 30.)

Figure 8:
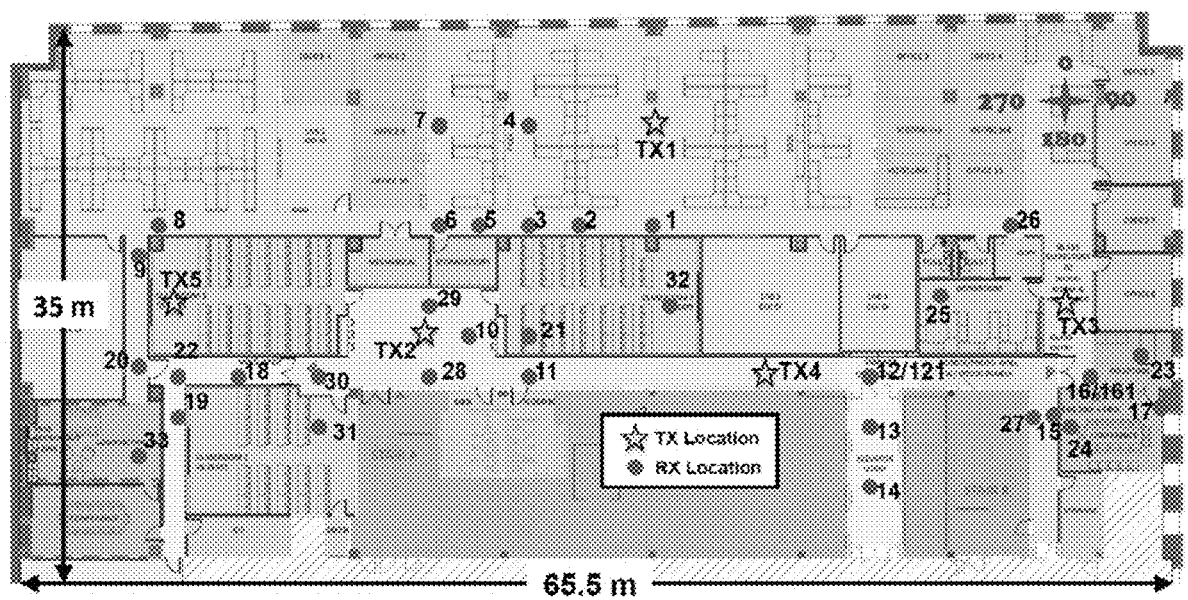
FIG. 8 is an exemplary floor plan map showing a floor for testing the exemplary system, method and computer-accessible medium according to an exemplary embodiment of the present disclosure.

Propagation measurements were conducted at 28 GHz and 73 GHz at the NYU WIRELESS research center, located on the 9th floor of 2 MTC using a 400 Megachip-per-second ("Mcps") wideband sliding correlator channel sounder with high gain steerable antennas. The directional antennas used in the propagation measurements had antenna beamwidths of about 30° and about 15°, at 28 GHz and 73 GHz respectively. FIG. 8 shows most or all the TX and RX locations where the propagation measurements were conducted.

Figure 7:
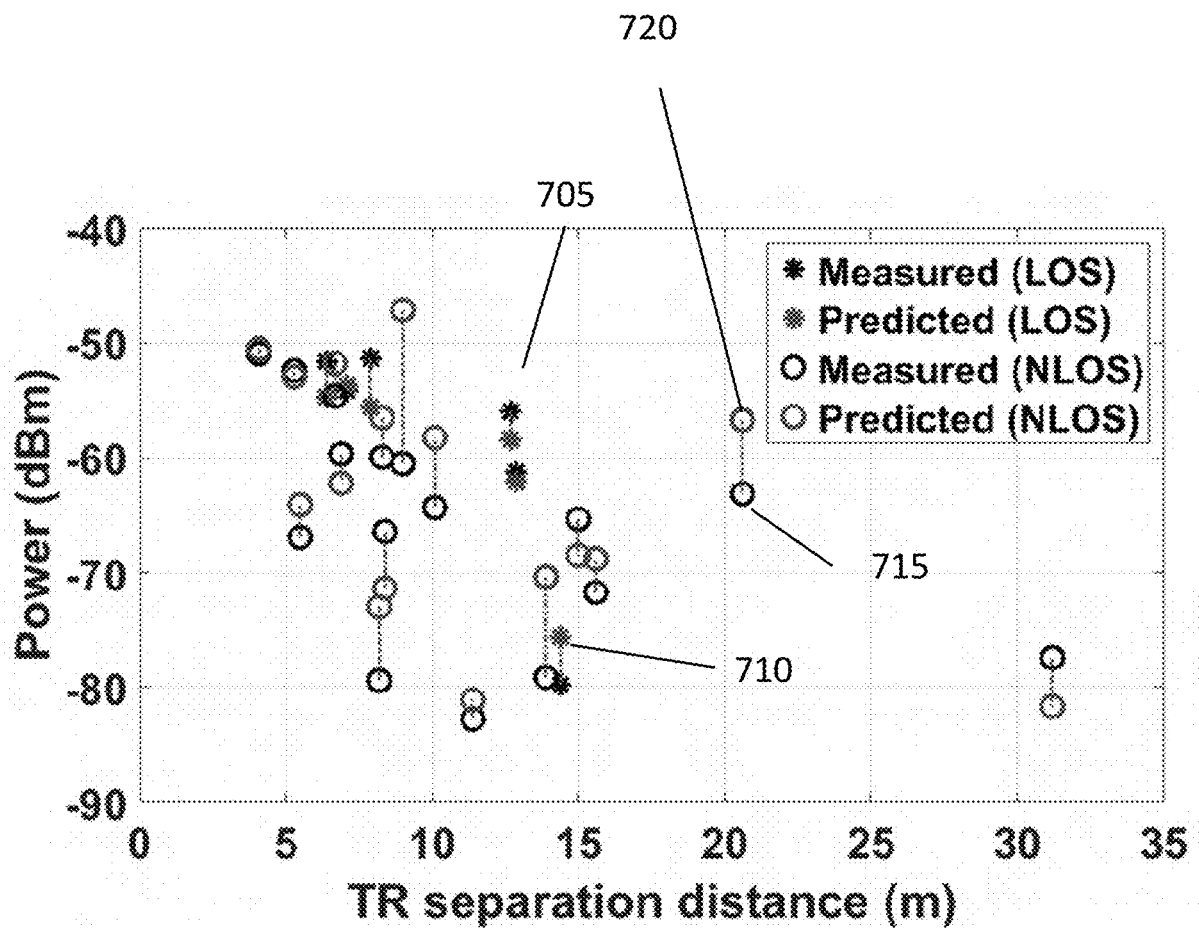
FIG. 7 is an exemplary graph illustrating a comparison between measured and predicted powers of 22 transmit ("TX")-receive ("RX") links according to an exemplary embodiment of the present disclosure.

The performance of NYURay was evaluated by comparing the variation in the predicted and measured path loss with TR separation distance, as is illustrated in FIG. 7. For example, FIG. 7 shows an exemplary graph illustrating the comparison between the measured and predicted powers of 22 TX-RX links (e.g., measures LOS 705, predicted LOS 710, measures NLOS 715 and predicted NLOS 720) according to an exemplary embodiment of the present disclosure. The 22 TX-RX links that were chosen for the comparison were widely spread. The received power was predicted to within 6.5 dB, except for one outlier (e.g., link TX 4 RX 16) which had a prediction error of 13.4 dB.

Exemplary Map-Based Localization

In a multipath rich environment, source rays can arrive at the RX via a direct path (e.g., if the direct path exists) as well as paths along which the source rays can suffer multiple reflections. With knowledge of the angles at which the source rays arrive at the RX, the ToF of the source rays and a 3-D map of the surrounding environment, the RX can determine the location of the source. The rays along each AoA can be backpropagated, as though the RX were emitting the rays. Along the back-propagating path, the ray can interact with obstructions in a manner identical to how a forward-propagating ray can interact.

The intersection of two or more back-traced rays can be labeled as candidate TX locations. (See, e.g., Reference 31). The TX can be localized to the weighted sum of all candidate TX locations. The candidates that had several other intersections in their vicinity can be given greater weight. Using six RX locations, assuming perfect AoA resolution, a 90 percentile localization error of 5 m was achieved. The thermal noise floor was about −85 dBm and an about 30 dBm, 300 MHz signal was transmitted by the TX.

ToF, AoA measurements, along with a map of the obstacles encountered by the signal can be used to localize a user. (See, e.g., Reference 32). A 3-D image of the environment can be obtained via holographic 3-D imaging. A plane uniform linear array of antennas at the TX can be used to calculate the signal scattered from objects in the environment, R(x, y, f), measured at point (x, y, z) using a vector network analyzer ("VNA") at frequency f, varying from about 220 to about 300 GHz. The image of the environment f(x, y, z) can be given by, for example:

$$f(x,y,z) = IFT_{3-D}\{FT_{2D}\{R(x,y,f)\}\}, \tag{2}$$

where IFT and FT can be the discrete spatial inverse Fourier transform and Fourier transform respectively. Once a 3-D image of the environment can be generated, the ToF and AoA of signals reaching the RX can be estimated via beamforming procedures. It can be assumed that all materials act like perfect reflectors and no rays penetrated the obstructions. (See, e.g., Reference 32). Once the total back-traced ray length can be equal to distance d, the RX can be localized to the end of the ray. Over a distance of 2.78 m, there was an error of about 2.6 cm. (See, e.g., Reference 32). While it can be assumed that all obstructions were perfect reflectors at 300 GHz, measurements (see, e.g., References 13 and 32), at 140 GHz, the partition loss through glass and dry wall can be close to 10 dB, indicating that materials do not act like perfect reflectors at mmWave and sub-THz frequencies.

Ultra wideband ("UWB") signals and estimates of ToF can be used, with an indoor map for localization, using the principal of "virtual access points" ("Vas"). (See, e.g., Reference 33). Four TXs were used to localize the user in an area of approximately 20 m×5 m. The TX position was mirrored across each obstruction in the environment to create VAs. The VAs acted as additional anchor points to localize users. Centimeter level accuracy was achieved using a signal with pulse width $T_p$=0.2 ns, a root mean squared ("rms") positioning error of about 3.2 cm was achieved. However AoA information may not be used, which may be available with high accuracy using directional antennas at mmWave frequencies. (See, e.g., Reference 33).

Exemplary Localization with One or More BSs

Map-assisted positioning with angle and time ("MAP-AT") can be or include a map-assisted localization procedure. Localization can be possible using a single BS, when at least two multipath components arrive at the user. The user does not need to be in LOS with the BS. MAP-AT can facilitate two types of BS-user configurations: the user can either be the TX or the RX of a known radio signal. If the user can be the TX, ToF and AoA information can be utilized. If the user can be the RX, ToF and AoD information can be utilized. Temporal and angular measurements can impose constraints on the possible locations of a user. A 3-D map of the indoor environment can create additional constraints on the user's location. These exemplary constraints are explained below.

Exemplary Configuration I—User in Reception Mode

In configuration-I, the user receives a known signal from the BS. The BS can calculate the AoD of each multipath signal that reaches the user during initial access. The ToF of each multipath component from the BS arriving at the user can either be estimated via the round trip time of the multipath component or the one-way propagation time. The BS can then send the AoD and ToF of each multipath component to the user via a feedback channel.

Figure 9:
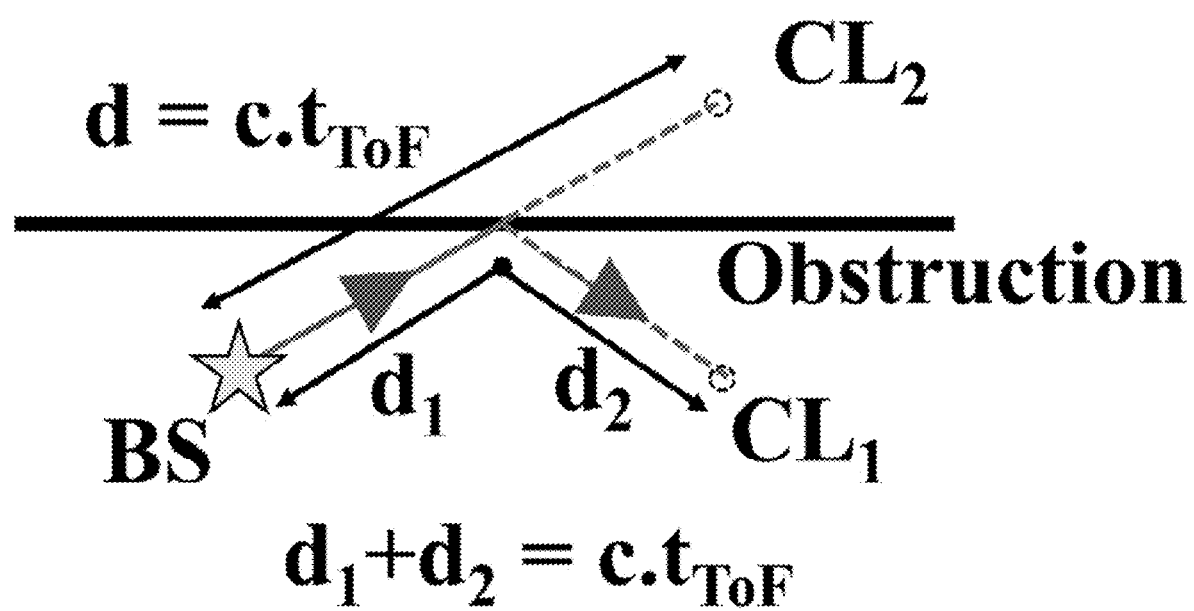
FIG. 9 is an exemplary diagram illustrating two exemplary candidate locations of a user according to an exemplary embodiment of the present disclosure.

For example, consider the case when there can be at most one reflection or transmission of the signal before it reaches the BS. If the ToF and AoD of a multipath signal that reaches the BS can be known, there can be two possible locations of the user. FIG. 9 shows an exemplary diagram illustrating two candidate locations of a user according to an exemplary embodiment of the present disclosure. The two candidate locations of a user, $CL_1$ and $CL_2$, can correspond to the cases where the signal sent from the BS is reflected by and passes through the obstruction, respectively. Additionally, as shown in FIG. 9, if the ray reached the user after one reflection, the user and BS must lie on the same side of the reflecting object. If the ray reached the BS directly from the user, or through one obstruction, the BS and user must lie on opposite sides of the obstruction. The possible locations of the user, based on ToF and AoD at the BS can be referred to as candidate locations.

The exemplary procedure for locating candidate locations can be repeated for all multipath components. If a single multipath component can be received by the user, the BS may not be able to determine which candidate location corresponds to the user's true location. However, when two or more multipath components arrive at the user, a majority of the candidate locations can correspond to the true location of the user. For each multipath component arriving at the user, one candidate location calculated based on the AoD and ToF of the multipath component can correspond to the true user's location.

Figure 10:
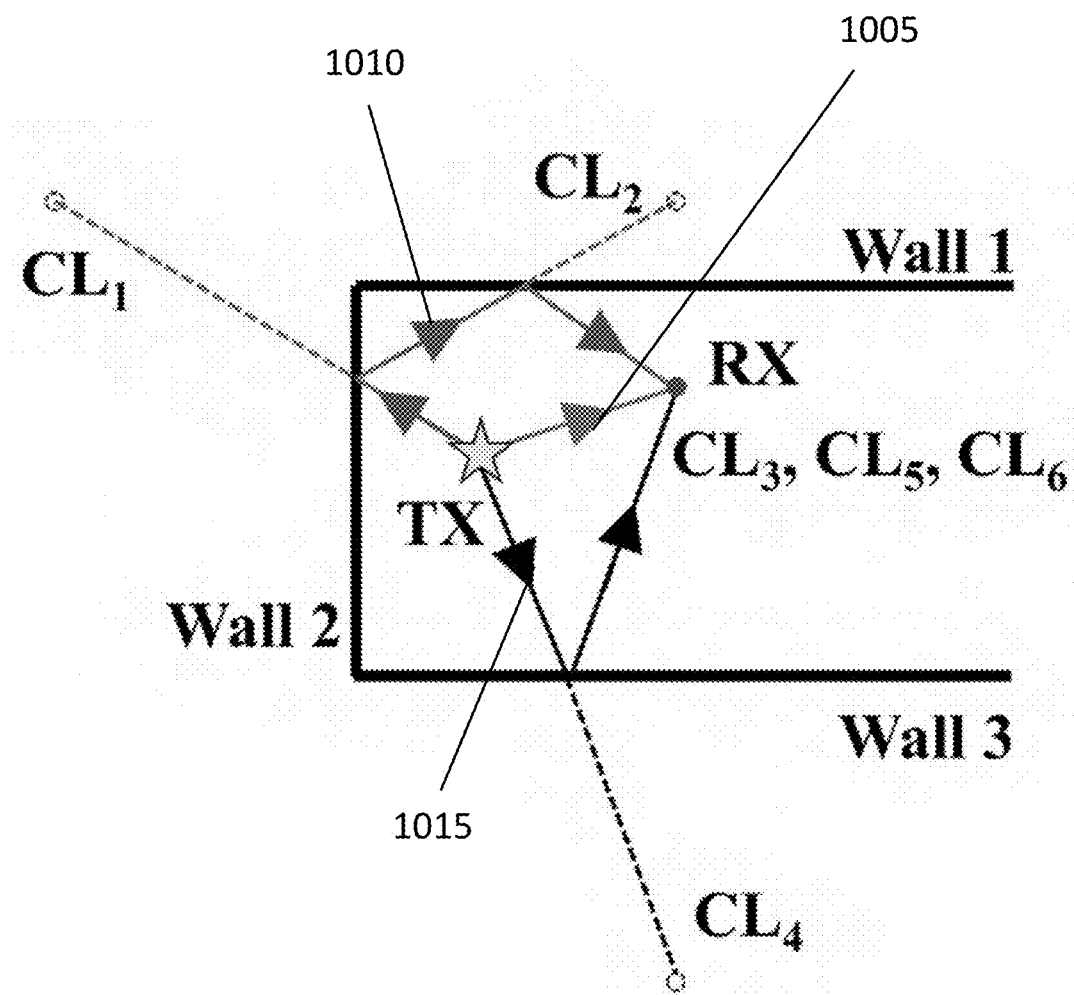
FIG. 10 is an exemplary diagram illustrating three exemplary multipath components that arrive at the user according to an exemplary embodiment of the present disclosure.

FIG. 10 is an exemplary diagram illustrating three multipath components that arrive at the user according to an exemplary embodiment of the present disclosure, which includes all the candidate locations when three multipath components can be received by the user ("RX") from the BS ("TX"). The user's location can correspond to the candidate location identified by the maximum number of multipath components. In particular, as shown in FIG. 10, three multipath components arrive at the user RX; one LOS component 1005 and two NLOS components 1010 and 1015. Of the six candidate locations for the user, based on AoD and ToF measurements at the BS (e.g., $CL_1$-$CL_6$), three candidate locations (e.g., $CL_3$, $CL_5$, $CL_6$) correspond to the actual location of the user. The position of the user is estimated to be the modal candidate location (e.g., $CL_3$, $CL_5$, $CL_6$).

Errors in ToF measurements can cause the BS to incorrectly estimate the path length to the user. Due to inaccurate AoD measurements, the BS may incorrectly estimate the user's bearing. As a result, a candidate locations estimated by MAP-AT using imprecise ToF and AoD information may not coincide with the user's true location. However, it can be likely that the candidate locations can be close to the user's true location, and thus close to one-another. MAP-AT can be modified to first group the candidate locations that can be close to one another (e.g., at a distance of up to d=40 cm, where d can be a tunable parameter) to form candidate location clusters. The user position can be estimated to be the centroid of the candidate location group with maximal members.

MAP-AT can be generalized to use multiple BSs. Exemplary candidate locations can be determined, corresponding to all the multipath components received by the user from all BSs. MAP-AT can then proceeds in a similar fashion to the case when only one BS was utilized, by finding the candidate location identified by the maximum number of multipath components.

Exemplary Configuration-II—User in the Transmission Mode

In configuration-II, the user transmits a known signal to the BS. The BS can calculate the AoA of each multipath signal that reach the BS. The ToF of the each multipath component from the user arriving at the BS can either be estimated via the round trip time of the multipath component or the one-way propagation time. If the ToF can be estimated via round-trip time, the BS does not need to send the ToF of the multipath components to the user via a feedback channel. Additionally, an exemplary synchronization between the user and the BS may not be needed. The BS may only need to send the AoA of each multipath component to the user.

Candidate locations of the RX can be found analogously to configuration-I above. The user's location can correspond to the candidate location identified by the maximum number of multipath components.

Exemplary Simulations and Results

Simulations of localization using MAP-AT were conducted at 73 GHz by synthesizing ToF and AoD measurements at 30 TR combinations via NYURay, of which 20 were in NLOS and 10 were in LOS. The BS and user locations chosen taken from the previous indoor propagation measurement campaign conducted at the NYU WIRELESS research center on the 9th floor of 2 MetroTech Center in downtown Brooklyn, N.Y. (See, e.g., Reference 21). The research center is a typical large office, with cubicles, walls made of drywalls and windows. FIG. 8 shows an exemplary map illustrating a floor for testing the exemplary system, method and computer-accessible medium according to an exemplary embodiment of the present disclosure. Since localization accuracy may not depend on the user configuration (e.g., in configuration I or II), without loss of generality, configuration-I was chosen to analyze the performance of the exemplary positioning procedure.

The position of each user was determined using a single BS. To make the simulations realistic, zero mean Gaussian noise with standard deviation $\sigma_{AoD}=0.5°$ was added to the AoD measurements. Three difference levels of Gaussian noise were added to ToF measurements. The standard deviation $\sigma_{ToF}$ was set to about 0.25 ns, about 0.5 ns and about 1 ns. The positioning error for each user was defined to be equal to the 3-D Euclidean distance between the position estimate and the true position of the user. The rms positioning error for each user was calculated over 100 simulations at all three ToF measurement noise levels.

TABLE I

Performance of the map-assisted localization procedure for different TR separation distances in LOS and NLOS environments.

| TX-RX distance | Env. | Number of Users | Mean Localization error (cm) |
|---|---|---|---|
| <10 m | LOS | 9 | 4.1 |
|  | NLOS | 16 | 18.8 |
| 10-20 m | LOS | 1 | 9.4 |
|  | NLOS | 4 | 16.6 |
| (all) | LOS | 10 | 4.6 |
|  | NLOS | 20 | 18.3 |

TABLE II

Performance of the map-assisted localization procedure with more than one BS.

| BS-User Link Type | Number of Users | Mean Localization Error (cm) |
|---|---|---|
| 1 LOS, 1 NLOS | 9 | 4.6 |
| 2 NLOS | 17 | 9.6 |
| 1 LOS, 2 NLOS | 6 | 4.8 |
| 3 NLOS | 6 | 5.6 |

Exemplary Localization Performance with One BS

With noise levels of $\sigma_{AoD}=0.5°$ and $\sigma_{ToF}=0.25$ ns, the mean rms positioning error was about 4.6 cm in LOS conditions and about 18.3 cm in NLOS conditions, over a total of 30 user locations. Table I above illustrates how the localization error varies with TR separation distance in LOS and NLOS environments. Increasing $\sigma_{ToF}$ to 1 ns degraded the performance of the procedure. Despite the two outliers with rms localization errors of about 1.9 m and about 3.5 m, the median localization accuracy was about 17.5 cm, with a mean localization error of about 38.7 cm.

Exemplary Localization Performance with Multiple BSs

Of the 30 user locations previously considered, 26 locations were within the range of at least two BS. 12 user locations were within the range of three BSs. The performance of the map-assisted localization procedure with more than one BS is summarized in Table II above. For the users not in LOS of any BS, increasing the number of BSs used for localization can facilitate a reduction in the localization error. When one BS can be used to localize a NLOS user, an average localization error of about 19.2 cm can be achieved. With two and three BSs, the localization error dropped to about 9.6 cm and about 5.6 cm respectively. The localization error for users in LOS remains constant (e.g., <5 cm).

Figure 11:
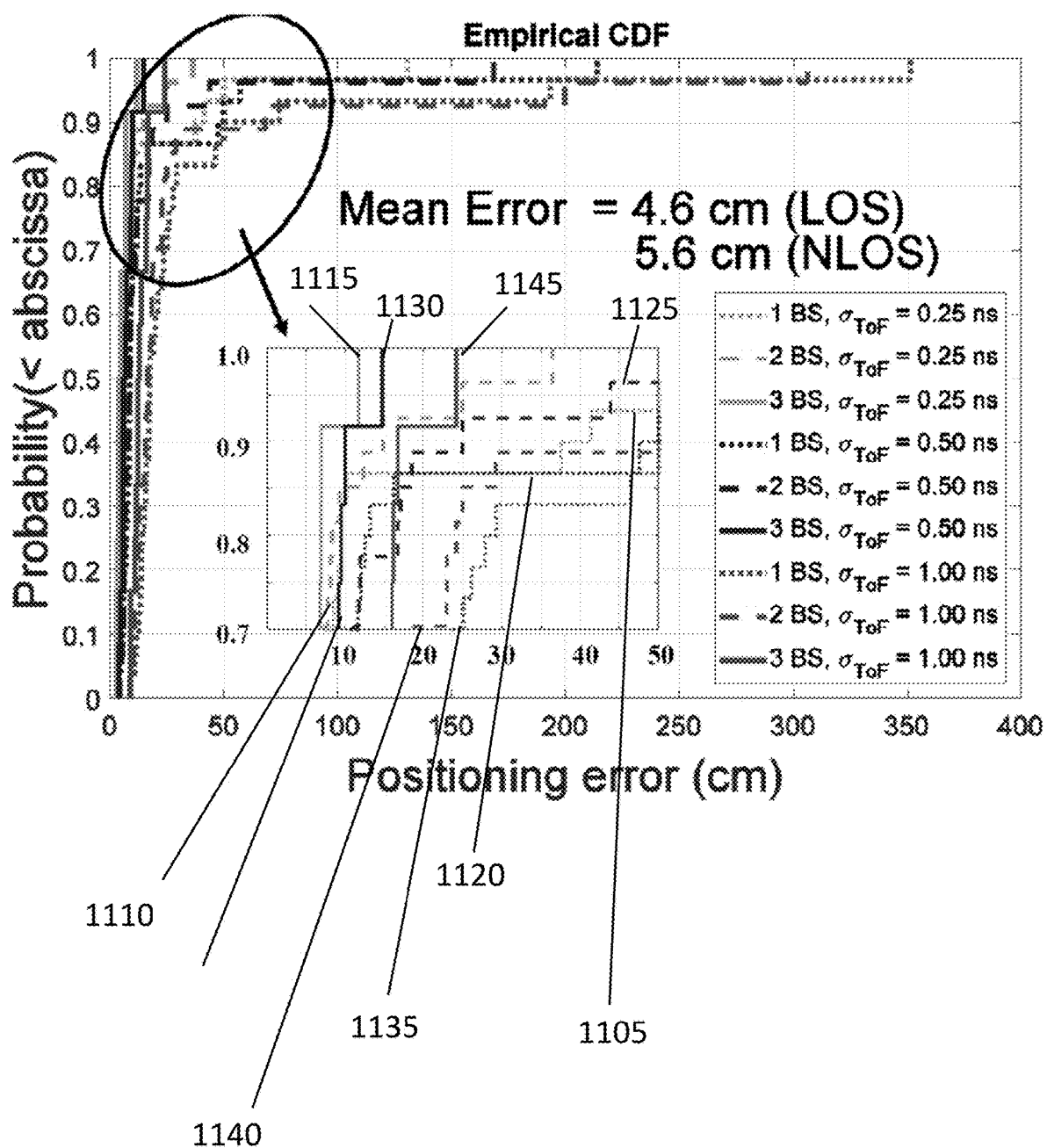
FIG. 11 is an exemplary graph illustrating exemplary cumulative density functions of the positioning error according to an exemplary embodiment of the present disclosure.

The cumulative density functions ("CDFs") of the positioning errors, with one, two, and three BSs are shown in FIG. 11. In particular, FIG. 11 shows an exemplary graph illustrating the cumulative density functions of the positioning error when a user is localized using one BS (e.g., elements 1105, 1120 and 1135), two BSs (e.g., element 1110, 1125 and 1140) and three BSs (e.g., elements 1115, 1130 and 1145), with $\sigma_{AoD}=0.5°$ according to an exemplary embodiment of the present disclosure. For example, When a single BS can be used, the rms errors were about 3.5 m and about 1.9 m for two outlier user locations. However, when three BSs were utilized, all users were localized to within about 25 cm.

The exemplary system, method and computer-accessible medium, according to an exemplary embodiment of the present disclosure, can include MAP-AT for map-assisted data fusion of AoD and ToF information, to provide centimeter-level localization. A 3-D map of the environment (generated on-the-fly by the user or downloaded a-priori), in concert with AoD and ToF information can be used to predict the propagation path of multipath components received by the user. MAP-AT was tested using NYURay, a 3-D ray tracer developed herein. The ray tracer was calibrated based on real-world measurements conducted at 28 and 73 GHz, (see, e.g., Reference 21), and predicted the received power accurately to within 6.5 dB. Based on simulations conducted at 30 RX locations corresponding to the real world measurement locations in, (see, e.g., Reference 21), a mean localization accuracy of 4.6 cm in LOS and 18.8 cm in NLOS was achieved in a typical large office environment using a single BS per user, with TR separation distances varying from 3 m to 14.5 m. By using three BSs, the localization error for LOS users remained the same while the localization error for NLOS users dropped to 5.6 cm.

Indoor Wireless Channel Properties at Millimeter Wave and Sub-Terahertz Frequencies: Reflection, Scattering, and Path Loss The use of 5G millimeter wave ("mmWave") wireless communications provides multi-Gbps data rates. In March 2019, the Federal Communications Commission ("FCC") voted to open up spectrum above 95 GHz for the first time ever in the USA to encourage the development of new communication technologies and expedite the deployment of new services (see, e.g., Reference 35), and provided 21.2 GHz of spectrum for unlicensed use. This ruling provides a partially harmonized unlicensed band at 120 GHz with Japan. (See, e.g., References 36 and 37). The Institute of Electrical and Electronics Engineers ("IEEE") formed the IEEE 802.15.3d (see, e.g., Reference 38) task force in 2017 for global Wi-Fi use at frequencies across 252 GHz to 325 GHz, creating the first worldwide wireless communications standard for the 250-350 GHz frequency range, with a nominal PHY data rate of 100 Gbps and channel bandwidths from 2 GHz to 70 GHz. (See, e.g., Reference 38). The use cases for IEEE 802.15.3d include kiosk downloading (see, e.g., Reference 39), intra-device radio communication (see, e.g., Reference 40), connectivity in data centers, and wireless fiber for fronthaul and backhaul. (See, e.g., References 38, 41 and 42).

Maximum transmission rates of several tens of Gbps for line of sight ("LOS") and several Gbps for non-LOS ("NLOS") paths were shown to be achievable at about 300-350 GHz. (See, e.g., References 49 and 50). It has been shown that Tbps throughput was achievable in the frequency range from about 260 GHz to about 400 GHz for LOS links shorter than a meter. (See, e.g., Reference 51). However, robust beamforming procedures can be utilized in Terahertz band communications. (See, e.g., References 51 and 52).

At mmWave and Terahertz ("THz") frequencies, the wavelength becomes comparable to the surface roughness of many objects, which indicates that scattering may not be neglected as it can be compared to reflection and diffraction at microwave frequencies (e.g., from 300 MHz to 3 GHz). (See, e.g., Reference 53).

Measurements at 100, 200, 300, and 400 GHz using a 1 GHz RF bandwidth channel sounder showed that both indoor LOS and NLOS (e.g., specular reflection from interior building walls) links can provide a data rate of 1 Gbps. (See, e.g., Reference 54). Signals with larger incident angles were shown to experience less loss due to the combined effects of reflection, absorption, and scattering. The scattering loss of bare cinderblock walls at 400 GHz was shown to be negligible. (See, e.g., Reference 54). It has been shown that a radio signal at about 140 GHz can pass through an about 15 cm thick partition wall with a penetration loss of less than about 15 dB. (See, e.g., Reference 55).

TABLE III

Summary of channel sounder systems and antennas used in measurements at 28 GHz, 73 GHz and 142 GHz. (See, e.g., References 47, 55 and 56).

| RF Frequency (GHz) | RF BW (GHz) | Antenna HPBW | Antenna Gain (dBi) | XPD (dB) |
|---|---|---|---|---|
| 28 | 1 | 30°/10° | 15.0/24.5 | 19.30 |
| 73 | 1 | 15°/7° | 20.0/27.0 | 28.94 |
| 142 | 1 | 8° | 27.0 | 44.18 |

Exemplary Scattering and Reflection Measurements at 28, 73, And 142 GHz

Figure 15:
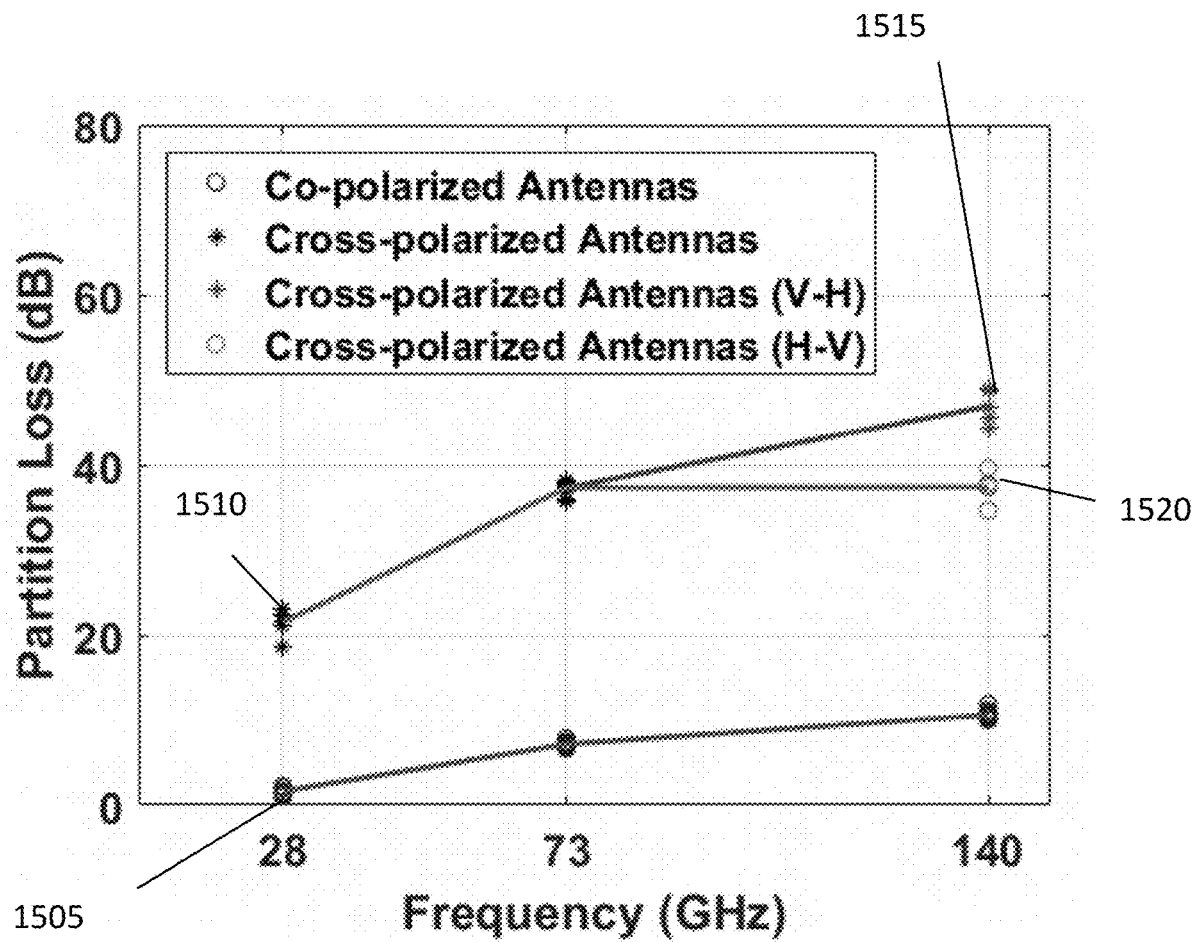
FIG. 15 is an exemplary graph illustrating exemplary partition loss measurement results of clear glass according to an exemplary embodiment of the present disclosure.

Verification and calibration can be beneficial for accurate measurements and reliable data. (See, e.g., Reference 57). 28, 73, and 142 GHz FSPL verification measurements were conducted at transmitter-to-receiver ("TR") separation distances of 1, 2, 3, 4, and 5 m using an exemplary calibration and verification procedure (see, e.g., Reference 57), and the results after subtracting out antenna gains are shown in FIG. 15. (See, e.g., Reference 55). The specifications of the channel sounder systems at all three frequencies are summarized in Table III above. The measured path losses at 28, 73, and 142 GHz agree with Friis' FSPL equation (see, e.g., Reference 58), which validates the channel sounder systems work well at all three frequencies.

Exemplary Measurements Setup

There can be differences between microwave and mmWave frequencies (e.g., 1.7 GHz vs. 60 GHz) (see, e.g., Reference 59), with variation of the electrical parameters (e.g., reflection coefficient, conductivity, etc.) of the building materials with frequencies. The permittivity ($\epsilon_r$) of drywall was measured to be 2.4 at 3 GHz. (See, e.g., Reference 60).

Figure 12:
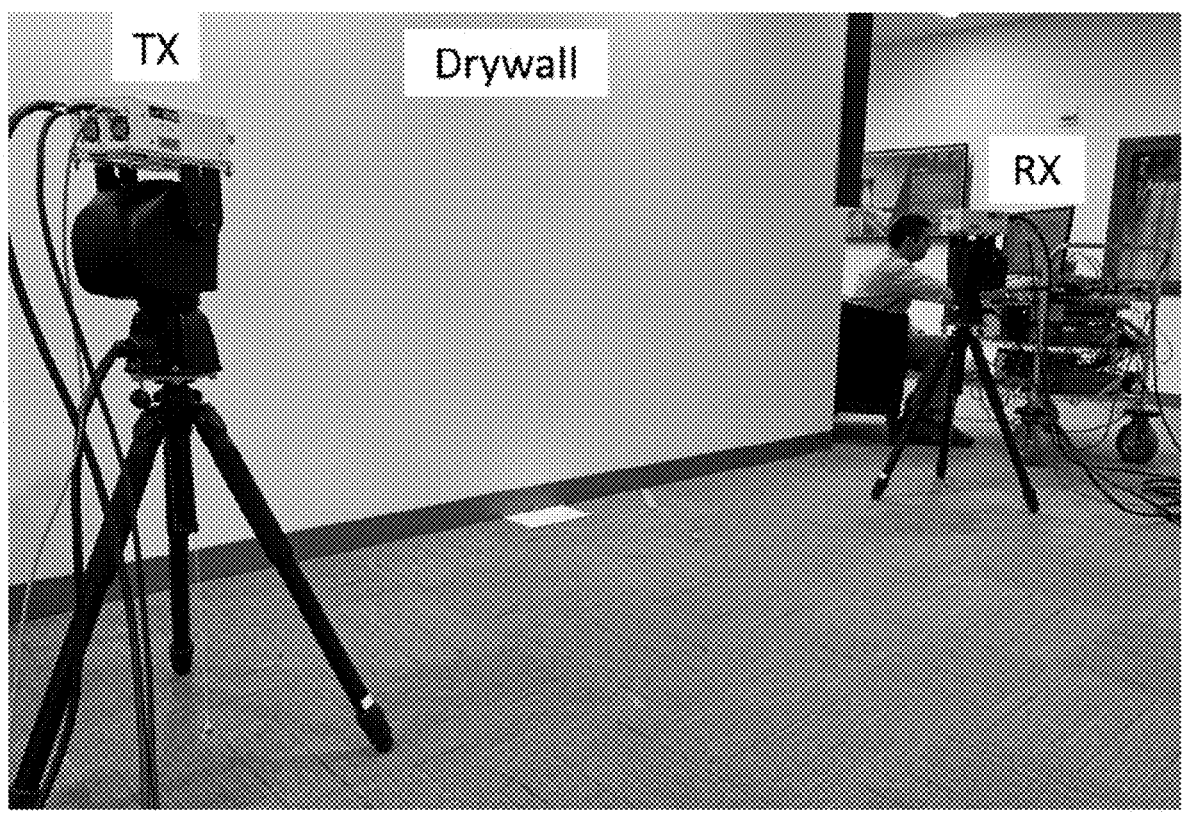
FIG. 12 is an exemplary image of an exemplary reflection/scattering measurement implementation according to an exemplary embodiment of the present disclosure.

FIG. 12 shows an exemplary image of an exemplary reflection/scattering measurement implementation of drywall at 28, 73, and 140 GHz according to an exemplary embodiment of the present disclosure. During the measurements, the heights of both TX and RX were set at 1.2 m to make sure there was no ground/ceiling bounces happening within, or just outside, the half power beam width ("HPBW") of the main lobe of the TX/RX antennas. The TX and RX were placed on an arc with a radius of 1.5 m (e.g., which can be greater than the Fraunhofer distance) to ensure the propagation can be in far field. (See, e.g., Reference 57). Narrow beam horn antennas (e.g., vertically polarized) with HPBWs of 10°, 7°, and 8°, which help to provide high angular resolution, were used at both the TX and RX at 28, 73 and 142 GHz, respectively. Exemplary incident angles of $\theta_i=10°$, 30°, 60°, 80° (e.g., with respect to the normal) were chosen to measure the reflected and scattered power off drywall, with the incident angle varying from small angles (e.g., close to the normal) to large angles (e.g., close to grazing). The received power was measured in the plane of the incident ray and the normal of the surface from 10° to 170° in 10°/step (e.g., the received power at 0° and 180° could not be measured due to the physical size of the antenna).

Exemplary Reflection at mmWave and THz

The Fresnel reflection coefficient $\Gamma_\perp$ (e.g., when the E-field can be normal to the plane of incidence) can be given by, for example:

$$\Gamma_\perp = \frac{E_r}{E_i} = \frac{\cos\theta_i - \sqrt{\epsilon_r - \sin^2\theta_i}}{\cos\theta_i + \sqrt{\epsilon_r - \sin^2\theta_i}}, \quad (3)$$

where $E_r$ and $E_i$ can be the electric fields of the reflected wave and the incident wave with units of V/m respectively, $\epsilon_r$ can be the permittivity of the reflecting surface, and the incident angle $\theta_i$ can be defined as the angle between the incident direction and normal. (See, e.g., Reference 61).

Figure 13A:
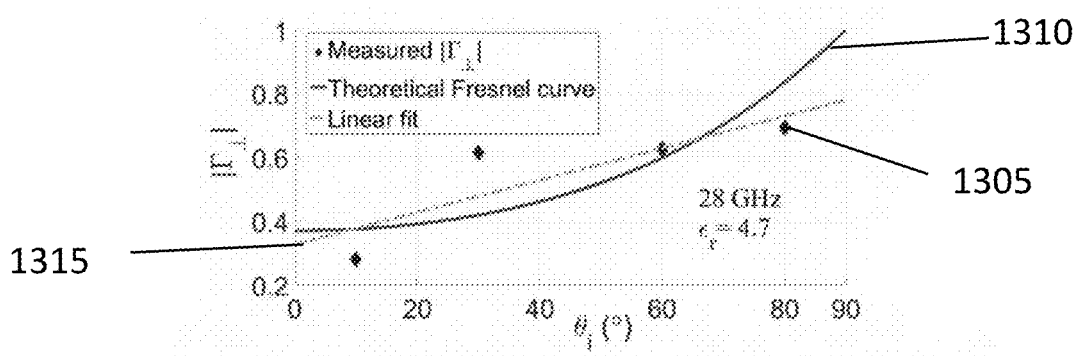
FIGS. 13A-13F are exemplary graphs illustrating comparisons between measurements and a dual-lobe directive scattering model according to an exemplary embodiment of the present disclosure.
Figure 13C:
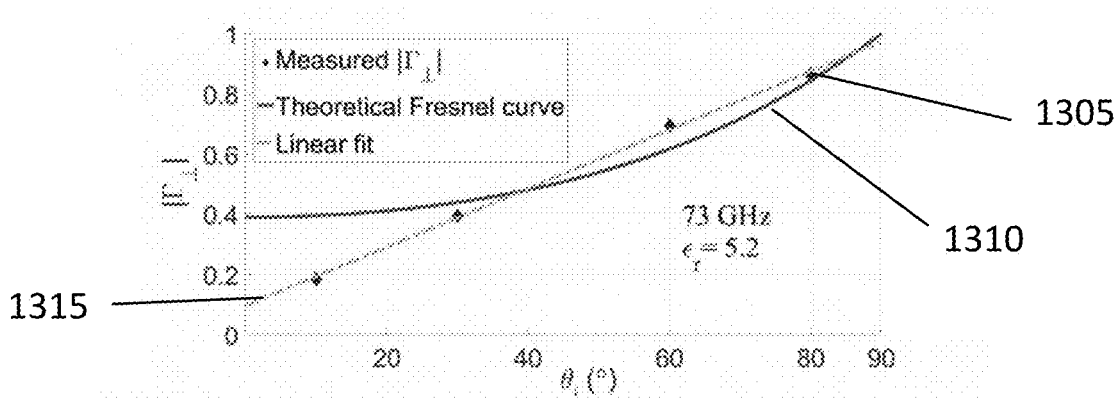
Figure 13E:
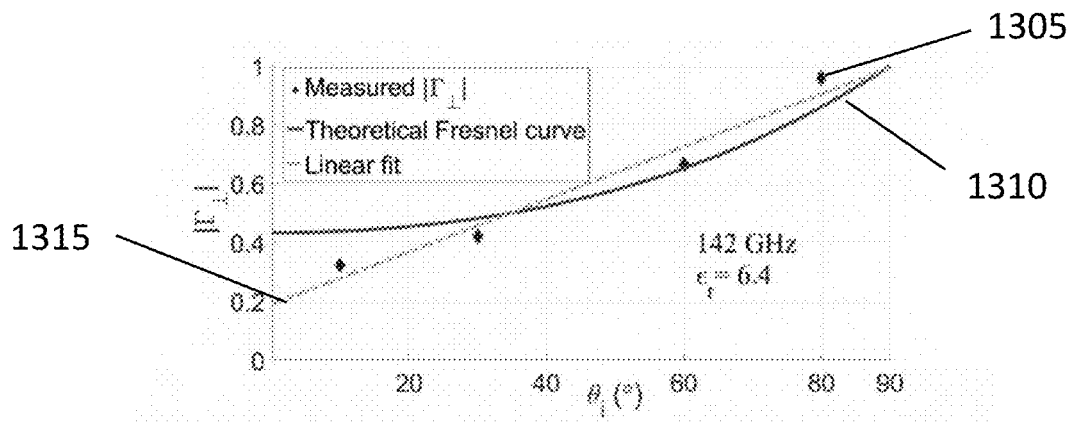

Based on the measured data shown in Table IV and Fresnel's Eq. (3), $\epsilon_r$=4.7, 5.2, and 6.4 was obtained through a minimum mean square error ("MMSE") estimator of $|\Gamma_\perp|^2$ at 28, 73, and 142 GHz, respectively. As shown in the graphs of FIGS. 13A, 13C, and 13E, the diamond points 1305 indicate the magnitude of the measured reflection coefficients $|\Gamma_\perp|$ and lines 1310 are the theoretical Fresnel curve through MMSE estimation. Additionally, a linear fit (e.g., lines 1315) of the magnitude of reflection coefficient with the incident angle in degrees performs better than the Fresnel equation at these three frequencies. Table IV below shows that the reflection loss at 142 GHz ranges from 0.36 dB, when the incident angle can be close to grazing (e.g., $\theta_i$=80°), to 9.81 dB when the incident direction can be nearly perpendicular to the surface of drywall (e.g., $\theta_i$=10°), and the reflection loss linearly decreases as the incident angles $\theta_i$ increases. It can be observed that reflections can be stronger at higher frequencies (e.g., the permittivity $\epsilon_r$ can be smaller at lower frequencies).

TABLE IV

Reflection Loss vs. frequencies & angles

| | $\theta_i$ | | | |
|---|---|---|---|---|
| F | 10° | 30° | 60° | 80° |
| 28 GHz | −12.98 dB | −4.22 dB | −4.06 dB | −3.18 dB |
| 73 GHz | −12.65 dB | −8.08 dB | −3.16 dB | −1.28 dB |
| 140 GHz | −9.81 dB | −7.53 dB | −3.54 dB | −0.36 dB |

Exemplary Scattering at mmWave and THz

Figure 13B:
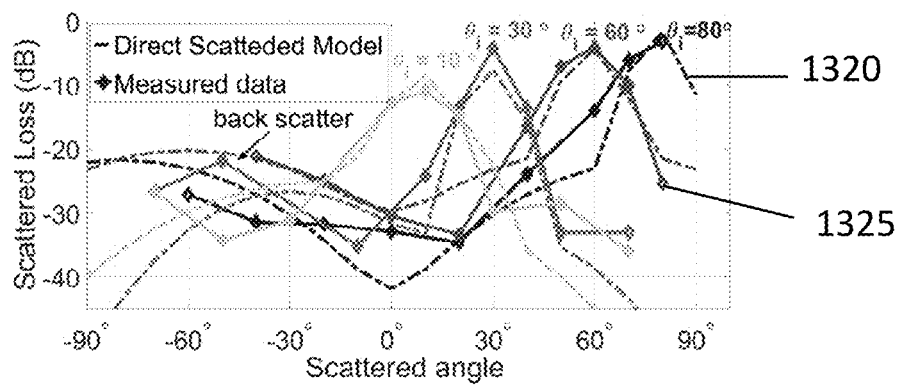
Figure 13D:
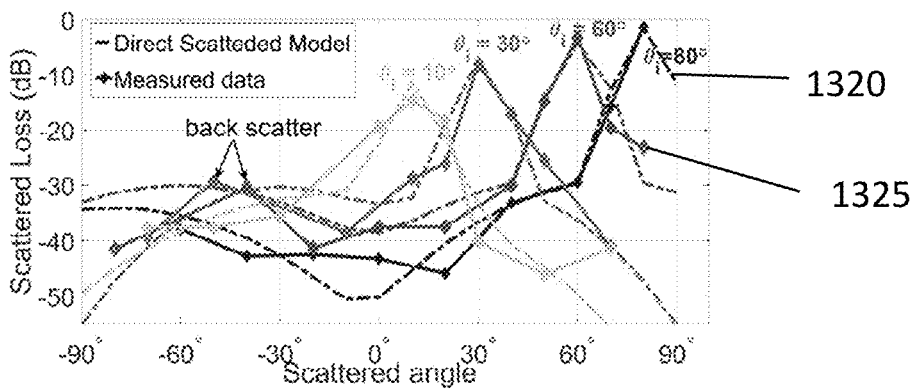
Figure 13F:
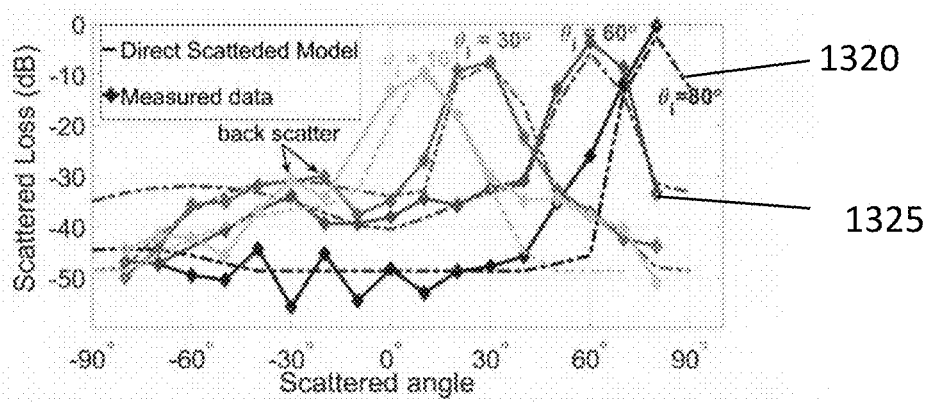

Measured scattering patterns of different incident angles at 28, 73, and 142 GHz are shown in graphs of FIGS. 13B, 13D and 13F, respectively, which illustrates the measured data 1320 and the direct scattered model 1325. The peak measured power (e.g., scattered power plus reflected power) was observed to occur at the specular reflection angle. The peak measured power was greater at larger incident angles than at smaller incident angles (e.g., 9.4 dB difference between 80° and 10° at 142 GHz), where most of the energy can be due to reflection but not scattering. At all angles of incidence, measured power was within 10 dB below the peak power in a ±10° angle range of the specular reflection angle, likely a function of antenna patterns. In addition, backscattered power was observed (e.g., 10° and 30° incidence at 142 GHz) but was more than 20 dB below the peak received power, which means that the surface of drywall can still be consider to be smooth even at 142 GHz and the specular reflection can be the main mechanism for indoor propagation at 142 GHz.

Comparisons between measurements and predictions made by a dual-lobe directive scattering ("DS") model TX incident angle $\theta_i$=10°, 30°, 60°, and 80° are shown in the graphs of FIGS. 13B, 13D, and 13F. (See, e.g., References 53 and 62). Permittivity $E_r$=4.7, 5.2, and 6.4 estimated from the reflection measurements using (e.g., Eq. (3)), can be used in the exemplary dual-lobe DS model at 28, 73, and 142 GHz, respectively. It can be seen that simulations of peak received power (e.g., the sum of reflection and scattering) at the specular reflection angle agrees well with measured data (e.g., within 3 dB), confirming that scattering can be modeled approximately by a smooth reflector with some loss (see, e.g., Reference 53), when material properties can be known, while scattering at other scattering angles falls off rapidly.

Exemplary Partition Loss Measurements at 28, 73, And 140 GHz

In addition to reflection and scattering, transmission (e.g., penetration) can be a beneficial mechanism for wireless communication systems at mmWave and THz frequencies. Partition loss can be defined as the difference between signal power right before the partition and the signal power right after the partition (see, e.g., References 63 and 64), which can include reflection/scattering loss and the material absorption loss. The partition loss can indicate the how the signal power can change after a partition in the radio link. Wideband mmWave and Terahertz networks, as well as precise ray-tracer procedures, can benefit from accurate channel models that can predict the partition loss induced by common building objects. (See, e.g., References 57, 65 and 66). Therefore, partition loss of common building materials can be examined for 5G mmWave wireless systems and future Terahertz wireless communications in and around buildings.

Exemplary Partition Loss Measurements

Partition loss measurements at about 2.5 and about 60 GHz of a variety of materials like drywall, office whiteboard, clear glass, mesh glass, using a wideband channel sounder with vertically polarized antennas at both TX and RX can be determined. (See, e.g., Reference 63). The root mean square ("RMS") delay spreads were found to be much lower at 60 GHz than that at 2.5 GHz. Based on the measured data, an exemplary partition-based path loss model, which provided fast and accurate link budget predictions in a multipath-rich environment, can be utilized. (See, e.g., References 63, 64 and 67). Partition loss measurements at 73 GHz for vertical-to-vertical (e.g., V-V) and vertical-to-horizontal (e.g., V-H) polarization configurations of glass doors, drywall, steel doors, and clear glass were obtained. (See, e.g., Reference 68). The partition loss of glass doors and windows was found to be 5-7 dB. Steel doors induced a partition loss as large as 40-50 dB. Different materials can be properly selected for propagation or interference isolation between neighboring rooms. (See, e.g., References 55, 57 and 68).

The effective attenuation of typical building materials such as concrete bricks, wood, tiles, and a gypsum plate was measured at 94 GHz with the TX and RX boresight-aligned. (See, e.g., Reference 69). The co-polarization configurations (e.g., both TX and RX were vertically or horizontally polarized) were analyzed, and the effective attenuation of most of the building materials was observed to be polarization sensitive. (See, e.g., Reference 69).

Penetration loss measurements of concrete walls and plasterboard walls over the frequency range of 900 MHz to 18 GHz, and the penetration loss was shown to not necessarily increase monotonically with respect to frequency. (See, e.g., Reference 70).

A comparison of measured partition loss versus frequency for a variety of different common building materials can be analyzed. (See, e.g., Reference 71). An 8-inch concrete wall had a typical partition loss of 2 to 4 dB at 900 MHz for both V-V and horizontal-to-horizontal (e.g., H-H) antenna configurations. The attenuation through solid wood, having a thickness of 2 cm, was measured to be about 5 dB and 8 dB at 45 GHz for the H-H and V-V antenna configurations, respectively, while the attenuation through a concrete slab having a thickness of 3 cm was measured to be about 13 dB at 45 GHz for both H-H and V-V antenna configurations. (See, e.g., Reference 72). Penetration losses of plastic board, paper, and glass in Terahertz band (e.g., 100 GHz-10 THz) were shown to have losses of 12.47 dB/cm, 15.82 dB/cm, and 35.99 dB/cm respectively. (See, e.g., Reference 73). However, the measurements were conducted in a very short range (e.g., less than 10 cm) and the thicknesses of sample materials were less than 1 cm which can cause large uncertainty or error. (See, e.g., Reference 73).

Exemplary absorption coefficients of glass, medium density fiberboard, and plexiglass were measured where the $S_{21}$ parameter was recorded at a T-R separation distance of 10 cm with and without the obstructions brought into the ray path, showing that a 2.5 cm thick window and a 3.5 cm thick fiberboard door can induce an exemplary absorption attenuation of approximately 65.5 dB and 86.7 dB at 300 GHz, respectively. (See, e.g., Reference 49).

Exemplary Antenna XPD Measurements

In order to measure the partition loss of a material for different polarizations, the antenna cross polarization discrimination ("XPD") at different frequencies was measured to analyze the electrical properties of the antennas. XPD can aid in analyzing also the polarization effects of partitions at different frequencies.

The XPD measurements were conducted at 28, 73, and 142 GHz in LOS free space with T-R separation distances in the far-field (e.g., 3-5 m were chosen) while ensuring the TX and RX antennas can be perfectly boresight aligned. There were no nearby reflectors or obstructions present in the propagation path that may cause multipath reflections or induce fading during the measurements, and the heights of the antennas and the T-R separation distances between the antennas were selected to ensure ground bounces and ceiling bounces do not induce reflection, scattering, or diffraction within or just outside the HPBW of the main lobe of the TX/RX antenna patterns. After free space power measurements with co-polarized antennas, measurements were then conducted at the same distances but with cross-polarized antennas (e.g., V-H and H-V). Cross-polarization was reformed by using a waveguide twist which can rotate the antenna by 90°. The insertion loss caused by the twist was measured and calibrated out. The detailed measurement guidelines and procedures were obtained. (See, e.g., Reference 57).

Figure 14:
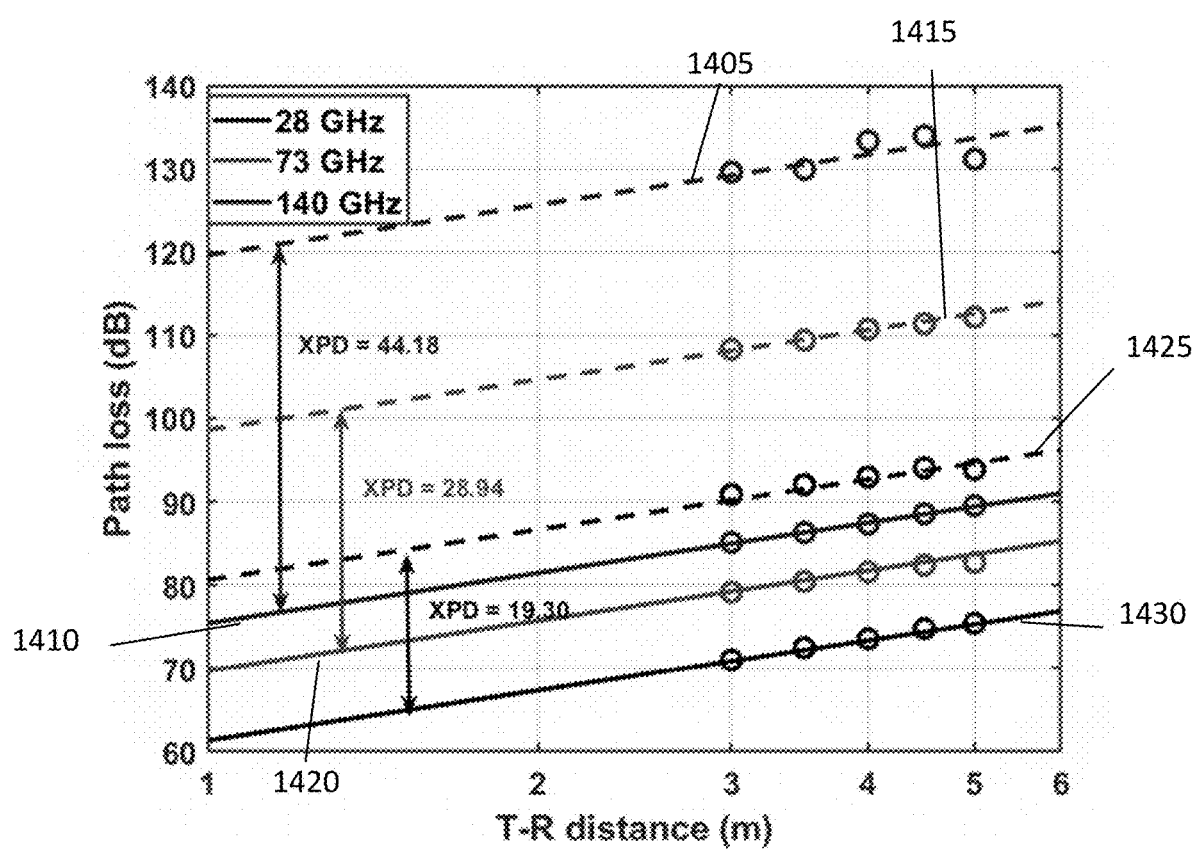
FIG. 14 is an exemplary graph illustrating an exemplary measured antenna cross polarization discrimination according to an exemplary embodiment of the present disclosure.

FIG. 14 shows an exemplary graph illustrating an exemplary measured antenna cross polarization discrimination according to an exemplary embodiment of the present disclosure. In particular, FIG. 14 shows the measured antenna XPD at 28 GHz (e.g., lines 1405 and 1410), 73 GHz (e.g., lines 1415 and 1420), and 140 GHz (e.g., lines 1425 and 1430). The solid lines (e.g., lines 1410, 1420 and 1430) and the dash lines (e.g., lines 1405, 1415 and 1425) represent the path loss measured with co-polarized and cross-polarized antennas, respectively. The XPD values calculated across five distances are within 1 dB at each frequency, which verifies the XPD measurement procedure is correct. The XPD was calculated by taking the difference between the path losses of the co-polarized and cross-polarized antenna configurations at same distances. A summary of the XPD values measured is provided in Table III. Note that, at a fixed TR separation distance, the free space received powers for the H-H and H-V configurations were within 1 dB of the V-V and V-H received powers respectively, and this difference can be calibrated out during post processing.

TABLE V

Partition Loss Measurement Results at 28, 73, and 140 GHz for Clear Glass

| Pol. | 28 GHz Mean [dB] | 28 GHz STD [dB] | 73 GHz Mean [dB] | 73 GHz STD [dB] | 140 GHz Mean [dB] | 140 GHz STD [dB] |
|---|---|---|---|---|---|---|
| V-V | 1.53 | 0.60 | 7.17 | 0.17 | 10.22 | 0.22 |
| V-H | 20.63 | 1.32 | 37.65 | 0.53 | 46.92 | 2.05 |
| H-V | 22.25 | 0.88 | 36.92 | 1.11 | 37.37 | 1.79 |
| H-H | 1.48 | 0.54 | 7.15 | 0.44 | 10.43 | 0.55 |

TABLE VI

Partition Loss Measurement Results at 28, 73, and 140 GHz for Drywall

| Pol. | 28 GHz Mean [dB] | 28 GHz STD [dB] | 73 GHz Mean [dB] | 73 GHz STD [dB] | 140 GHz Mean [dB] | 140 GHz STD [dB] |
|---|---|---|---|---|---|---|
| V-V | 4.15 | 0.59 | 2.57 | 0.61 | 8.46 | 1.22 |
| V-H | 25.59 | 2.85 | 24.97 | 0.58 | 27.28 | 1.77 |
| H-V | 25.81 | 0.65 | 23.38 | 0.65 | 26.00 | 1.42 |
| H-H | 3.31 | 1.13 | 3.17 | 0.68 | 9.31 | 0.61 |

TABLE VII

Partition Loss of Common Indoor Materials

| Material | Thickness (cm) | Attenuation (dB) | std (dB) | Frequency | Polarization | Ref. |
|---|---|---|---|---|---|---|
| Drywall | 2.5 | 5.4 | 2.1 | 2.5 GHz | V-V | (See, e.g., Reference 147). |
|  | 2.5 | 6.0 | 3.4 | 60 GHz | V-V | (See, e.g., Reference 147). |
|  | 38.1 | 6.8 | — | 28 GHz | V-V | (See, e.g., Reference 145). |
|  | 13.3 | 10.6 | 5.6 | 73 GHz | V-V | (See, e.g., Reference 148). |
|  | 13.3 | 11.7 | 6.2 | 73 GHz | V-H | (See, e.g., Reference 148). |
|  | 14.5 | 15.0 | — | 140 GHz | V-V | (See, e.g., Reference 28). |
| Clear Glass | 0.3 | 6.4 | 1.9 | 2.5 GHz | V-V | (See, e.g., Reference 147). |
|  | 1.2 | 3.9 | — | 28 GHz | V-V | (See, e.g., Reference 145). |
|  | 1.2 | 3.6 | — | 28 GHz | V-V | (See, e.g., Reference 145). |
|  | 0.3 | 3.6 | 2.2 | 60 GHz | V-V | (See, e.g., Reference 147). |
|  | 0.6 | 8.6 | 1.3 | 140 GHz | V-V | (See, e.g., Reference 28). |
|  | 1.3 | 16.2 | — | 140 GHz | V-V | (See, e.g., Reference 28). |
|  | 2.5 | 86.7 | — | 300 GHz | V-V/H-H | (See, e.g., Reference 28). |
|  | 0.16-0.48 | 15-26.5 | — | 0.1-10 THz | V-V | (See, e.g., Reference 149). |
| Steel Door | 5.3 | 52.2 | 4.0 | 73 GHz | V-V | (See, e.g., Reference 148). |
|  | 5.3 | 48.3 | 4.6 | 73 GHz | V-H | (See, e.g., Reference 148). |
| Office Whiteboard | 1.9 | 0.5 | 2.3 | 2.5 GHz | V-V | (See, e.g., Reference 147). |
|  | 1.9 | 9.6 | 1.3 | 60 GHz | V-V | (See, e.g., Reference 147). |
| Heavily reinforced uniform concrete wall | 35.0 | 22.0 | — | 1-4 GHz | V-V | (See, e.g., Reference 150). |
|  | 35.0 | 35.0 | — | 6 GHz | V-V | (See, e.g., Reference 150). |
|  | 35.0 | 64.0 | — | 9 GHz | V-V | (See, e.g., Reference 150). |
| Slightly reinforced uniform concrete wall | 20.3 | 2.0-4.0 | — | 900 MHz | V-V/H-H | (See, e.g., Reference 151). |
|  | 12.0 | 8.0 | — | 1-3 GHz | V-V | (See, e.g., Reference 150). |
|  | 12.0 | 13.0 | — | 3-7 GHz | H-H | (See, e.g., Reference 150). |
|  | 12.0 | 17.0 | — | 5 GHz | V-V | (See, e.g., Reference 150). |
|  | 12.0 | 27.0 | — | 10 GHz | V-V | (See, e.g., Reference 150). |
|  | 12.0 | 32.0 | — | 8-12.0 GHz | H-H | (See, e.g., Reference 150). |
|  | 12.0 | 27.0 | — | 15 GHz | V-V | (See, e.g., Reference 150). |
|  | 12.0 | 23.0 | — | 12-18 GHz | H-H | (See, e.g., Reference 150). |
| Concrete slab | 3.0 | 13.1 | — | 45 GHz | H-H | (See, e.g., Reference 152). |
|  | 3.0 | 13.9 | — | 45 GHz | V-V | (See, e.g., Reference 152). |
| Solid wood | 2.0 | 4.8 | — | 45 GHz | H-H | (See, e.g., Reference 152). |
|  | 2.0 | 8.4 | — | 45 GHz | V-V | (See, e.g., Reference 152). |
|  | 2.0 | 19.0 | — | 100 GHz | H-H | (See, e.g., Reference 153). |
|  | 2.0 | 20.4 | — | 100 GHz | V-V | (See, e.g., Reference 153). |
|  | 4.0 | 41.6 | — | 100 GHz | V-V | (See, e.g., Reference 153). |
|  | 3.5 | 65.5 | — | 300 GHz | V-V/H-H | (See, e.g., Reference 125). |
|  | 0.25-0.75 | 14.0-26.0 | — | 0.1-10 THz | V-V | (See, e.g., Reference 149). |
| Cement tile | 2.5 | 39.5 | — | 100 GHz | H-H | (See, e.g., Reference 153). |
|  | 2.5 | 39.3 | — | 100 GHz | V-V | (See, e.g., Reference 153). |

TABLE VII-continued

Partition Loss of Common Indoor Materials

| Material | Thickness (cm) | Attenuation (dB) | std (dB) | Frequency | Polarization | Ref. |
|---|---|---|---|---|---|---|
| Gypsum board | 1.2 | 3.5 | — | 100 GHz | — | (See, e.g., Reference 153). |
| Plastic | 0.2-1.2 | 8.0-20.0 | — | 0.1-10 THz | — | (See, e.g., Reference 149). |
| Paper | 0.25-1.0 | 12.0-24.0 | — | 0.1-10 THz | — | (See, e.g., Reference 149). |
| Uniform | 12.0 | 4.0 | — | 1-3 GHz | V-V | (See, e.g., Reference 150). |
| plasterboard | 12.0 | 10.0 | — | 5 GHz | V-V | (See, e.g., Reference 150). |
| wall | — | 4.7 | 2.6 | 5.85 GHz | V-V | (See, e.g., Reference 146). |
|  | 12.0 | 6.0 | — | 6-7 GHz | V-V | (See, e.g., Reference 150). |
|  | 12.0 | 18.0 | — | 15 GHz | V-V | (See, e.g., Reference 150). |
|  | 12.0 | 11.0 | — | 18 GHz | V-V | (See, e.g., Reference 150). |

Partition loss measurements at 28, 73, and 140 GHz were conducted using the channel sounder systems summarized in Table III. T-R separation distances of 3, 3.5, 4, 4.5, and 5 m were used, and the TX/RX antenna heights were 1.6 m. (See e.g., FIG. 14). (See, e.g., Reference 57). The separation distances were greater than 5×$D_f$, where $D_f$ can be the Fraunhofer distance to ensure that the measured material can be in the far-field of the TX, and a plane wave can be incident upon the material under test ("MUT"). The dimensions of the MUT were large enough to guarantee that the radiating wavefront from the TX antenna can be illuminated on the material without exceeding the physical dimensions of the MUT. (See, e.g., Reference 57). At each distance, 5 measurements were recorded with slight movement in the order of half a wavelength, taking the average of the power in the first arriving multipath component of the recorded PDPs, to exclude the multipath constructive or destructive effects.

The power that is transmitted through the material and reaches the RX on the other side of the MUT was measured for four types of TX-RX antenna orientation pairs: the V-V orientation, the V-H orientation, the H-V orientation (e.g., the TX can be horizontally polarized while the RX can be vertically polarized), and the H-H orientation.

Common building construction materials, drywall (e.g., with a thickness of 14.5 cm) and clear glass (e.g., with a thickness of 0.6 cm), were selected to be the MUT, with measurement results listed in Table V and Table VI, respectively. The partition losses were measured and calculated as, for example:

$$L_{XY}[dB]=P_{tX}[dBm]-P_{rY}(d)[dBm]-\text{FSPL}(d)[dB], \quad (4)$$

where $L_{XY}$ [dB] can be the material partition loss, X, and Y can be either V or H, corresponding to vertically polarized or horizontally polarized antenna configuration at the link ends, $P_{rY}$ (d) can be the RX received power in dBm at distance d in meters with the MUT between the TX and RX, $P_{tX}$ [dBm] can be the transmitted power from the TX, and FSPL(d)[dB] can be the free space path loss at distance d. (See, e.g., References 57 and 58).

The measured mean partition loss of clear glass at 28 GHz for co-polarized situation (e.g., V-V or H-H), see Table V above, can be about 1.50 dB with a standard deviation ("STD") of about 0.50 dB. The mean partition loss for co-polarized situation (e.g., V-V and H-H) can be about 7.16 dB with a STD of about 0.15 dB at about 73 GHz, and about 10.33 dB with a STD of about 0.24 dB at about 140 GHz. According to the exemplary measurement results, the partition loss of clear glass increases with the frequencies moderately, rising from about 1.50 dB at about 28 GHz to about 10.33 dB at about 140 GHz.

At about 28 and about 73 GHz, the difference of clear glass partition losses in cross-polarization situation (e.g., V-H and H-V) can be negligible. However, at 140 GHz, the mean partition loss of clear glass with V-H configuration can be about 9.55 dB higher than that with H-V configuration, which indicates that the material can have different polarization effects at higher frequencies. It's worth noting that the XPD may not be subtracted from the cross-polarized partition loss measurements shown in Table V and Table VI. Subtracting the XPD can result in a negative value of partition loss due to the polarization coupling effects (e.g., depolarization) of the building materials. FIG. 15 is an exemplary graph illustrating partition loss measurement results of clear glass according to an exemplary embodiment of the present disclosure. In particular, FIG. 15 illustrates how that the partition loss of clear glass with a thickness of 0.6 cm at 28, 73 and 140 GHz for co-polarized antennas 1505, cross-polarized antennas 1510, cross-polarized antennas V-H 1515 and cross-polarized antennas H-V 1520. As shown therein, partition tends to increase with frequencies for both co-polarized and cross-polarized antenna configurations.

Figure 16:
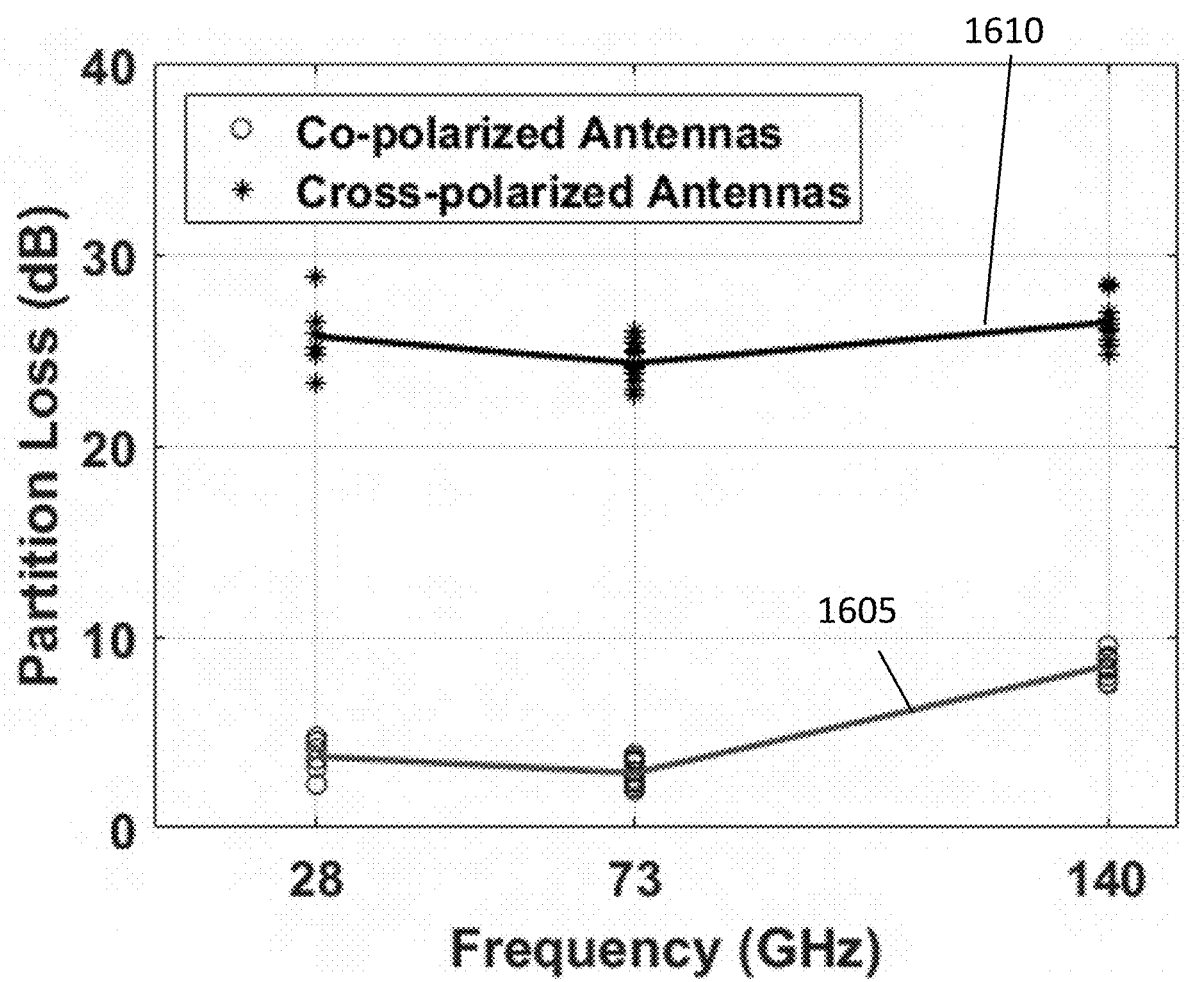
FIG. 16 is an exemplary graph illustrating exemplary partition loss measurement results of drywall according to an exemplary embodiment of the present disclosure.

As shown in the graph of FIG. 16 and Table VI, the mean partition loss of drywall for co-polarization configuration 1605 (e.g., V-V and H-H) was about 3.73 dB at about 28 GHz and about 2.87 dB at about 73 GHz, respectively. However, the mean partition loss increases to about 8.89 dB at about 140 GHz. For cross-polarization configuration 1610 (e.g., H-V or V-H), the mean partition losses of drywall at about 28, about 73 GHz, and about 140 GHz can be about 25.70 dB, about 24.18 dB, and about 26.64 dB, respectively. There can be negligible difference between the partition loss of V-H and H-V configurations. After subtracting the measured XPD values (e.g., as shown in FIG. 14), about 6.40 dB, about −4.76 dB, and about −17.54 dB were obtained, where the negative value means the drywall induce polarization coupling effects (e.g., depolarization) at about 73 and about 140 GHz.

that the exemplary absorption imposed an approximately 8 dB penalty to the reflection power (e.g., nearly 16% of the signal power impinging on the reflection surface can be reflected and about 84% of the power can be absorbed) from an indoor painted cinderblock wall at 100 GHz and the effect of scattering from the painted cinderblock wall can be significantly smaller than the effect of absorption. (See, e.g., Reference 54). The absorption can include the power penetrating through the wall and the power absorbed by the wall. (See, e.g., Reference 54).

Using the predicted permittivity of drywall at about 140 GHz (e.g., $\epsilon_r$=6.4), a reflection loss of about 7.25 dB can be predicted (e.g., approximately 18.8% of the power can be reflected), which can be comparable to the measured reflected power (e.g., approximately 8 dB) (see, e.g., Reference 54), at about 100 GHz. In addition, 14.3% of the incident power can be transmitted through drywall at about 140 GHz (e.g., 8.46 dB partition loss was measured). Thus, there can be about 66.9% (e.g., 100%-18.8%-14.3%) of the power impinging on the surface (e.g., approximately 4.8 dB real absorption loss) was absorbed by drywall at about 140 GHz.

Indoor Propagation Measurements and Path Loss Model at 142 GHz

Wideband indoor propagation measurements at about 140 GHz (see e.g., the specification of the 142 GHz channel sounder system in Table III) were conducted in a multipath-rich indoor environment at the 9th floor of 2 MetroTech Center using the exact same locations as used at previous 28 and 73 GHz, (see, e.g., References 74-76), which can be a typical indoor environment including hallway, meeting rooms, cubical office, laboratory and open area. (See, e.g., Reference 55). The TX antenna were set at 2.5 m near the ceiling (e.g., 2.7 m) to emulate current indoor wireless access points and the RX antennas were set at heights of 1.5 m which can be typical heights of mobile devices. The measurements were conducted with both co-polarized and cross-polarized antennas, and for each TX-RX combination, 3 elevation angles at both TX and RX were chosen (e.g., boresight, up tilted by 8°, and down tilted by 8°, which cover 95% of the total power (see, e.g., Reference 77), and both TX and RX can rotate 360° in azimuth by 8°/step to cover the entire azimuth plane. (See, e.g., Reference 74). Indoor ray tracing procedures were used to assist the measurements and produce simulations together with the measurements to provide an accurate stochastic indoor channel model across different frequencies and various bandwidth. (See, e.g., References 65 and 66). The indoor propagation measurements at 142 GHz were investigated, with results of the directional path loss shown in FIG. 17.

Figure 17:
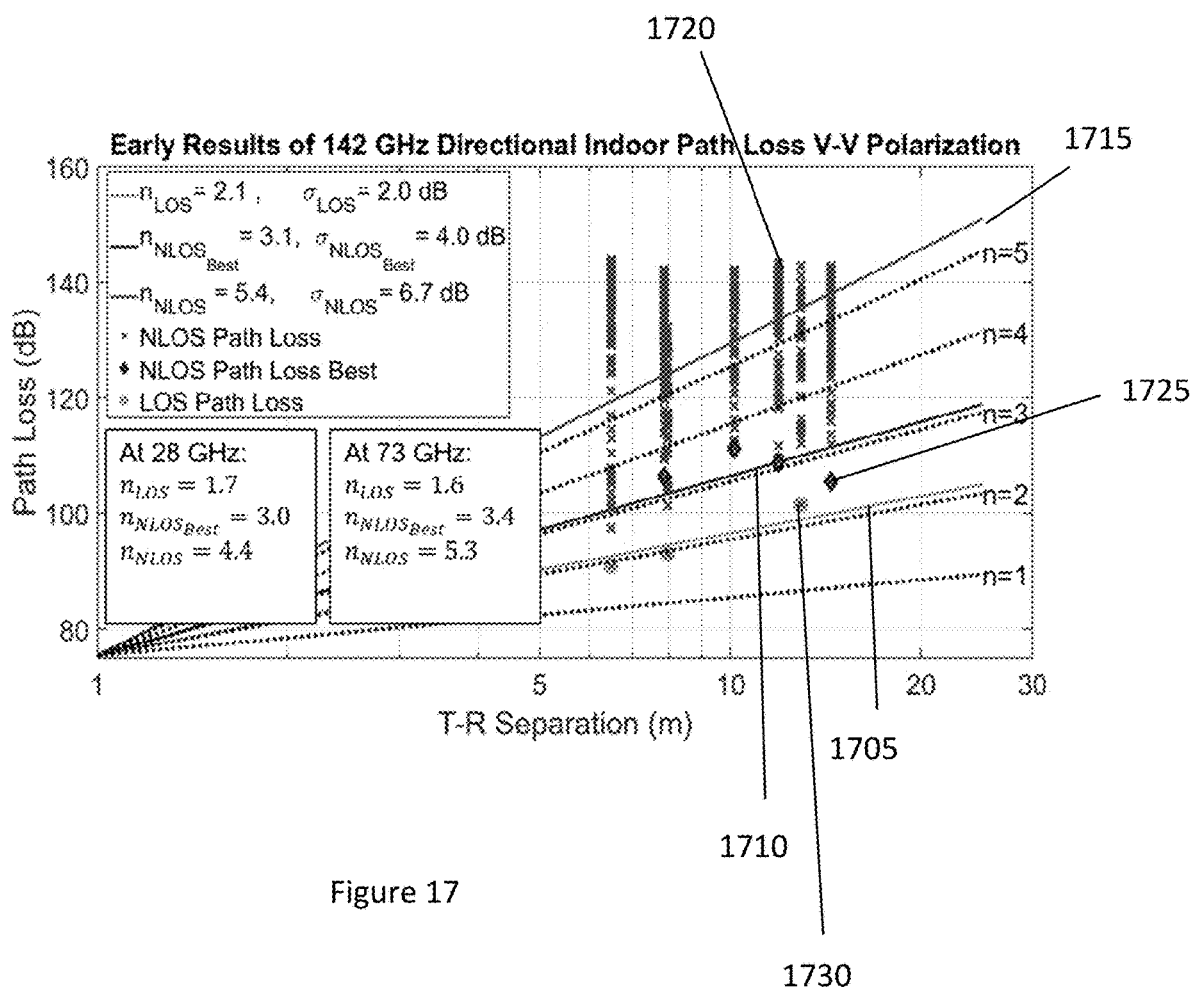
FIG. 17 is an exemplary graph illustrating exemplary 142 GHz directional path loss scatter plot and exemplary indoor directional path loss model for both line of sight and non-line of sight according to an exemplary embodiment of the present disclosure.

FIG. 17 illustrates the directional path loss scatter plot and best fit CI path loss model (see, e.g., References 47 and 74), at 142 GHz for $n_{LOS}$=2.1 (e.g., line 1705), $n_{LOS}$=3.1 (e.g., line 1710) and $n_{LOS}$=5.4 (e.g., line 1715). The LOS path loss exponent ("PLE") was about 1.7 at about 28 GHz, about 1.6 at about 73 GHz, and about 2.1 at about 142 GHz, which can be due to the limited measurement data currently available. The NLOS-Best PLEs and the NLOS PLEs can be similar over all three frequencies, respectively, meaning that the 142 GHz indoor path loss models can be similar as the path loss models at frequencies below 100 GHz. Each circle 1730 represents LOS path loss values, crosses 1720 represent NLOS path loss values measured at arbitrary antenna pointing angles between the TX and RX, and diamonds 1725 represent angles with the lowest path loss measured for each NLOS TX-RX location combination. (See, e.g., Reference 41).

The reflection loss of indoor drywall can be lower at higher frequencies and ranges from about 0.4 dB to about 9.8 dB at about 140 GHz with impinging direction from nearly perpendicular to reflection surface (e.g., 10°) to grazing (e.g., 80°). The dual-lobe DS model can be shown to provide a well estimation of the scattering power with known electrical parameters of the scattering surface. Backscatter can be both modeled and measured to be more than about 20 dB down from the peak received power (e.g., scattered plus reflected) and to a first order approximation, smooth surfaces like drywall can be modeled as reflective surfaces, especially close to grazing.

Antenna XPD, measured at 28, 73, and 140 GHz, is shown to not change with distance and has a trend to increase with frequencies. The partition loss of clear glass and drywall has been measured at 28, 73, and 140 GHz with four polarization configurations (e.g., V-V, V-H, H-V, and H-H), using horn antennas having similar aperture. Measuring the antenna XPD facilitates the analysis of depolarization effects of clear glass and drywall. Due to signal depolarization, the partition loss for cross-polarized antenna orientations can be less than the expected value based on the XPD measurements and the co-polarized partition measurements. The partition loss can be highly dependent on antenna polarization for both materials, since both clear glass and drywall induce a depolarizing effect, which becomes more prominent as frequency increases. Ongoing propagation measurements and early path loss results show that there is not much difference in the path loss model over 28, 73, and 140 GHz.

Exemplary Real Time Imaging Using 6G

Exemplary 6G Imaging

Radar at mmWave and THz frequencies can be more effective than light or infrared-based imaging such as Light Detection and Ranging ("LIDAR"), due to the smaller impact that weather and ambient light can have on the THz channel. While LIDAR can provide higher resolution, LIDAR cannot work when it is foggy, raining, or cloudy. (See, e.g., Reference 87). mmWave and THz radar can be used for assisting driving or flying in foul weather, as well as in military and national security. (See, e.g., References 78, 79 and 80). High-definition video resolution radars that operate at several hundred gigahertz can be sufficient to provide a TV-like picture quality and can complement radars at lower frequencies (below 12.5 GHz) that provide longer range detection but with poor resolution. (See, e.g., References 79 and 81). Dual-frequency radar systems can facilitate driving or flying in very heavy fog or rain. (See, e.g., Reference 79).

THz waves can augment human and computer vision to see around corners and to "view" NLOS objects, which can facilitate capabilities in rescue and surveillance, autonomous navigation, and localization. A building surface (e.g., wall, floor, door) typically behaves to a first order as mirrors (e.g., perfect reflectors of THz energy), thus allowing THz imaging to see around corners and behind walls if there are sufficient reflection or scattering paths. (See, e.g., References 88 and 89). NLOS imaging methods based on visible and infrared light have been proposed. (See, e.g., References 90-92). However, the optical wavelength is smaller than the surface roughness of most surfaces. Thus, the exemplary optical NLOS imaging generally uses complex hardware and computationally expensive reconstruction algorithms, while exhibiting short imaging distances (e.g., less than 5 m).

Alternatively, lower frequency (e.g., less than 10 GHz), NLOS radar systems suffer less loss and objects appear much smoother. However, in the lower frequency spectrum, materials are semitransparent, edge diffraction become much stronger, and images are easily cluttered due to strong multi-reflection propagation. (See, e.g., References 93-97). Additionally, radar systems require accurate knowledge of the static geometry and are limited to object detection rather that detailed images of the hidden scene.

Figure 18:
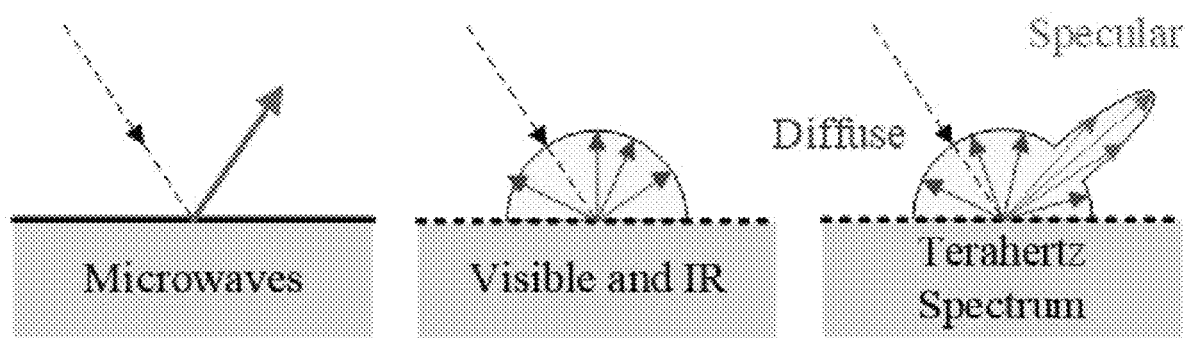
FIG. 18 is a set of diagram illustrating diffuse scattering from building surfaces according to an exemplary embodiment of the present disclosure.

THz waves combine many of the advantageous traits of both microwaves and visible light. THz waves feature small wavelengths and wide bandwidths that facilitate high spatial resolution images with moderately sized imaging systems. (See, e.g., References 98 and 99). Additionally, THz scattering exhibits both specular and diffuse scattering from most building surfaces, as shown in the diagrams of FIG. 18. The strong specular component turns the surfaces into something close to "electrical mirrors", thus facilitating the imaging objects around obstacles, while maintaining spatial coherency (e.g., narrow beams) and high spatial resolution. (See, e.g., Reference 89). Radar imaging systems illuminate the scene with THz waves and generate 3D images by computing the ToF of the backscattered signals. When the path of the scattered signal includes multiple bounces on surrounding surfaces, the resulting 3D image can appear distorted. If the LOS surfaces act as mirrors due to the strong specular reflections, a corrected image of the NLOS objects can be reconstructed by applying exemplary mirroring transformations. (See, e.g., Reference 88).

Figure 19A:
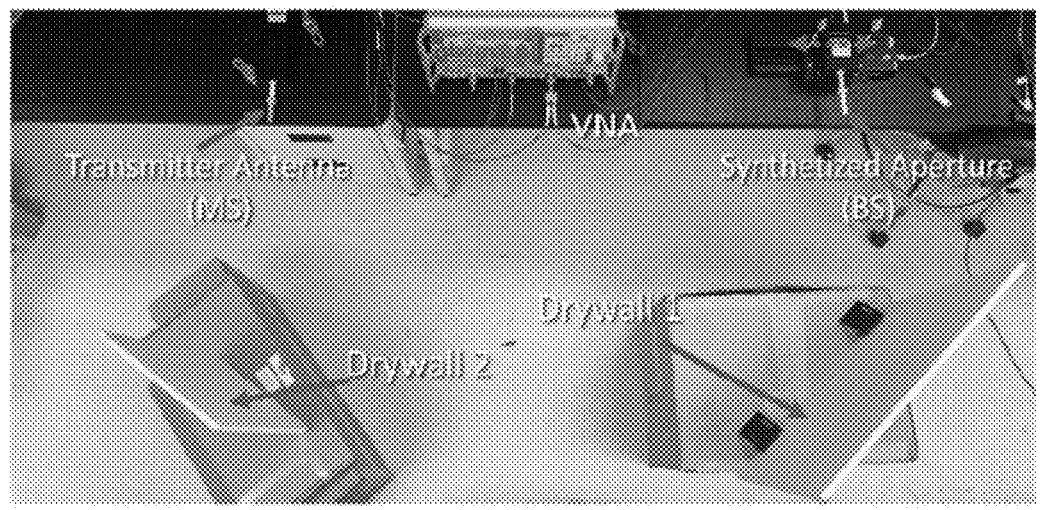
FIG. 19A is an exemplary image of an exemplary setup according to an exemplary embodiment of the present disclosure.
Figure 19B:
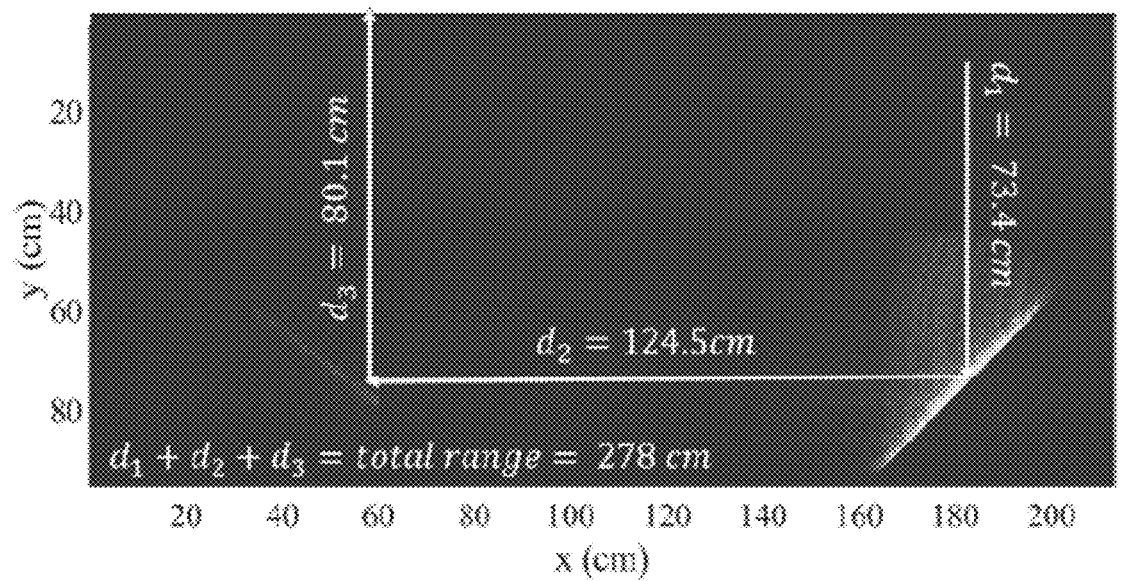
FIG. 19B is an exemplary constructed mmWave image according to an exemplary embodiment of the present disclosure.

Exemplary Precise Positioning mmWave imaging and communications can be incorporated in portable devices operating above, for example, 100 GHz. (See, e.g., Reference 83). FIG. 19A shows an image of an exemplary setup, which includes (i) a synthetic aperture radar ("SAR") emulating a 13-cm aperture linear antenna array and operating at 220-300 GHz, (ii) two drywall sheets, and (iii) a single-antenna user that is in the NLOS of the SAR. First, a mmWave image (e.g., map) of the surrounding environment, including both LOS and NLOS objects, is constructed by rapid beam steering and analyzing the radar returns at very narrow beam angle separations. Second, the user sends an uplink pilot that is used by the antenna array, for example, at a base station or an access point, to estimate the AOA and TOA. The AOA and TOA can be used to backtrack the path of the user signal on the constructed mmWave image, as shown in the constructed mmWave image of FIG. 19B, to determine the user location. This mmWave imaging/communication-based procedure facilitated the localization of a user within a 2 cm radius over a distance of 2.8 m.

The exemplary mmWave imaging/communication procedure can be used to localize users in the NLOS areas, even if their travel paths to the base station/access points experience more than one reflection (e.g., multiple bounces). For example, the experiment shown in the image of FIG. 19A was able to localize the user even though its path experiences two bounces. Further, different from classical simultaneous localization and mapping ("SLAM") procedures, which require prior knowledge and calibration of the environment, the ex mmWave imaging/communication-based procedure does not require any prior knowledge of the environment. By building or downloading the map of the environment, an exemplary mobile device can be used to predict the signal level, using real time site-specific prediction, (see, e.g., Reference 85), or uploading of the map to the cloud that compiles physical maps, or which uses such maps for mobile applications. (See, e.g., References 82, 84 and 86). Based on the large bandwidth available at frequencies above 100 GHz, the LOS and NLOS, the exemplary system, method and computer-accessible medium can localize users with centimeter accuracy.

Additionally, the exemplary system, method and computer-accessible medium can utilize mmWave or THz imaging to reconstruct 3D maps of the surroundings in unknown environments, thus merging sensing, and imaging and position location all at the same time. mmWave and THz signals can reflect strongly from most building materials which can facilitate the imaging of hidden objects (e.g., NLOS imaging). (See, e.g., References 82, 84 and 86). Additionally, scattering can also be well modeled and predicted. Based on the 3D maps of the physical surroundings, and the time and angular information from a mobile TOA and AOA, centimeter level localization and mapping can be achieved with the massive bandwidth and large antenna arrays at mmWave and THz frequencies. (See, e.g., References 82, 84 and 86).

Figure 20A:
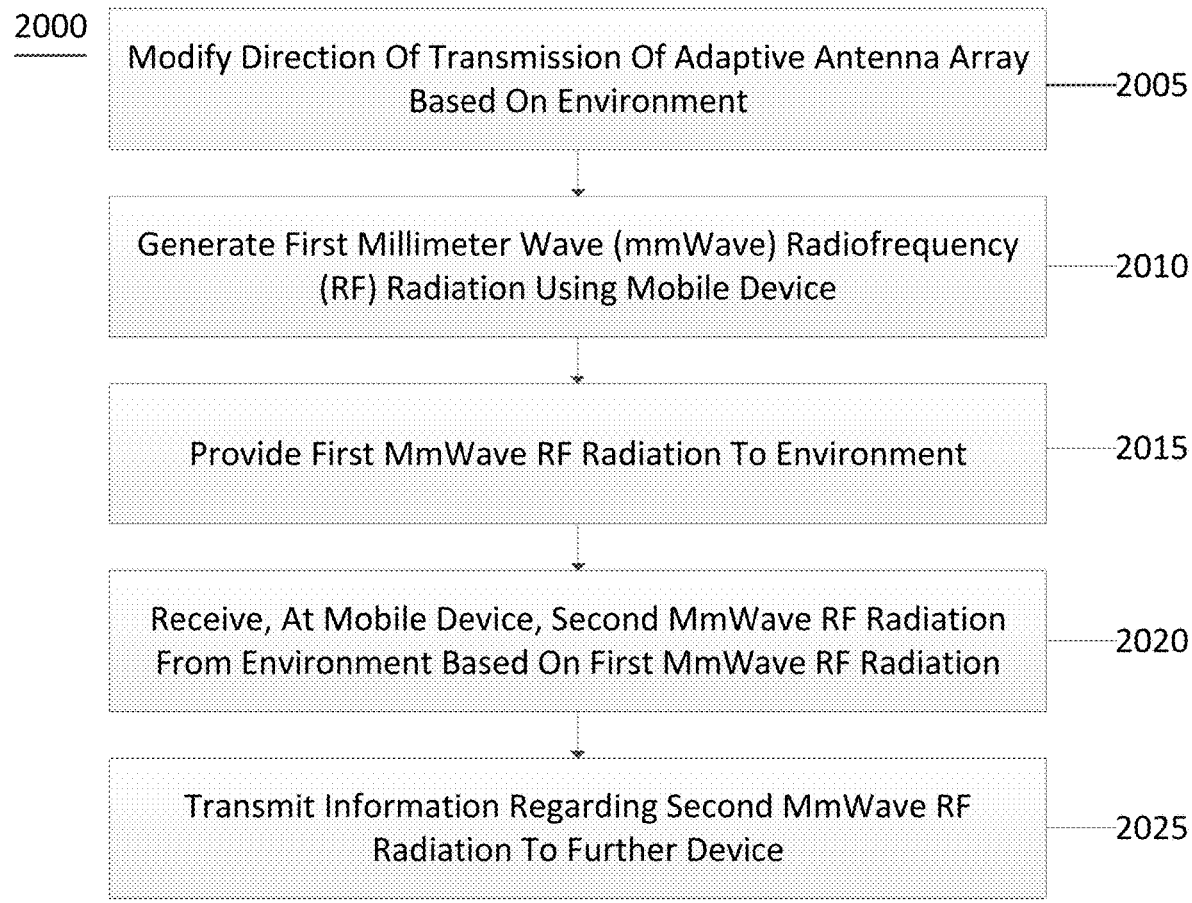
FIGS. 20A and 20B are an exemplary flow diagram of a method for generating an image and/or a video of an environment according to an exemplary embodiment of the present disclosure.
Figure 20B:
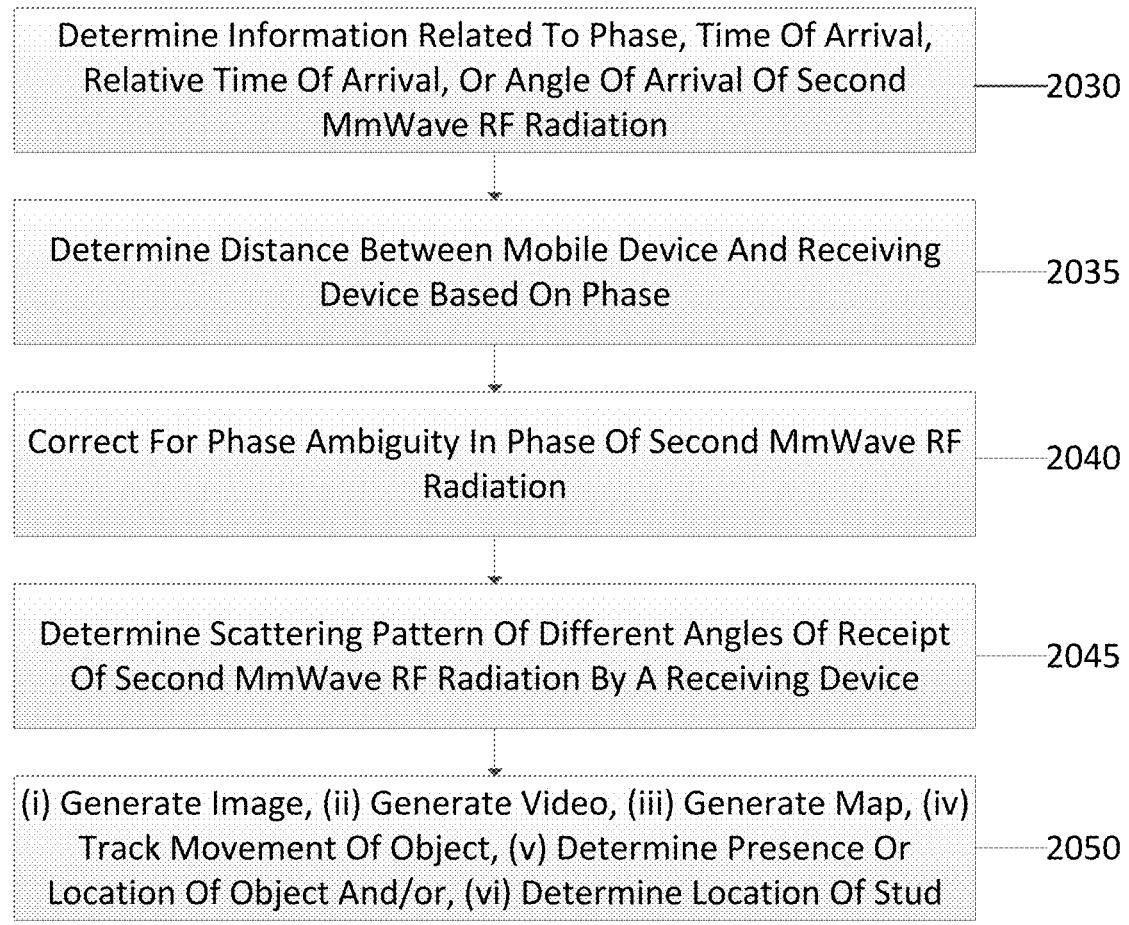

FIGS. 20A and 20B show an exemplary flow diagram of a method 2000 according to an exemplary embodiment of the present disclosure. For example, at procedure 2005, a direction of transmission of an adaptive antenna array can be modified based on an environment. At procedure 2010, a first millimeter wave (mmWave) radiofrequency (RF) radiation can be generated using a mobile device. At procedure 2015, the first mmWave RF radiation can be provided to the environment. At procedure 2020, the mobile device can receive the second mmWave RF radiation from the environment that can be based on the first mmWave RF radiation. At procedure 2025, information regarding the second mmWave RF radiation can be transmitted to a further device, which can be used to generate an image or video.

Additionally, at procedure 2030, information related to a phase, a time of arrival, a relative time of arrival, or an angle of arrival of the second mmWave RF radiation can be determined. At procedure 2035, a distance between the mobile device and a receiving device can be determined based on the phase. At procedure 2040, a phase ambiguity in the phase of the second mmWave RF radiation can be corrected for. At procedure 2045, a scattering pattern of different angles of receipt of the second mmWave RF radiation can be determined by a receiving device. At procedure 2050, an image can be generated, a video can be generated, a map can be generated, movement of an object can be tracked, a presence of location of an object can be determined, and/or a location of a stud of a wall can be determined.

Figure 21:
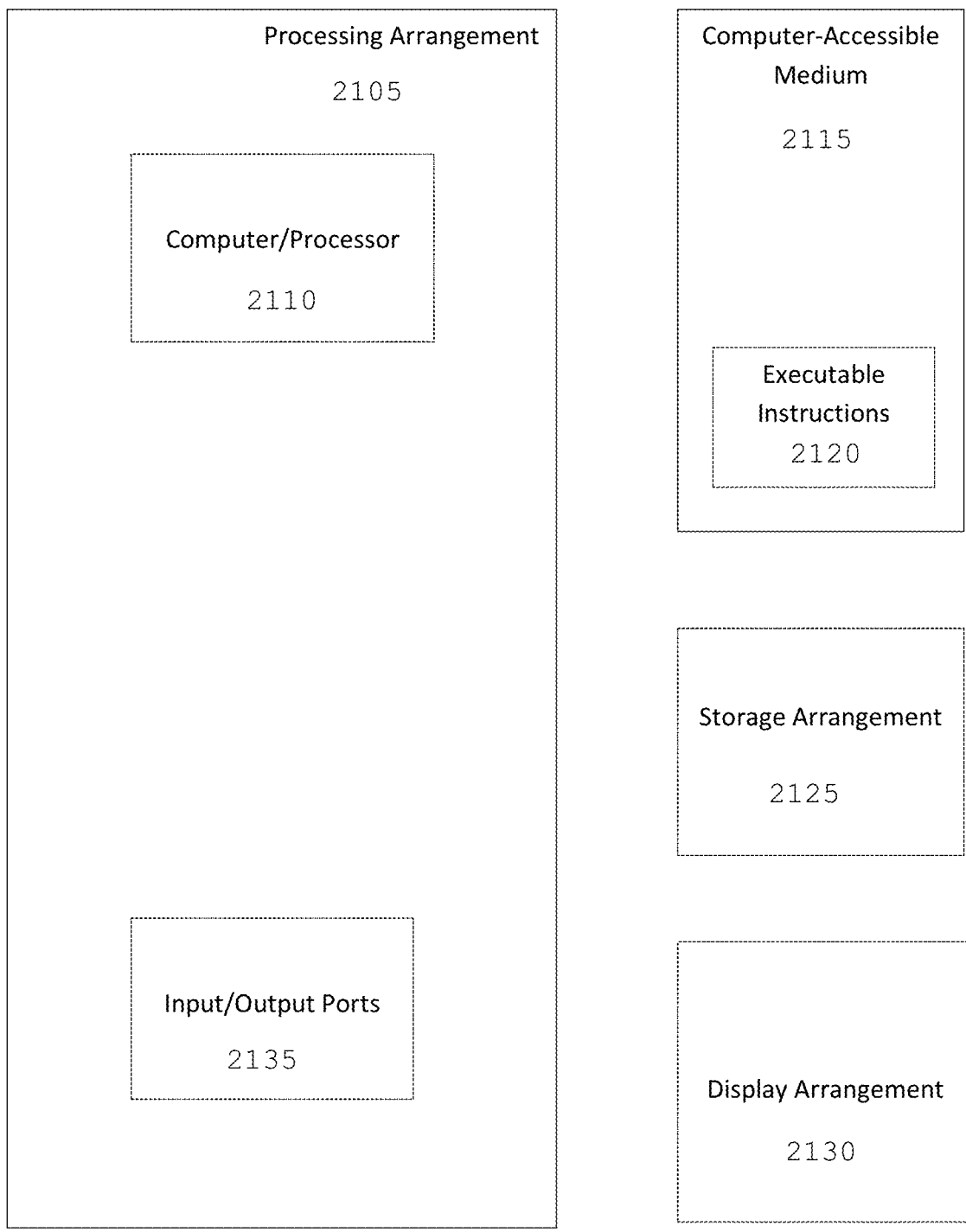
FIG. 21 is an illustration of an exemplary block diagram of an exemplary system in accordance with certain exemplary embodiments of the present disclosure.

FIG. 21 shows a block diagram of an exemplary embodiment of a system according to the present disclosure. For example, exemplary procedures in accordance with the present disclosure described herein can be performed by a processing arrangement and/or a computing arrangement 2105. Such processing/computing arrangement 2105 can be, for example entirely or a part of, or include, but not limited to, a computer/processor 2110 that can include, for example one or more microprocessors, and use instructions stored on a computer-accessible medium (e.g., RAM, ROM, hard drive, or other storage device).

As shown in FIG. 21, for example a computer-accessible medium 2115 (e.g., as described herein above, a storage device such as a hard disk, floppy disk, memory stick, CD-ROM, RAM, ROM, etc., or a collection thereof) can be provided (e.g., in communication with the processing arrangement 2105). The computer-accessible medium 2115 can contain executable instructions 2120 thereon. In addition or alternatively, a storage arrangement 2125 can be provided separately from the computer-accessible medium 2115, which can provide the instructions to the processing arrangement 2105 so as to configure the processing arrangement to execute certain exemplary procedures, processes, and methods, as described herein above, for example.

Further, the exemplary processing arrangement 2105 can be provided with or include an input/output ports 2135, which can include, for example a wired network, a wireless network, the internet, an intranet, a data collection probe, a sensor, etc. As shown in FIG. 21, the exemplary processing arrangement 2105 can be in communication with an exemplary display arrangement 2130, which, according to certain exemplary embodiments of the present disclosure, can be a touch-screen configured for inputting information to the processing arrangement in addition to outputting information from the processing arrangement, for example. Further, the exemplary display arrangement 2130 and/or a storage arrangement 2125 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties. Additionally, all systems, methods, computer-accessible mediums and apparatuses described herein can incorporate, use, operate, etc. any of the subject matter described in U.S. Provisional Patent Application No. 62/852,053, filed on May 23, 2019, which has been incorporated herein by reference in its entirety.

EXEMPLARY REFERENCES

The following references are hereby incorporated by reference in their entireties.

[1] https://ecfsapi.fcc.gov/file/0228024926034/FCC-18-17A6.pdf.
[2] https://www.fcc.gov/ecfs/filing/0228024926034.
[3] https://ecfsapi.fcc.gov/file/0228024926034/FCC-18-17A1.pdf.
[4] Rappaport, et. al., "Millimeter Wave for 5G Cellular: It will work," IEEE Access 2013.
[5] S. Sun, et. al., "MIMO for millimeter-wave wireless communications: Beamforming, spatial multiplexing, or both?," IEEE Com. Mag., 2014.
[6] S. Sun, et. al, "Hybrid Beamforming for 5G Millimeter-Wave Multi-Cell Networks," IEEE InfoCom Honolulu, April 2018.
[7] C. M. P. Ho, et. al, "Antenna effects on indoor obstructed wireless channels and a deterministic image-based wideband propagation model for in-building personal communication systems," Intl. Journal of Wireless Information Networks, January 1994, pp 61-76, 1994.
[8] T. S. Rappaport and D. A. Hawbaker, Wide-band microwave propagation parameters using circular and linear polarized antennas for indoor wireless channels, IEEE Transactions on Communications, Vol. 40, No. 2, February 1992.
[9] T. S. Rappaport, "Wireless Communications, Principles and Practice" c. 2002 Pearson/Prentice Hall.
[10] Millimeter Wave Mobile Communications for 5G Cellular: It will work!" by Rappaport, et. al.
[11] O. Kanhere and T. S. Rappaport, "Position Locationing for Millimeter Wave Systems," in *Proc. IEEE 2018 Global Communications Conference*, December 2018, pp. 1-6.
[12] G. R. MacCartney, Jr. and T. S. Rappaport, "A flexible millimeter-wave channel sounder with absolute timing," *IEEE Journal on Selected Areas in Communications*, vol. 35, no. 6, pp. 1402-1418, June 2017.
[13] T. S. Rappaport et al., "Wireless Communications and Applications Above 100 GHz: Opportunities and Challenges for 6G and Beyond (Invited)," *submitted to IEEE Access*, May 2019.
[14] J. S. Parker, P. Mickelson, J. Yeak, K. Kremeyer, and J. Rife, "Exploiting the Terahertz Band for Radionavigation," *Journal of Infrared, Millimeter, and Terahertz Waves*, vol. 37, no. 10, pp. 1021-1042, October 2016.
[15] T. S. Rappaport, *Wireless Communications: Principles and Practice*, 2nd ed. Upper Saddle River, N.J.: Prentice Hall, 2002.
[16] C. D. McGillem and T. S. Rappaport, "Infra-red location system for navigation of autonomous vehicles," in *Proceedings. 1988 IEEE International Conference on Robotics and Automation*, vol. 2, April 1988, pp. 1236-1238.
[17] "A beacon navigation method for autonomous vehicles," *IEEE Transactions on Vehicular Technology*, vol. 38, no. 3, pp. 132-139, August 1989.
[18] J. I. Bowditch, *American practical navigator*. Washington, D.C.: US Government Printing Office, 1938.
[19] T. Chi, M. Huang, S. Li, and H. Wang, "A packaged 90-to-300 GHz transmitter and 115-to-325 GHz coherent receiver in CMOS for full-band continuous-wave mm-wave hyperspectral imaging," in 2017 *IEEE International Solid-State Circuits Conference (ISSCC)*, February 2017, pp. 304-305.
[20] S. Kiran Doddalla and G. C. Trichopoulos, "Non-line of sight terahert imaging from a single viewpoint," in 2018 *IEEE/MTT-S International Microwave Symposium-IMS*, June 2018, pp. 1527-1529.
[21] G. R. MacCartney, Jr. et al., "Indoor office wideband millimeter-wave propagation measurements and models at 28 GHz and 73 GHz for ultra-dense 5G wireless networks (Invited Paper)," *IEEE Access*, vol. 3, pp. 2388-2424, October 2015.
[22] K. R. Schaubach, N. J. Davis, and T. S. Rappaport, "A ray tracing method for predicting path loss and delay spread in microcellular environments," in *Vehicular Technology Society 42nd VTS Conference—Frontiers of Technology*, vol. 2, May 1992, pp. 932-935.
[23] G. Durgin, N. Patwari, and T. S. Rappaport, "An advanced 3D ray launching method for wireless propagation prediction," in 1997 *IEEE 47th Vehicular Technology Conference. Technology in Motion*, vol. 2, May 1997, pp. 785-789.
[24] J. W. McKown and R. L. Hamilton, "Ray tracing as a design tool for radio networks," *IEEE Network*, vol. 5, no. 6, pp. 27-30, November 1991.
[25] C. M. Peter Ho, T. S. Rappaport, and M. P. Koushik, "Antenna effects on indoor obstructed wireless channels and a deterministic image-based wide-band propagation model for in-building personal communication systems," *International Journal of Wireless Information Networks*, vol. 1, no. 1, pp. 61-76, January 1994.
[26] S. Y. Tan and H. S. Tan, "A microcellular communications propagation model based on the uniform theory of diffraction and multiple image theory," *IEEE Transactions on Antennas and Propagation*, vol. 44, no. 10, pp. 1317-1326, October 1996.
[27] Y. Xing, O. Kanhere, S. Ju, and T. S. Rappaport, "Indoor Wireless Channel Properties at Millimeter Wave and Sub-Terahertz Frequencies: Reflection, Scattering, and Path Loss," submitted to *IEEE 2019 Global Communications Conference*, pp. 1-6, December 2019.
[28] S. Ju et al., "Scattering Mechanisms and Modeling for Terahertz Wireless Communications," in 2019 *IEEE International Conference on Communications (ICC)*, May 2019, pp. 1-7.
[29] S. Sun, G. R. MacCartney, Jr., and T. S. Rappaport, "Millimeter-wave distance-dependent large-scale propagation measurements and path loss models for outdoor and indoor 5G systems," in *Proc. 10th EuCap, Davos, Switzerland*, April 2016, pp. 1-5.
[30] T. S. Rappaport et al., "Millimeter Wave Mobile Communications for 5G Cellular: It Will Work!" *IEEE Access*, vol. 1, pp. 335-349, May 2013.
[31] A. O. Kaya, L. Greenstein, D. Chizhik, R. Valenzuela, and N. Moayeri, "Emitter Localization and Visualization (ELVIS): A Backward Ray Tracing Algorithm for Locating Emitters," in 2007 *41st Annual Conference on Information Sciences and Systems*, March 2007, pp. 376-381.
[32] M. Aladsani, A. Alkhateeb, and G. C. Trichopoulos, "Leveraging mmWave Imaging and Communications for Simultaneous Localization and Mapping," in *International Conference on Acoustics, Speech, and Signal Processing (ICASSP)*, May 2019, pp. 1-4.
[33] P. Meissner, E. Leitinger, M. Frohle, and K. Witrisal, "Accurate and Robust Indoor Localization Systems Using Ultra-wideband Signals," in *European Navigation Conference (ENC)*, April 2013, pp. 1-9.
[34] B5GS19, "The Brooklyn 5G Summit," April 2019. [Online]. Available: https://brooklyn5gsummit.com/.
[35] FCC, "Spectrum horizons," *First Report and Order ET Docket* 18-21, Washington D. C., Mar. 21, 2019.
[36] T. Nagatsuma, "Breakthroughs in photonics 2013: Thz communications based on photonics," *IEEE Photonics Journal*, vol. 6, no. 2, pp. 1-5, April 2014.
[37] Ministry of Internal Affairs and Communications, "Frequency Assignment Plan (as of March 2019)," March 2019. [Online]. Available: https://www.tele.soumu.go.jp/e/adm/freq/search/share/plan.htm
[38] "Ieee standard for high data rate wireless multi-media networks—amendment 2: 100 gb/s wireless switched point-to-point physical layer," *IEEE Std* 802.15.3d-2017 *(Amendment to IEEE Std* 802.15.3-2016 *as amended by IEEE Std* 802.15.3e-2017), pp. 1-55, October 2017.
[39] V. Petrov, D. Moltchanov, and Y. Koucheryavy, "Applicability assessment of terahertz information showers for next-generation wireless networks," in 2016 *IEEE International Conference on Communications (ICC)*, May 2016, pp. 1-7.
[40] V. Petrov, A. Pyattaev, D. Moltchanov, and Y. Koucheryavy, "Terahertz band communications: Applications, research challenges, and standardization activities," in 2016 *8th International Congress on Ultra Modern Telecommunications and Control Systems and Workshops (ICUMT)*, October 2016, pp. 183-190.
[41] mmWave Coalition, "mmWave Coalition's NTIA comments," January 2019. [Online]. Available: http://mmwavecoalition.org/mmwave-coalition-millimeter-waves/mmwave-coalitions-ntia-comments/

[42] K. Sengupta, T. Nagatsuma, and D. M. Mittleman, "Terahertz integrated electronic and hybrid electronic-photonic systems," *Nature Electronics*, vol. 1, no. 12, p. 622, 2018.
[43] Federal Communications Commission, "Use of Spectrum Bands Above 24 GHz For Mobile Radio Services: GN Docket No. 14-177," December 2018. [Online]. Available: https://docs.fcc.gov/public/attachments/FCC-18-180A1.pdf
[44] G. R. MacCartney, Jr. et al., "Millimeter wave wireless communications: New results for rural connectivity," in *Proceedings of the 5th Workshop on All Things Cellular: Operations, Applications and Challenges: in conjunction with MobiCom* 2016, ser. ATC '16. New York, N.Y., USA: ACM, October 2016, pp. 31-36.
[45] G. R. MacCartney and T. S. Rappaport, "Rural macrocell path loss models for millimeter wave wireless communications," *IEEE Journal on Selected Areas in Communications*, vol. 35, no. 7, pp. 1663-1677, July 2017.
[146] T. S. Rappaport, J. N. Murdock, and F. Gutierrez, "State of the art in 60-GHz integrated circuits and systems for wireless communications," *Proceedings of the IEEE*, vol. 99, no. 8, pp. 1390-1436, August 2011.
[47] T. S. Rappaport et al., "Millimeter Wave Mobile Communications for 5G Cellular: It Will Work!" *IEEE Access*, vol. 1, pp. 335-349, May 2013.
[48] "Wireless Communications and Applications Above 100 GHz: Opportunities and Challenges for 6G and Beyond (Invited)," *IEEE Access*, February 2019.
[49] S. Priebe et al., "Channel and Propagation Measurements at 300 GHz," *IEEE Transactions on Antennas and Propagation*, vol. 59, no. 5, pp. 1688-1698, May 2011.
[50] T. Kleine-Ostmann et al., "Measurement of channel and propagation properties at 300 GHz," in 2012 *Conference on Precision electromagnetic Measurements*, July 2012, pp. 258-259.
[51] N. Khalid and O. B. Akan, "Wideband THz communication channel measurements for 5G indoor wireless networks," in 2016 *IEEE International Conference on Communications (ICC)*, May 2016, pp. 1-6.
[52] S. Sun, T. S. Rappaport, and M. Shafi, "Hybrid beamforming for 5 g millimeter-wave multi-cell networks," *IEEE Conference on Computer Communications Workshops (INFOCOM WKSHPS)*, April 2018.
[53] S. Ju. et al., "Scattering mechanisms and modeling for terahertz wireless communications," in in proceeding of 2018 *IEEE International Conference on Communications (ICC)*, 2018.
[54] J. Ma, R. Shrestha, L. Moeller, and D. M. Mittleman, "Channel performance for indoor and outdoor terahertz wireless links," *APL Photonics*, vol. 3, no. 5, pp. 1-13, February 2018.
[55] Y. Xing and T. S. Rappaport, "Propagation Measurement System and Approach at 140 GHzMoving to 6G and Above 100 GHz," in *IEEE 2018 Global Communications Conference*, December 2018, pp. 1-6.
[56] G. R. MacCartney and T. S. Rappaport, "A flexible millimeter-wave channel sounder with absolute timing," *IEEE Journal on Selected Areas in Communications*, vol. 35, no. 6, pp. 1402-1418, June 2017.
[57] Y. Xing et al., "Verification and calibration of antenna cross-polarization discrimination and penetration loss for millimeter wave communications," in 2018 *IEEE 88th Vehicular Technology Conference*, August 2018, pp. 1-6.

[58] H. T. Friis, "A note on a simple transmission formula," *Proceedings of the IRE*, vol. 34, no. 5, pp. 254-256, May 1946.

[59] R. Davies, M. Bensebti, M. A. Beach, and J. P. McGeehan, "Wireless propagation measurements in indoor multipath environments at 1.7 GHz and 60 GHz for small cell systems," in [1991 Proceedings] *41st IEEE Vehicular Technology Conference*, May 1991, pp. 589-593.

[60] C. Thajudeen, A. Hoorfar, F. Ahmad, and T. Dogaru, "Measured complex permittivity of walls with different hydration levels and the effect on power estimation of twri target returns," *Progress in Electromagnetics Research*, vol. 30, pp. 177-199, 2011.

[61] T. S. Rappaport, Wireless Communications: *Principles and Practice*, 2nd ed. Upper Saddle River, N.J.: Prentice Hall, 2002.

[62] V. Degli-Esposti, F. Fuschini, E. M. Vitucci, and G. Falciasecca, "Measurement and modelling of scattering from buildings," *IEEE Trans. on Ant. and Prop.*, vol. 55, no. 1, pp. 143-153, January 2007.

[63] C. R. Anderson and T. S. Rappaport, "In-building wideband partition loss measurements at 2.5 and 60 GHz," *IEEE Transactions on Wireless Communications*, vol. 3, no. 3, pp. 922-928, May 2004.

[64] G. D. Durgin, T. S. Rappaport, and H. Xu, "Partition-based path loss analysis for in-home and residential areas at 5.85 GHz," in *1998 IEEE Global Communications Conference (GLOBECOM)*, vol. 2, November 1998, pp. 904-909.

[65] O. Kanhere and T. S. Rappaport, "Position locationing for millimeter wave systems," in *IEEE 2018 Global Communications Conference*, December 2018, pp. 1-6.

[663] O. Kanhere, S. Ju, Y. Xing, and T. S. Rappaport, "Map Assisted Millimeter Wave Localization," submitted to *IEEE 2019 Global Communications Conference*, pp. 1-6, December 2019.

[67] G. D. Durgin, T. S. Rappaport, and H. Xu, "Measurements and models for radio path loss and penetration loss in and around homes and trees at 5.85 GHz," *IEEE Transactions on Communications*, vol. 46, no. 11, pp. 1484-1496, November 1998.

[68] J. Ryan, G. R. MacCartney, Jr., and T. S. Rappaport, "Indoor Office Wideband Penetration Loss Measurements at 73 GHz," in *IEEE International Conference on Communications Workshop*, May 2017, pp. 1-6.

[69] B. Kapilevich et al., "Millimeter waves sensing behind walls-feseability study with fel radiation," 2007.

[70] Y. P. Zhang and Y. Hwang, "Measurements of the characteristics of indoor penetration loss," in *1994 IEEE 44th Vehicular Technology Conference (VTC)*, vol. 3, June 1994, pp. 1741-1744.

[71] L. M. Frazier, "Radar surveillance through solid materials," in *Command, Control, Communications, and Intelligence Systems for Law Enforcement*, vol. 2938. International Society for Optics and Photonics, 1997, pp. 139-147.

[72] A. K. M. Isa, A. Nix, and G. Hilton, "Impact of diffraction and attenuation for material characterization in millimeter wave bands," in *2015 Loughborough Antennas Propagation Conference (LAPC)*, November 2015, pp. 1-4.

[73] J. Kokkoniemi, J. Lehtomki, and M. Juntti, "Measurements on penetration loss in terahertz band," in *2016 10th European Conference on Antennas and Propagation (EuCAP)*, April 2016, pp. 1-5.

[74] G. R. MacCartney, Jr. et al., "Indoor office wideband millimeter-wave propagation measurements and models at 28 GHz and 73 GHz for ultra-dense 5G wireless networks (Invited Paper)," *IEEE Access*, vol. 3, pp. 2388-2424, October 2015.

[75] S. Deng, M. K. Samimi, and T. S. Rappaport, "28 GHz and 73 GHz millimeter-wave indoor propagation measurements and path loss models," in *IEEE International Conference on Communications Workshops (ICCW)*, June 2015, pp. 1244-1250.

[76] S. Sun, G. R. MacCartney, Jr., and T. S. Rappaport, "Millimeter-wave distance-dependent large-scale propagation measurements and path loss models for outdoor and indoor 5G systems," in *2016 IEEE 10th European Conference on Antennas and Propagation (EuCAP)*, April 2016, pp. 1-5.

[77] S. Sun et al., "Synthesizing omnidirectional antenna patterns, received power and path loss from directional antennas for 5G millimeter-wave communications," in *2015 IEEE Global Communications Conference (GLOBECOM)*, December 2015, pp. 3948-3953.

[78] I. F. Akyildiz, J. M. Jornet, and C. Han, "Terahertz band: Next frontier for wireless communications," *Physical Communication*, vol. 12, pp. 16-32, September 2014.

[79] M. J. W. Rodwell, Y. Fang, J. Rode, J. Wu, B. Markman, S. T. uran Brunelli, J. Klamkin, and M. Urteaga, "100-340 GHz Systems: Transistors and Applications," in *2018 IEEE International Electron Devices Meeting (IEDM)*, December 2018, pp. 14.3.1-14.3.4.

[80] J. Harvey et al., "Exploiting High Millimeter Wave Bands for Military Communications, Applications, and Design," *IEEE Access*, vol. 7, pp. 52 350-52 359, April 2019.

[81] D. M. Mittleman, "Twenty years of terahertz imaging," *Opt. Express*, vol. 26, no. 8, pp. 9417-9431, April 2018.

[82] M. Aladsani, A. Alkhateeb, and G. C. Trichopoulos, "Leveraging mmWave Imaging and Communications for Simultaneous Localization and Mapping," in *International Conference on Acoustics, Speech, and Signal Processing (ICASSP)*, May 2019, pp. 1-4.

[83] T. S. Rappaport, "6G and Beyond: Terahertz Communications and Sensing," *2019 Brooklyn 5G Summit Keynote*, April 2019. [Online]. Available: https://ieeetv.ieee-.org/conference-highlights/ted-tours-brooklyn-5g-summit-2019?

[84] O. Kanhere and T. S. Rappaport, "Position locationing for millimeter wave systems," in *IEEE 2018 Global Communications Conference*, December 2018, pp. 1-6.

[85] H. Wang and T. S. Rappaport, "A parametric formulation of the UTD diffraction coefficient for real-time propagation prediction modeling," *IEEE Antennas and Wireless Propagation Letters*, vol. 4, pp. 253-257, August 2005.

[86] O. Kanhere, S. Ju, Y. Xing, and T. S. Rappaport, "Map Assisted Millimeter Wave Localization for Accurate Position Location," in *submitted to IEEE Globecom*, December 2019, pp. 1-6.

[87] M. J. W. Rodwell, "Sub-mm-wave technologies: Systems, ICs, THz transistors," in *2013 Asia-Pacific Microwave Conference Proceedings (APMC)*, November 2013, pp. 509-511.

[88]] S. Kiran Doddalla and G. C. Trichopoulos, "Non-Line of Sight Terahertz imaging from a Single Viewpoint," in *2018 IEEE/MTT-S International Microwave Symposium-IMS*, June 2018, pp. 1527-1529.

[89] S. Ju et al., "Scattering Mechanisms and Modeling for Terahertz Wireless Communications," in *Proc. IEEE International Conference on Communications*, May 2019, pp. 1-7.

[90] A. Velten, T. Willwacher, O. Gupta, A. Veeraraghavan, M. G. Bawendi, and R. Raskar, "Recovering three-dimensional shape around a corner using ultrafast time-of-flight imaging," *Nature communications*, vol. 3, p. 745, March 2012.

[91] M. O'Toole, D. B. Lindell, and G. Wetzstein, "Confocal non-line-of-sight imaging based on the light-cone transform," *Nature*, vol. 555, no. 7696, p. 338, March 2018.

[92] F. Xu, G. Shulkind, C. Thrampoulidis, J. H. Shapiro, A. Torralba, F. N. Wong, and G. W. Wornell, "Revealing hidden scenes by photon-efficient occlusion-based opportunistic active imaging," *Optics express*, vol. 26, no. 8, pp. 9945-9962, April 2018.

[93] A. Sume, M. Gustafsson, M. Herberthson, A. Janis, S. Nilsson, J. Rahm, and A. Orbom, "Radar detection of moving targets behind corners," *IEEE Transactions on Geoscience and Remote Sensing*, vol. 49, no. 6, pp. 2259-2267, June 2011.

[94] K. Thai, O. Rabaste, J. Bosse, D. Poullin, I. Hinostroza, T. Letertre, and T. Chonavel, "Around-the-corner radar: Detection and localization of a target in non-line of sight," in 2017 *IEEE Radar Conference (RadarConf)*, May 2017, pp. 0842-0847.

[95] P. Setlur, T. Negishi, N. Devroye, and D. Erricolo, "Multipath exploitation in non-los urban synthetic aperture radar," *IEEE Journal of Selected Topics in Signal Processing*, vol. 8, no. 1, pp. 137-152, February 2014.

[96] R. Zetik, M. Eschrich, S. Jovanoska, and R. S. Thoma, "Looking behind a corner using multipath-exploiting uwb radar," *IEEE Transactions on Aerospace and Electronic Systems*, vol. 51, no. 3, pp. 1916-1926, July 2015.

[97] T. S. Rappaport et al., "Small-scale, local area, and transitional millimeter wave propagation for 5G communications," *IEEE Transactions on Antennas and Propagation*, vol. 65, no. 12, pp. 6474-6490, December 2017.

[98] G. C. Trichopoulos, H. L. Mosbacker, D. Burdette, and K. Sertel, "A Broadband Focal Plane Array Camera for Real-time THz Imaging Applications," *IEEE Transactions on Antennas and Propagation*, vol. 61, no. 4, pp. 1733-1740, April 2013.

[99] T. Chi, M. Huang, S. Li, and H. Wang, "A packaged 90-to-300 GHz transmitter and 115-to-325 GHz coherent receiver in CMOS for full-band continuous-wave mm-wave hyperspectral imaging," in 2017 *IEEE International Solid-State Circuits Conference (ISSCC)*, February 2017, pp. 304-305.

What is claimed is:

1. A non-transitory computer-accessible medium having stored thereon computer-executable instructions for generating at least one of (i) at least one image or (ii) at least one video of at least one environment, wherein, when a computer arrangement executes the instructions, the computer arrangement is configured to perform procedures comprising:

accessing, at an at least one mobile device, at least one map of the at least one environment;

generating a millimeter wave (mmWave) radiofrequency (RF) signal based on at least one of (i) beam steering or (ii) frequency sweeping using the at least one mobile device;

providing the mmWave RF signal to the at least one environment;

receiving, at the at least one mobile device, a first multipath signal and a second multipath signal, the first multipath signal being based on the mmWave RF signal traversing a first path within the at least one environment, and the second multipath signal being based on the mmWave RF signal traversing a second path within the at least one environment, wherein the first and second paths are different from one another; and generating the at least one of (i) the at least one image or (ii) the at least one video based on the first multipath signal, the second multipath signal, and the at least one map.

2. The computer-accessible medium of claim 1, wherein the at least one video is a real-time video of the at least one environment.

3. The computer-accessible medium of claim 1, wherein the first mmWave RF signal has a frequency between about 20 GHz to about 850 GHz.

4. The computer-accessible medium of claim 1, wherein the computer arrangement is further configured to determine information related to at least one of (i) a phase of the first multipath signal and the second multipath signal, (ii) a time of arrival of the first multipath signal and the second multipath signal, (iii) a relative time of arrival of the first multipath signal and the second multipath signal, or (iv) an angle of arrival of the first multipath signal and the second multipath signal.

5. The computer-accessible medium of claim 4, wherein the computer arrangement is configured to generate the at least one of (i) the at least one image based on the information or (ii) the at least one video based on the information.

6. The computer-accessible medium of claim 1, wherein the computer arrangement is further configured to determine at least one of a presence or a location of at least one object in the at least one environment based on first multipath signal and the second multipath signal, wherein the at least one object includes at least one of (i) obstructions, (ii) walls, (iii) objects of interest, or (iv) people.

7. The computer-accessible medium of claim 6, wherein the computer arrangement is further configured to (i) track a movement of the at least one object in the at least one environment based on the first multipath signal and the second multipath signal or (ii) determine a location of the at least one mobile device based on first multipath signal and the second multipath signal.

8. The computer-accessible medium of claim 1, wherein the computer arrangement is further configured to transmit information regarding first multipath signal and the second multipath signal to a further device, and receive the at least one of (i) the at least one image or (ii) the at least one video from the further device.

9. The computer-accessible medium of claim 1, wherein the computer arrangement is configured to generate the first mmWave RF signal using an adaptive antenna array, and wherein the adaptive antenna array includes one of a digital antenna array, an analog antenna array, or a hybrid antenna array.

10. The computer-accessible medium of claim 9, wherein the computer arrangement is further configured to modify a direction of transmission of the adaptive antenna array based on the at least one environment.

11. The computer-accessible medium of claim 1, wherein computer arrangement is configured to generate (i) the at least one image or (ii) the at least one video based on first multipath signal and the second multipath signal using a machine learning procedure.

12. The computer-accessible medium of claim 1, wherein the mmWave RF signal is at least one of (i) pulsed, (ii) spread over a bandwidth, or (iii) discretized over a plurality of individual frequencies.

13. The computer-accessible medium of claim 1, wherein the computer arrangement is further configured to determine a location of at least one stud in at least one wall based on first multipath signal and the second multipath signal.

14. The computer-accessible medium of claim 1, wherein the computer arrangement is further configured to generate at least another map of the at least one environment based on first multipath signal and the second multipath signal.

15. The computer-accessible medium of claim 1, wherein the computer arrangement is further configured to:
- determine at least one phase of first multipath signal and the second multipath signal;
- correct for a phase ambiguity in the at least one phase of first multipath signal and the second multipath signal; and
- determine a distance between the at least one mobile device and a receiving device based on the at least one phase.

16. The computer-accessible medium of claim 15, wherein at least one received map is generated by a cloud server.

17. The computer-accessible medium of claim 1, wherein the computer arrangement is configured to generate the first mmWave RF signal by sweeping antenna beam in successive angular spacings.

18. The computer-accessible medium of claim 1, wherein the at least one map of the at least one environment includes at least one of (i) a floor plan, (ii) locations of walls, or (iii) locations of objects.

19. The computer-accessible medium of claim 1, wherein the computer arrangement is further configured to generate the at least one of (i) the at least one image or (ii) the at least one video using an angle of arrival of the first multipath signal and the second multipath signal with respect to the respective first and second paths.

20. The computer-accessible medium of claim 1, wherein the computer arrangement is further configured to generate the at least one of (i) the at least one image or (ii) the at least one video using respective signal strengths of the first multipath signal and the second multipath signal.

21. A method for generating at least one of (i) at least one or image or (ii) at least one video of at least one environment, comprising:
- accessing, at an at least one mobile device, at least one map of the at least one environment;
- generating a millimeter wave (mmWave) radiofrequency (RF) signal based on at least one of (i) beam steering or (ii) frequency sweeping using at least one mobile device;
- providing the first mmWave RF signal radiation to the at least one environment;
- receiving, at the at least one mobile device, a first multipath signal and a second multipath signal, the first multipath signal based on the mmWave RF signal traversing a first path within the at least one environment and the second multipath signal based on the mmWave RF signal traversing a second path within the at least one environment, wherein the first and second paths are different from one another; and
- using a computer hardware arrangement, generating the at least one of (i) the at least one image or (ii) the at least one video based on the first multipath signal, the second multipath signal and the at least one map.

22. A system for generating at least one of (i) at least one or image or (ii) at least one video of at least one environment, comprising:
a computer hardware arrangement configured to:
- receive, at an at least one mobile device, at least one map of the at least one environment;
- generate a millimeter wave (mmWave) radiofrequency (RF) signal based on at least one of (i) beam steering or (ii) frequency sweeping using at least one mobile device;
- provide the mmWave RF signal to the at least one environment;
- receive, at the at least one mobile device, first multipath signal and a second multipath signal, the first multipath signal based on the mmWave RF signal traversing a first path within the at least one environment and the second multipath signal based on the mmWave RF signal traversing a second path within the at least one environment, wherein the first and second paths are different from one another; and
- generate the at least one of (i) the at least one image or (ii) the at least one video based on the first multipath signal, the second multipath signal and the at least one map.

23. A mobile device, comprising:
at least one antenna array; and
a computer hardware arrangement configured to:
- receive, at the mobile device, at least one map of at least one environment;
- generate a millimeter wave (mmWave) radiofrequency (RF) signal based on at least one of (i) beam steering or (ii) frequency sweeping using the at least one antenna array;
- provide the mmWave RF signal to at least one environment;
- receive, using the at least one antenna array, first multipath signal and a second multipath signal, the first multipath signal based on the mmWave RF signal traversing a first path within the at least one environment and the second multipath signal based on the mmWave RF signal traversing a second path within the at least one environment, wherein the first and second paths are different from one another; and
- generate at least one of (i) at least one image or (ii) at least one video based on the first multipath signal, the second multipath signal and the at least one map.

* * * * *